US009504099B2

(12) United States Patent
McGuire et al.

(10) Patent No.: US 9,504,099 B2
(45) Date of Patent: Nov. 22, 2016

(54) LIGHTING SYSTEM WITH FLEXIBLE LIGHTING SHEET AND INTELLIGENT LIGHT BULB BASE

(71) Applicant: NthDegree Technologies Worldwide Inc., Tempe, AZ (US)

(72) Inventors: Kenneth Stephen McGuire, Cincinnati, OH (US); Mark John Steinhardt, Cincinnati, OH (US); Corey Michael Bischoff, Cincinnati, OH (US); Edward Mack Sawicki, Cincinnati, OH (US); Erik John Hasenoehrl, Loveland, OH (US)

(73) Assignee: NthDegree Technologies Worldwide Inc., Tempe, AZ (US)

( * ) Notice: Subject to any disclaimer, the term of this patent is extended or adjusted under 35 U.S.C. 154(b) by 267 days.

(21) Appl. No.: 14/063,006

(22) Filed: Oct. 25, 2013

(65) Prior Publication Data

US 2014/0049164 A1 Feb. 20, 2014

Related U.S. Application Data

(63) Continuation-in-part of application No. 29/390,527, filed on Apr. 26, 2011, now Pat. No. Des. 689,630, and a continuation-in-part of application No. 29/390,535, filed on Apr. 26, 2011, now Pat. No. Des. 683,483.

(30) Foreign Application Priority Data

| Apr. 26, 2011 | (WO) | PCT/US2011/033904 |
| Apr. 26, 2011 | (WO) | PCT/US2011/033907 |
| Apr. 26, 2011 | (WO) | PCT/US2011/033910 |
| Apr. 26, 2011 | (WO) | PCT/US2011/033918 |
| Apr. 26, 2011 | (WO) | PCT/US2011/033924 |

(51) Int. Cl.
*H05B 37/02* (2006.01)
*H05B 33/08* (2006.01)

(52) U.S. Cl.
CPC .......... *H05B 33/08* (2013.01); *H05B 33/0857* (2013.01); *H05B 37/0272* (2013.01); *Y02B 20/48* (2013.01)

(58) Field of Classification Search
CPC ...... F21V 21/00; F21V 21/26; F21V 23/003; F21V 19/04; H05B 33/08
USPC ........ 315/149, 291, 307, 312; 362/235, 427, 362/382, 249.01
See application file for complete search history.

(56) References Cited

U.S. PATENT DOCUMENTS 5,121,287 A 6/1992 Lee
6,093,983 A 7/2000 Singh
(Continued)

FOREIGN PATENT DOCUMENTS

EP 2 031 300 A1 3/2009
IT WO 2006077498 A1 * 7/2006 .............. F21V 23/02
(Continued)

OTHER PUBLICATIONS

International Search Report; International Application No. PCT/US2011/033910; date of mailing May 4, 2012; 20 pages.

*Primary Examiner* — Lincoln Donovan
*Assistant Examiner* — Thomas Skibinski
(74) *Attorney, Agent, or Firm* — Nancy R. Gamburd; Gamburd Law Group LLC

(57) ABSTRACT

A light bulb base includes a power source interface configured to couple the light bulb base to a light bulb socket. It also includes a bulb-coupling interface configured to removably couple the light bulb base to a bulb assembly. A user interface mechanism is also included in the light bulb base, and is operable to control a function of the bulb assembly or the base when the base is coupled to the bulb assembly. The light bulb base may also include a receiver for receiving a signal from a remote control source and/or a controller configured to perform the function.

20 Claims, 60 Drawing Sheets

(56) References Cited

U.S. PATENT DOCUMENTS

| | | | |
|---|---|---|---|
| 7,123,140 B1* | 10/2006 | Denes | G08C 17/02 340/538.11 |
| 7,556,398 B2 | 7/2009 | Van Der Poel | |
| 2004/0264187 A1 | 12/2004 | Vanderschuit | |
| 2007/0297169 A1* | 12/2007 | Holmes | F21S 6/002 362/227 |
| 2009/0237011 A1* | 9/2009 | Shah | G05B 15/02 315/312 |

FOREIGN PATENT DOCUMENTS

| WO | WO 2006/077498 A1 | 7/2006 |
|---|---|---|
| WO | WO 2008/043264 A1 | 4/2008 |
| WO | WO 2010/111672 A1 | 9/2010 |

* cited by examiner

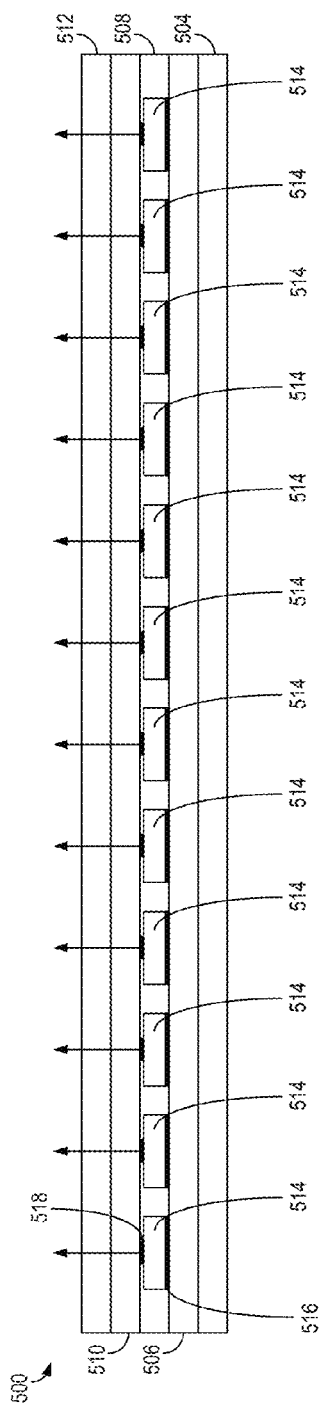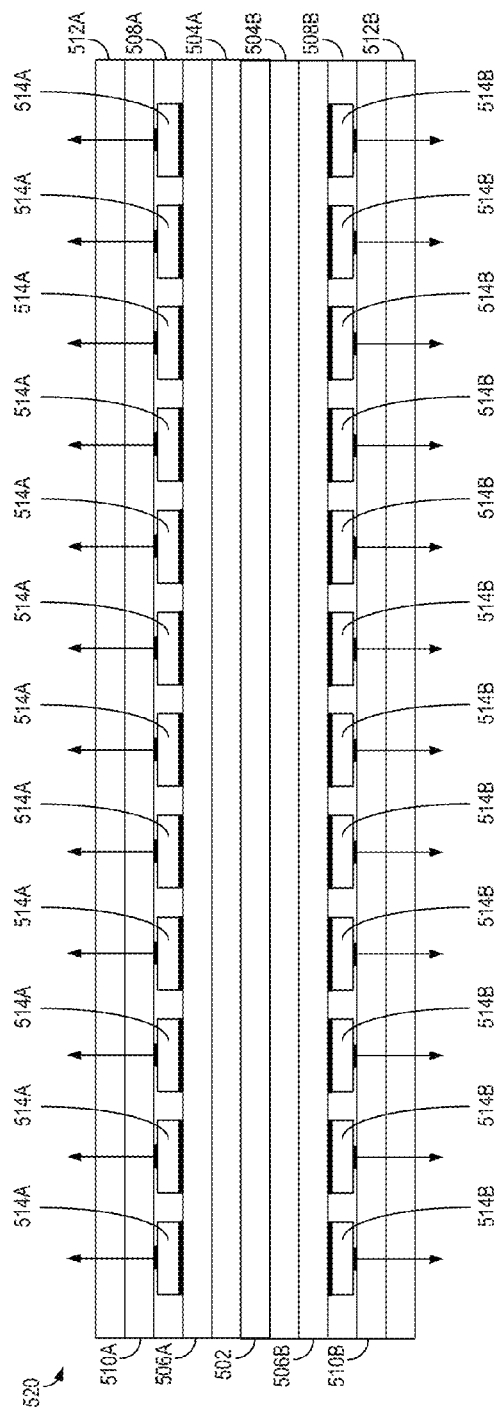

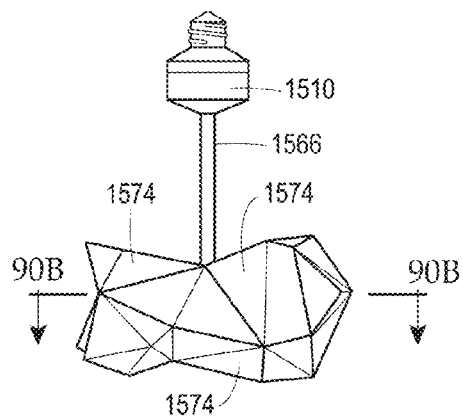
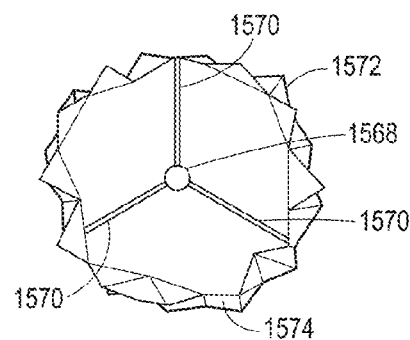
Fig. 28A      Fig. 28B
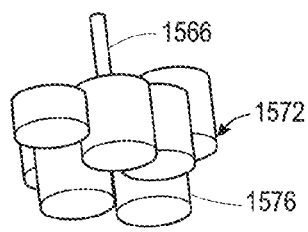
Fig. 28C
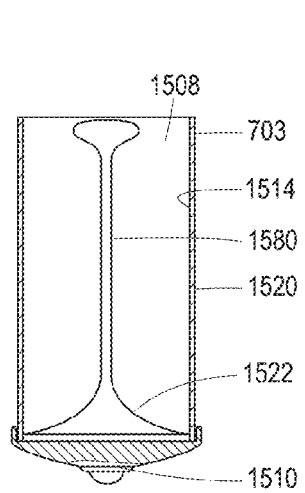
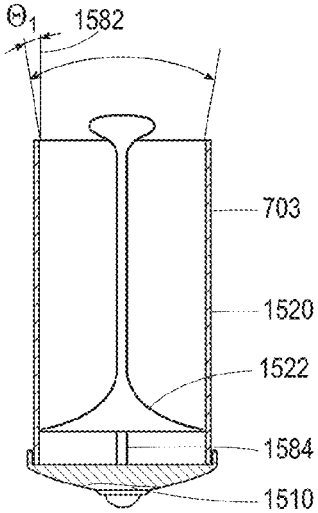
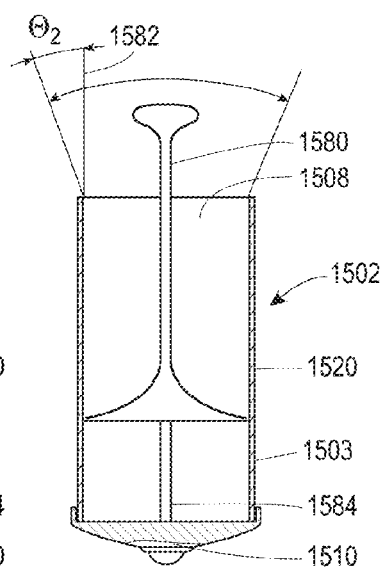
Fig. 29A      Fig. 29B      Fig. 29C

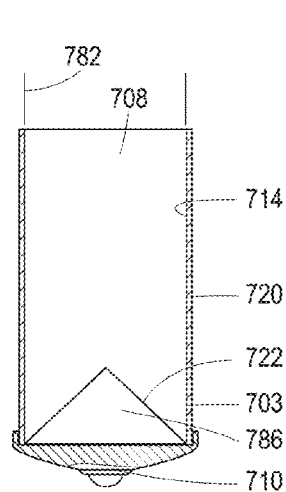
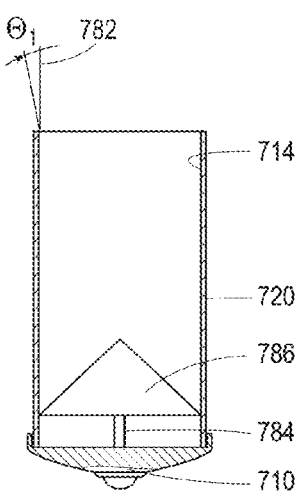
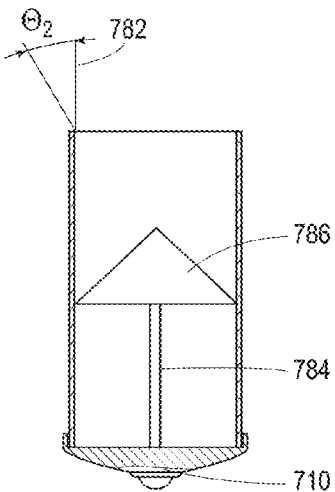
Fig. 30A　　　　Fig. 30B　　　　Fig. 30C
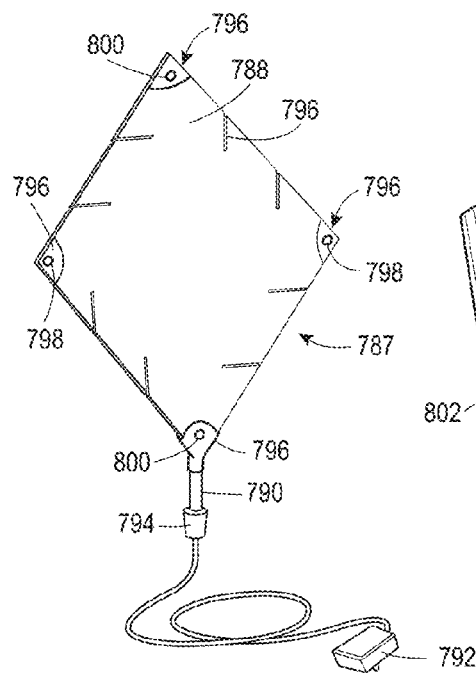
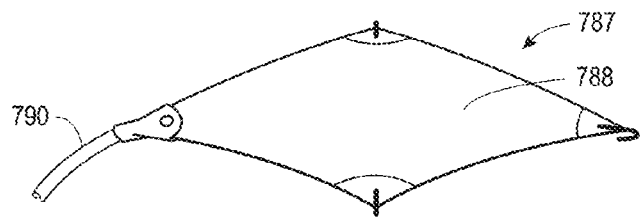
Fig. 31A　　Fig. 31B　　Fig. 31C
Fig. 31D

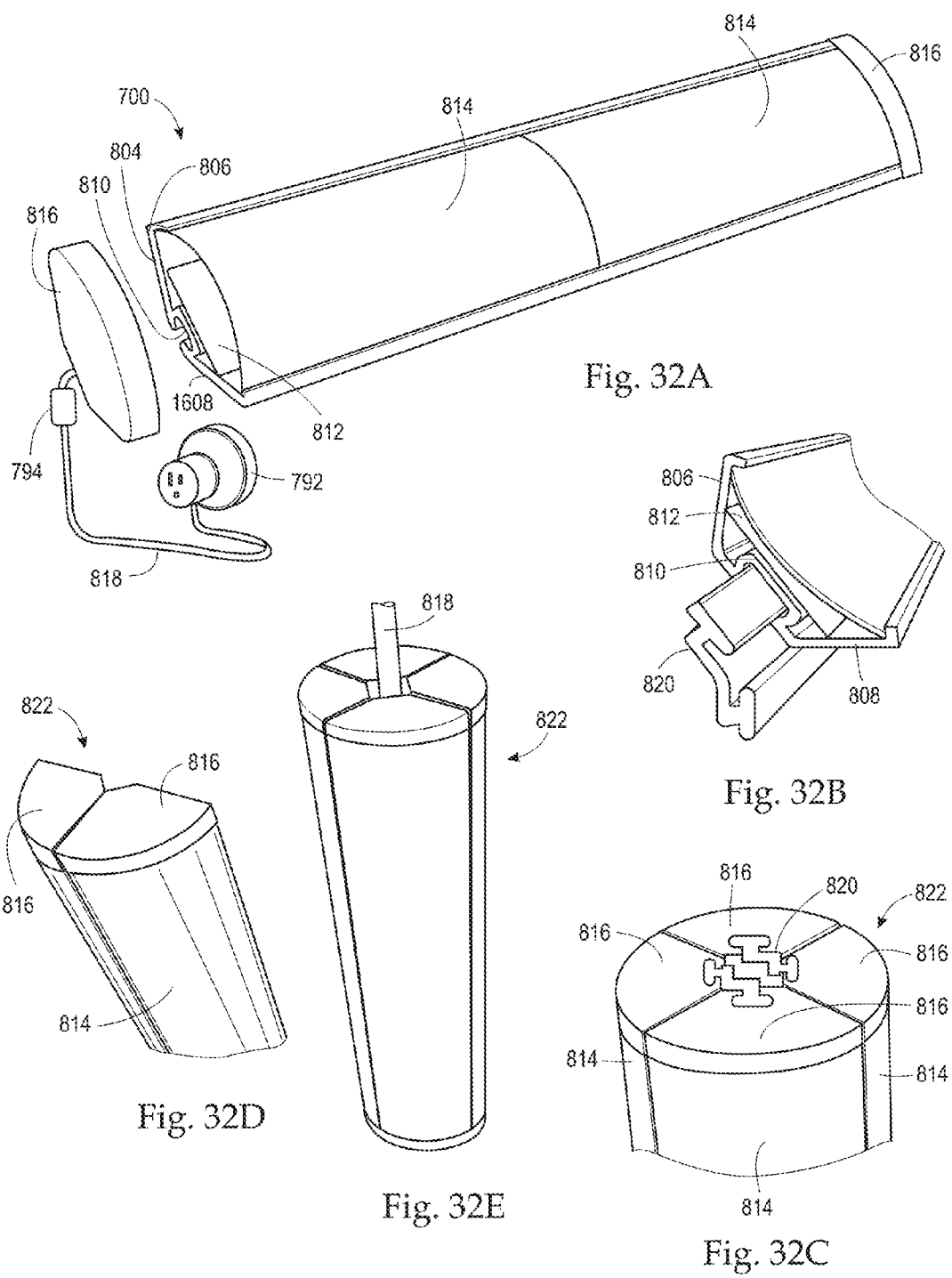

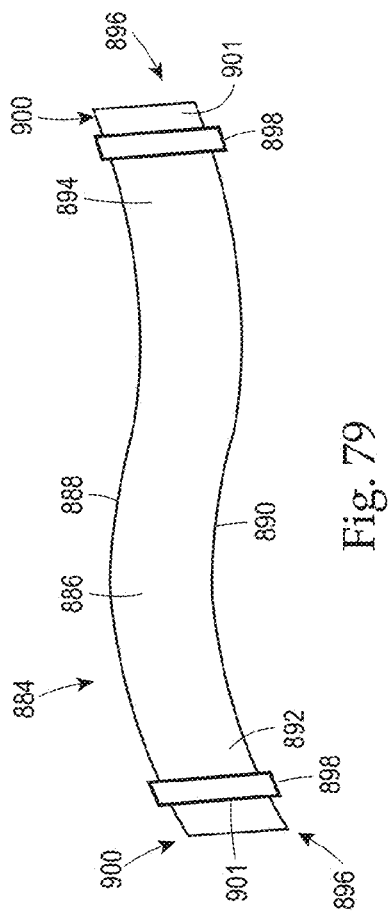
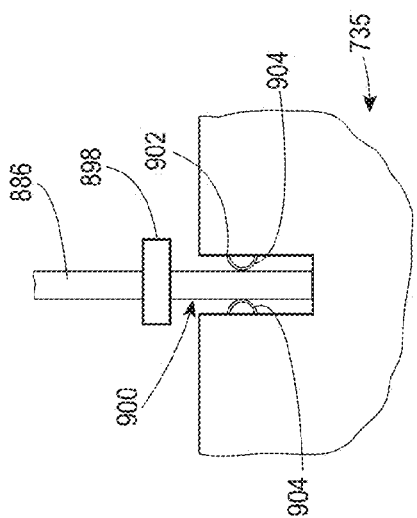
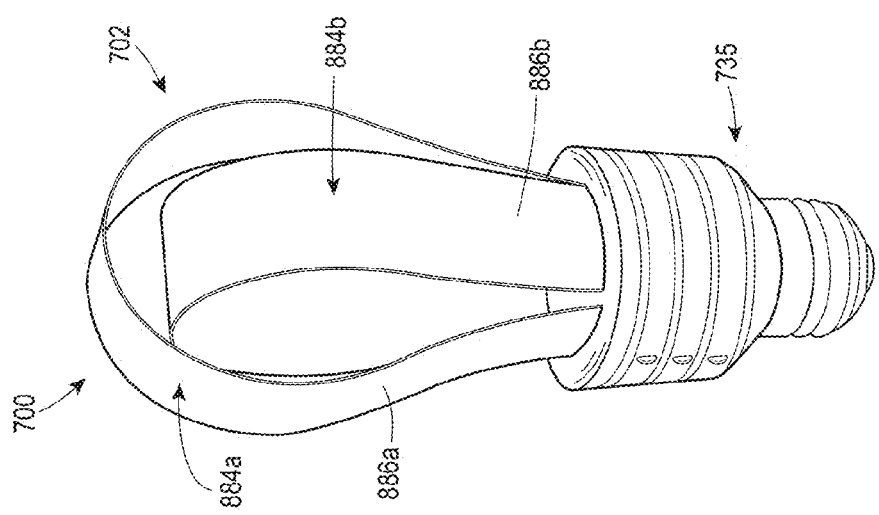

LIGHTING SYSTEM WITH FLEXIBLE LIGHTING SHEET AND INTELLIGENT LIGHT BULB BASE

FIELD OF THE INVENTION

The present invention is related to lighting assemblies and, in particular, is related to a light bulb base for controlling one or more lighting functions.

BACKGROUND OF THE INVENTION

The conventional incandescent light bulb and its corresponding socket have remained relatively unchanged since coming into popular use. One of the many reasons for this is the large installed user base of sockets implementing the so-called Edison screw. Advances in technology and processes have made possible new types of bulbs and sockets, new types of control, and new lighting applications, many of which have been difficult to implement without specialized equipment and/or complicated installation. For example, centralized and/or remote control (e.g., by computer) lighting systems are available, but generally require the installation of electrical hardware such as switches, transmitters, and receivers in order to implement. As another example, adding dimmable or sensor-responsive lighting also generally (though not universally) requires the installation of wired hardware. Meanwhile, new lighting technologies such as, for example, LED lighting, can provide highly customizable lighting solutions (e.g., changing color, implementing multiple lighting circuits, etc.), but a standard Edison-screw socket hardwired to a typical two-position switch or dimmer switch does not provide the necessary infrastructure to adequately implement or control these functions.

SUMMARY OF THE INVENTION

The present invention, in one embodiment, relates to a light bulb base comprising a power source interface configured to couple the light bulb base to a light bulb socket, a bulb-coupling interface configured to removably couple the light bulb base to a bulb assembly and a user interface mechanism operable to control a function of the bulb assembly or the base when the base is coupled to the bulb assembly.

In another embodiment, the present invention relates to a light bulb base comprising a power source interface configured to couple the light bulb base to a light bulb socket, a bulb-coupling interface configured to couple the light bulb base to a bulb assembly and a receiver operable to receive a signal from a remote control source.

In yet another embodiment, the present invention relates to a light bulb base comprising a power source interface configured to couple the light bulb base to a light bulb socket, a bulb-coupling interface configured to couple the light bulb base to a bulb assembly and a first inductive coupling element operable to conduct a current and to generate a first corresponding current in a first corresponding inductive coupling element in the bulb assembly.

BRIEF DESCRIPTION OF THE DRAWINGS

The objects, features and advantages of the present invention will be more readily appreciated upon reference to the following disclosure when considered in conjunction with the accompanying drawings, in which:

FIG. 1 is a sectional view of a planar illuminating material.

FIG. 2 is a sectional view of a second planar illuminating material.

FIG. 28A is a side view of an exemplary embodiment of a lighting assembly.

FIG. 28B is a sectional view of the embodiment of FIG. 27A taken along section line 90B-90B.

FIG. 28C is a perspective view of an exemplary embodiment of a lighting assembly.

FIG. 29A is a sectional view of an exemplary embodiment of a lighting assembly.

FIG. 29B is a sectional view of an alternate configuration of the embodiment of FIG. 29A.

FIG. 29C is a sectional view of another alternate configuration of the embodiment of FIG. 29A.

FIG. 30A is a sectional view of an exemplary embodiment of a lighting assembly.

FIG. 30B is a sectional view of an alternate configuration of the embodiment of FIG. 30A.

FIG. 30C is a sectional view of another alternate configuration of the embodiment of FIG. 30A.

FIG. 31A is a top view of an exemplary embodiment of a lighting assembly.

FIG. 31B is a perspective view of an exemplary embodiment of a lighting assembly.

FIG. 31C is a perspective view of an exemplary embodiment of a lighting assembly.

FIG. 31D is a perspective view of an exemplary embodiment of a lighting assembly.

FIG. 32A is a perspective view of an exemplary embodiment of a lighting assembly.

FIG. 32B is a partial perspective view of an exemplary embodiment of a lighting assembly.

FIG. 32C is a partial perspective view of an exemplary embodiment of a lighting assembly.

FIG. 32D is a partial perspective view of an exemplary embodiment of a lighting assembly.

FIG. 32E is a perspective view of an exemplary embodiment of a lighting assembly.

FIG. 78 is a perspective view of an exemplary embodiment of a lighting assembly.

FIG. 79 is a perspective view of an exemplary embodiment of a lighting strip assembly.

FIG. 80 is a side view of the lighting strip assembly of FIG. 79 disposed in a slot of an embodiment of a base assembly.

FIG. 81 is a perspective view of an exemplary embodiment of a lighting assembly.

FIG. 82A is a perspective view of an exemplary embodiment of a lighting assembly.

FIG. 82B is a perspective view of the embodiment of FIG. 82A.

FIG. 83A is a perspective view of an exemplary embodiment of a lighting assembly.

FIG. 83B is a perspective view of the embodiment of FIG. 83A.

FIG. 84A is a perspective view of an exemplary embodiment of a lighting assembly.

FIG. 84B is a top view of the embodiment of FIG. 84A.

FIG. 85A is a perspective view of an exemplary embodiment of a lighting assembly.

FIG. 85B is a top view of the embodiment of FIG. 85A.

FIG. 86A is a perspective view of an exemplary embodiment of a lighting assembly.

FIG. 86B is a top view of the embodiment of FIG. 86A.

FIG. 87A is a perspective view of an exemplary embodiment of a lighting assembly.

Figure 87A:
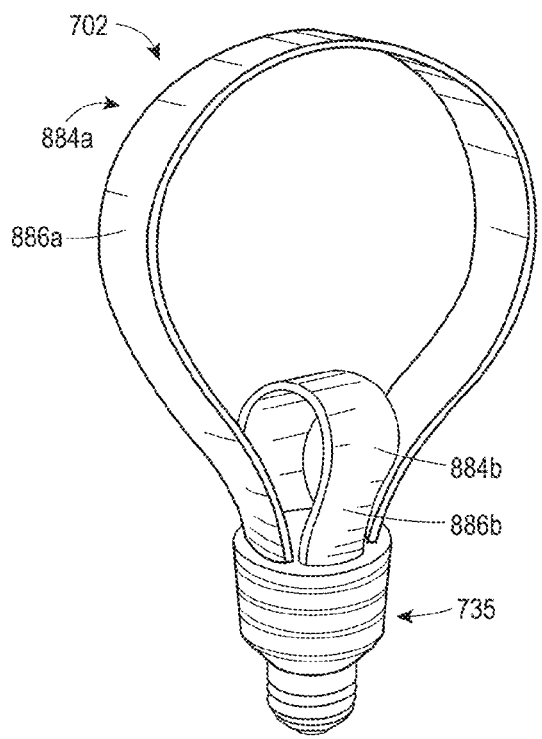
Figure 87B:
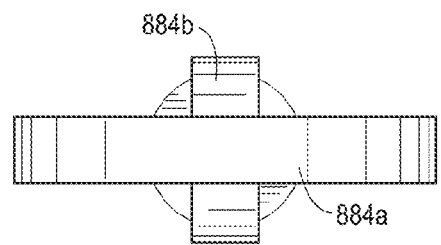

FIG. 87B is a top view of the embodiment of FIG. 87A.

DETAILED DESCRIPTION OF EXEMPLARY EMBODIMENTS

While the present inventions are susceptible of embodiment in many different forms, there are shown in the drawings and will be described herein in detail specific exemplary embodiments thereof, with the understanding that the present disclosure is to be considered as an exemplification of the principles of the inventions and is not intended to limit the inventions to the specific embodiments illustrated. In this respect, before explaining at least one embodiment consistent with the present inventions in detail, it is to be understood that the inventions are not limited in application to the details of construction and to the arrangements of components set forth above and below, illustrated in the drawings, or as described in the examples. Methods and apparatuses consistent with the present inventions are capable of other embodiments and of being practiced and carried out in various ways. Also, it is to be understood that the phraseology and terminology employed herein, as well as the abstract included below, are for the purposes of description and should not be regarded as limiting.

Lighting apparatus take many shapes, sizes, and forms and, since the inception of electric lighting, have matured to include many types of emission sources. Incandescence, electroluminescence, and gas discharge have each been used in various lighting apparatus and, among each, the primary emitting element (e.g., incandescent filaments, light-emitting diodes, gas, plasma, etc.) may be configured in any number of ways according to the intended application. Some embodiments of lighting assemblies described in the remainder of this application are susceptible to use with more than one type of emission source, as will be understood by a person of ordinary skill in the art upon reading the following described embodiments. Where particular embodiments are described as requiring a specific type of emission source or a specific configuration of a bulb assembly, it will be likewise be apparent to the ordinarily skilled practitioner. For example, certain embodiments described below refer to light-emitting diodes (LEDs), LED lighting apparatus, lighted sheets, and the like. In these embodiments, a person of ordinary skill in the art will readily appreciate the nature of the limitation (e.g., that the embodiment contemplates a planar illuminating element) and the scope of the described embodiment (e.g., that any type of planar illuminating element may be employed).

LED lighting arrays come in many forms including, for instance, arrays of individually packaged LEDs arranged to form generally planar shapes (i.e., shapes having a thickness small relative to their width and length). One such LED lighting array is described by U.S. Pat. No. 6,431,728, entitled "Multi-Array LED Warning Lights." Arrays of LEDs may also be formed on a single substrate or on multiple substrates, and may include one or more circuits (i.e., to illuminate different LEDs), various colors of LEDs, etc. Additionally, LED arrays may be formed by any suitable semiconductor technology including, by way of example and not limitation, metallic semiconductor material and organic semiconductor material.

LED lighting arrays are also available as lighted, flexible sheets, in which discrete LED components are placed or fabricated on a flexible substrate. FIG. 1 depicts a sectional view of an exemplary embodiment of one such material 500. The material 500 includes a bottom substrate layer 504. A first conductive layer 506 is disposed on the bottom substrate layer 504. A layer 508 of LEDs 514 is disposed on the first conductive layer 506 and, optionally, the LEDs 514 may be separated, covered, or the like, with an insulating material. At an interface 516 between the LED 514 and the first conductive layer 506, a first electrode on the LED 514 is electrically coupled to the first conductive layer 506. A second conductive layer 510 is disposed over the layer 508 of LEDs 514, such that, at an interface 518 between the LED 514 and the second conductive layer 510, a second electrode on the LED 514 is electrically coupled to the second conductive layer 510. A top substrate layer 512 covers the second conductive layer 510.

Of course, while FIG. 1 depicts the layers 504-512, in some embodiments, the material 500 may comprise more or fewer layers. For example, the material 500 may include one or more reflective layers, in some embodiments. In other embodiments, the material 500 may include one or more sealing layers. In still other embodiments, the material 500 may include a conductive substrate, thus eliminating the need for a bottom substrate separate from the first conductive layer.

FIG. 2 depicts a sectional view of a second exemplary embodiment of a planar, flexible material 520. The material 520 generally comprises two layers of the material 500, disposed bottom layer to bottom layer, and joined together by a reflective layer 502. In this manner, the material 520 has two illuminating surfaces. That is, a bottom substrate 504A is disposed on one side of the reflective layer 502, a first conductive layer 506A is disposed on the bottom substrate 504A, a layer 508A of LEDs 514A is disposed on the first conductive layer 506A, a second conductive layer 510A is disposed on the layer 508A of LEDs 514A, and a top substrate 512A is disposed on the second conductive layer 510A. Likewise, a bottom substrate 504B is disposed on the other side of the reflective layer 502, a first conductive layer 506B is disposed on the bottom substrate 504B, a layer 508B of LEDs 514B is disposed on the first conductive layer 506B, a second conductive layer 510B is disposed on the layer 508B of LEDs 514B, and a top substrate 512B is disposed on the second conductive layer 510B.

Exemplary planar, flexible, illuminating materials are described in: U.S. Patent Application Publication No. 2011/0058372, entitled "Solid State Bidirectional Light Sheet for General Illumination;" U.S. Patent Application Publication No. 2011/0063838, entitled "Solid State Bidirectional Light Sheet Having Vertical Orientation;" U.S. Pat. No. 7,259,030, entitled "Roll-to-Roll Fabricated Light Sheet and Encapsulated Semiconductor Circuit Devices;" U.S. Patent Application Publication No. 2010/00167441, entitled "Method of Manufacturing a Light Emitting, Photovoltaic or Other Electronic Apparatus and System;" U.S. Patent Application Publication No. 2010/0068839, entitled "Method of Manufacturing a Light Emitting, Photovoltaic or Other Electronic Apparatus and System;" U.S. Patent Application Publication No. 2010/0068838, entitled "Method of Manufacturing a Light Emitting, Photovoltaic or Other Electronic Apparatus and System;" U.S. Patent Application Publication No. 2010/0065863, entitled "Light Emitting, Photovoltaic Or Other Electronic Apparatus and System;" U.S. Patent Application Publication No. 2010/0065862, entitled "Light Emitting, Photovoltaic Or Other Electronic Apparatus and System;" U.S. Patent Application Publication No. 2009/0284179, entitled "Apparatuses for Providing Power for Illumination of a Display Object;" U.S. Patent Application Publication No. 2009/0284165, entitled, "Apparatuses for Illumination of a Display Object;" and U.S. Patent Application Publication No. 2009/0284164, entitled "Illuminating Display Systems."

In various embodiments described below, in which a flexible, planar illuminated sheet is implemented, the illuminated sheet may have one or more of the following properties: it may be foldable or bendable; it may have a minimum bend radius of between 1 cm and 20 cm; it may have a minimum bend radius of between 1 cm and 5 cm; it may have a minimum bend radius of between 1 cm and 20 cm; it may have a minimum bend radius of between 1 cm and 2 cm; it may have a minimum bend radius of between 0.5 cm and 2 cm; it may have a minimum bend radius of between 0.1 cm and 2 cm; it may comprise a material having a shape memory; and/or it may output approximately 0.5 lumens/cm$^2$ or greater.

In at least some embodiments utilizing a planar illuminating material, the material may be manufactured using conventional printing techniques to transfer inorganic semiconductor devices the size of ink particles onto a substrate. The substrate may be a flexible planar material and, in particular, may be paper in some embodiments. The semiconductors, in some embodiments, may be diodes, such as LEDs, deposited onto a substrate as an inorganic semiconductor ink using a commercial printing press. Specifically, the material may be "Printed Illuminated Paper," sold by NthDegree Technologies Worldwide Inc., of Tempe, Ariz., USA.

In any event, where this specification describes embodiments requiring the use of an LED material (e.g., comprising organic/inorganic LED, light extracting elements, etc.), or the use of a planar and/or flexible illuminated sheet, any suitable technology known presently or later invented may be employed in cooperation with the remaining described elements without departing from the spirit of the disclosure.

Due to the high efficiencies and superior life span of the LED technology, in aspects of the presently described embodiments, LED lighting systems could offer long-term savings to general consumers and businesses if the systems were modular, allowing for the creation of LED "bulbs" that could be easily and relatively inexpensively replaced, rather than having to replace an entire fixture or LED unit. The LED unit may also have a control component to allow a consumer directly or remotely (i.e., by remote control) to control the lighting of the bulb. The bulb can be set to turn on or off, or light output modified, at certain time points throughout the day or simply at the consumer's whim. LED systems can be sold as starter kits (e.g., lighting base and bulb) with replacement bulbs sold separately. The replacement bulbs could be functionally coupled to the respective base (for example, by an Edison screw, or the like), wherein the lighting base is left, for example, functionally coupled to the fixture. Given the relatively low temperature of LEDs, the bulb could be made with plastics that are highly malleable/flexible and inexpensive to provide a wide range of shapes and sizes including "lamp shades" and the like. Replacement bulbs may provide different aesthetics and/or functionality. Lighting bases could be sold with microprocessors and the like to provide intelligent lighting systems. Costs for the consumer could be lowered by the consumer keeping the lighting base and simply purchasing a bulb for the base when the bulb expires or there is some other need by the consumer to replace the bulb (e.g., to alter lighting functionality, characteristics, etc., or for aesthetic reasons). Alternatively, microprocessors could be included in the bulbs, allowing different bulbs to support varying functionality, without requiring the consumer to replace the base.

Utilizing the technologies and concepts presented herein, a modular solid state luminary lighting solution, such as a LED lighting system, provides a lighting base power/data supply fixture to which a LED apparatus or system may be functionally attached. Electrical and/or data signals are transferred directly from the power supply component (e.g., "lighting base") through a coupling system to the attached light emitting component (e.g., "bulb"). In one embodiment, the coupling system is a conductive magnetic system that allows for the transfer of data, pulse width modulation operations, and other communication features to be utilized to control the operations and characteristics of the lighting components. For the safety of the consumer, among other reasons, the system may be designed with a "lock and key" feature (electronic and/or mechanical) such that only a proper key in the bulb will unlock the power supply component to render the power supply component operational.

One aspect provides for a light emitting apparatus or system comprising a power supply component. The power supply component supplies an electrical signal and/or a data signal to a light emitting component. The power supply component is configured to receive an electrical or data signal (e.g., from a primary power source—AC and/or DC) and transmit the electrical or data signal to the light emitting component. The power supply component may be functionally linked to a temporary energy storage device (e.g. battery or capacitor) which would enable the transmission of the electrical signal to the light emitting power consumption component when the primary electrical source is not available or being used. The power supply component may comprise an Edison screw fitting or a plug that can be plugged into a socket (e.g., wall socket) or even hard wired into the electrical system. The light emitting component is configured to illuminate upon receiving the electrical and/or data signal from the power supply component, which power supply component may be coupled to an electrical source by a conventional lighting socket (e.g., an Edison screw, a bayonet mount, a wedge base, a bipin, etc.), may be coupled to the electrical source by a novel lighting socket, or may be hardwired into an electrical circuit.

According to an embodiment, the light emitting component further comprises a power receiving coupling mechanism. The power receiving coupling mechanism operates to attach the light emitting component to the power supply component and to transfer electrical and/or data signals between the power supply component and the light emitting component.

Similarly, the power supply component includes a power distribution coupling mechanism that attaches to the power receiving coupling mechanism to supply power and/or data to the light emitting component. In one embodiment, the power distribution coupling mechanism and the power receiving coupling mechanism may both be conductive magnets, or one may include conductive magnets while the other includes a metal or other material that is attracted to a magnet and has conductive properties that allows for the transfer of an electrical and/or data signal. Alternatively, the power distribution coupling mechanism may include magnetic coupling mechanisms and separate power leads, while the power receiving coupling mechanism includes magnetic coupling mechanisms and separate power leads such that the magnetic coupling mechanisms of the two components bond them together while the power leads transfer electronic and data signals. An example of power leads may include conductive pins.

In another embodiment the power distribution coupling mechanism and power receiving mechanism are detachably connected by a mechanical means (e.g., screw or twist fastening means, male/female fastener means, or the like), a conductive fastener, a magnetic fastener, or combinations thereof. The device may further comprise a lock and key feature to provide safety to the consumer. In other words, the power supply component may comprise a lock that can only be unlocked by a key provided by the light emitting component. There are a number of ways of providing such a lock and key feature including mechanical, magnetic, electronic signatures, and the like.

In yet another embodiment, the power distribution coupling mechanism and power receiving mechanism are detachably connected by a magnet, preferably an electrically conductive magnet. In yet another embodiment, at least the power distribution coupling mechanism or the power receiving mechanism comprises the magnet. Preferably the magnet is configured for detachably connecting the power distribution coupling mechanism and the power receiving coupling mechanism and wherein the magnet is configured to transfer the electrical signal between the power distribution coupling mechanism and the power receiving coupling mechanism.

It should be appreciated that any number of conductive magnets may be used without departing from the scope of this disclosure. A conductive magnet may include a magnet and a conductive coating. The magnet may be a rare earth magnet, a permanent magnet, a ceramic magnet, an electromagnet, or any other type of magnetic material. The strength of the magnets should be sufficient to ensure connection of the power supply component and the light emitting power consumption component that will support the weight of the power consumption component if the conductive magnetic coupling system is mounted on a wall or ceiling, while allowing for removal of the power consumption components without requiring a person to use excessive force to break the magnetic connection. According to one embodiment, the magnet is a neodymium magnet.

The conductive coating encompassing the magnet can be any conductive material of sufficient thickness that will not interfere with the magnetic connection of the magnet and that will properly provide a conductive path for routing an electrical signal and/or a data signal between the power distribution coupling mechanism and the light emitting component. According to an embodiment, the conductive coating is a nickel coating. It should be appreciated that the conductive coating may completely encompass the magnet so that none of the magnet is exposed, or it may only partially encompass the magnet while providing a conductive path around and/or through the magnet. The conductive coating is electrically connected to the circuitry within the light emitting device for operating the LED device, in an embodiment.

The power supply component may further comprise a power and control module. The power and control module may comprise a mechanical switch that the consumer adjusts to control a power setting (e.g., by pulse width modulation) and, consequently, the light output of the device. Alternatively and/or additionally, the power and control module may control the timing of the device such that the light is only turned on during certain points throughout the day (e.g., when the sun sets) and may even vary the output of light during certain points of the day (e.g., lights dimmed during dinner time). And/or the power and control module may comprise a motion detector such that the light is turned on only upon detecting motion (and thereafter the light stays on for defined periods of time). The power and control module may be operated by remote control (e.g., a hand held remote control or computing device, such as a mobile phone, a personal digital assistant (PDA), a laptop computer, a tablet, computer, etc.).

Data may be transmitted between the power and control module and the bulb assemblies to create an intelligent lighting system that optimizes light output according to any number of lighting element and/or environmental parameters. Where the bulb includes a plurality of LEDs, the parameters may include LED parameters. The power and control module may include all the microprocessors and other components that drive the intelligent lighting systems. By modularizing this controller in a similar manner as the power consumption component, the power and control module may be easily replaced to fix a damaged module or to modify the capabilities of the power and control module. The pulse width modulation operations and intelligent lighting system are described, for example, in US 2009/0238258; US 2009/0240380; US 2009/0237011, each of which is expressly incorporated by reference herein in its entirety. Alternatively, the control module may be disposed within the bulb, allowing device functionality to correspond to the bulb (e.g., providing a controller programmed to control a multi-circuit bulb), while not requiring the consumer to replace the base.

In some embodiments, the LEDs may have low heat output or high heat dissipation, and the apparatus may be free of heat sinks and/or cooling fins and the like.

Given that LEDs may be attached to a variety of materials, the shapes and sizes of the "bulb" portion of the device are nearly endless. In one embodiment, the light emitting component comprises a substrate formed in the shape of a cone where LEDs are disposed on the inside of the cone and the outside of the cone. In one iteration, LEDs on the inside of the cone are activated to produce a "spot light" lightening effect. In a second iteration, LEDs on the outside of the cone are activated to produce a "shading" or "diffuse" effect. In a third iteration, LEDs on both the inside and outside of the cone are activated to produce the greatest amount of light.

Various configurations of power supply components and light emitting components are contemplated. The power supply component may include a track system and the power consumption component may include a LED light strip. The LED light strip may be detachably connected to the track system for receiving power and/or data. Alternatively, the power supply component may comprise a plug suitable for plugging into a wall socket and the light emitting power consumption component is a LED sheet, preferably a flexible sheet.

Figure 3:
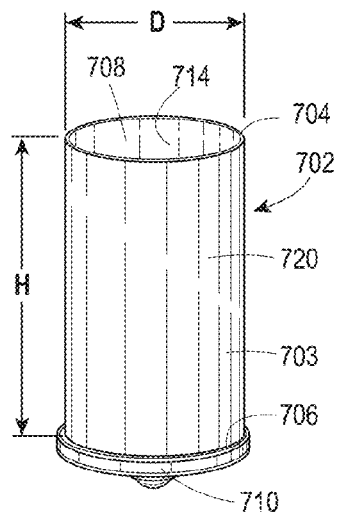
FIG. 3 is a perspective view of an exemplary embodiment of a lighting assembly.

As previously discussed, the shapes and sizes of the "bulb" portion (i.e., the light emitting component, or bulb assembly 702) of the device are nearly endless. For example, as illustrated in FIG. 3, a lighting device 700 may have a bulb assembly 702 that may include an illuminating element, such as a side wall 703, that is coupled to a bulb base 710 in a manner that will be described in more detail below. The side wall 703 comprises the compositions(s) previously described. As used herein, when a surface is described as illuminated or capable of illumination, the indicated surface comprises an LED array. As will be described in more detail below, the front side, the back side, or both sides (as well as portions of the front and/or back sides) of the material comprising the side wall 703 may illuminate. The side wall 703 of the bulb assembly 702 may be formed from a single sheet of material or may be formed by two or more sheets of material that are electrically coupled in a manner that allows each of the individual sheets to collectively function as a single sheet of material. The two or more sheets of material may be secured or unsecured to form the side wall 703. In the embodiment when the sheets are secured to form the side wall 703, the sheets may be secured to collectively form the side wall 703 by any method known in the art, including sonic welding, adhesives, by thermoforming, by thermo setting, or by mechanical coupling, for example. Alternatively, the sheets may be thermoformed and/or thermo set and no bonding may be needed. The side wall 703, or any of the illuminating sheets or elements in the embodiments described below, may have a textured surface (not shown). The texturing process may be performed during the manufacturing of the illuminated sheet, or may be performed as a secondary operation on the manufactured sheet. The surface texture may have any appropriate surface roughness and or waviness. For example, the roughness of the surface texture may give the illuminating sheet the appearance of frosted glass when the sheet is not illuminated. Additionally, a transparent layer may be disposed on the surface of the illuminating sheets, and the thickness of the transparent layer may vary to provide a surface texture and/or an even, diffused light output. In some instances, a surface texture added for aesthetic reasons may provide the added benefit of diffusing emitted light.

Still referring to FIG. 3, the side wall 703 of the bulb assembly 702 may include a top edge portion 704 having a diameter that is substantially equal to a diameter of a bottom edge portion 706 such that the side wall 703 forms a cylinder. The top edge portion 704 may be confined to a plane, and the plane may be substantially horizontal. So configured, the bulb assembly 702 may have external dimensions similar to conventional light bulbs to allow the bulb assembly 702 to be inserted into lighting devices that are designed to use conventional light bulbs. For example, the side wall 703 of the bulb assembly 702 illustrated in FIG. 3 may have a height H and an outer diameter D that are each substantially equal to the bulb height (excluding the screw base) and the maximum outer diameter of a conventional light bulb. More specifically, the side wall 703 of the bulb assembly 702 illustrated in FIG. 3 may have a height H and an outer diameter D that are each substantially equal to the bulb height (excluding the screw base) and the maximum outer diameter of an A19 incandescent light bulb—namely, approximately 3½ inches (88.9 mm) and approximately 2⅜ inches (60.3 mm) respectively. However, the height H and the outer diameter D may each have any suitable value, including values that do not correspond to the height H and/or the outer diameter D (or the maximum outer diameter) of a conventional light bulb.

Figure 4:
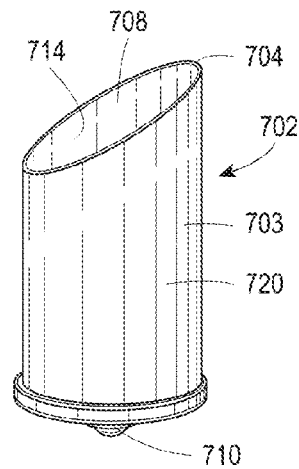
FIG. 4 is a perspective view of an exemplary embodiment of a lighting assembly.
Figure 5:
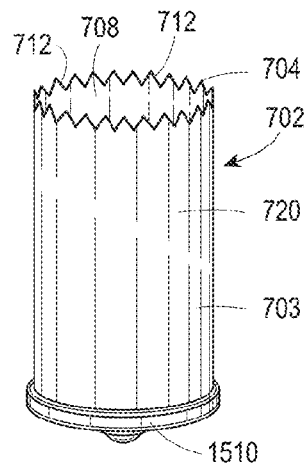
FIG. 5 is a perspective view of an exemplary embodiment of a lighting assembly.
Figure 6:
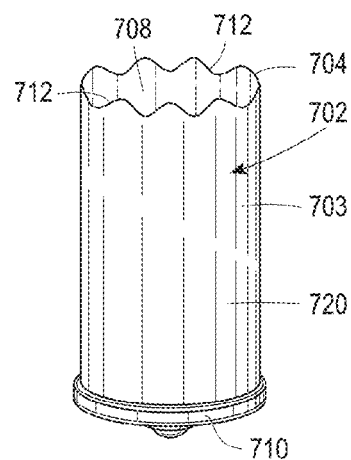
FIG. 6 is a perspective view of an exemplary embodiment of a lighting assembly.

Any number of variations of the shape and size of the side wall 703 of the bulb assembly 702 described above are contemplated. For example, the plane of the top edge portion 704 of the side wall 703 may be disposed at an angle relative to a horizontal reference plane, as illustrated in FIG. 4. Further still, as illustrated in FIG. 5, the top edge portion 704 may be comprised of two or more edge segments 712, and each of the two or more edge segments 712 may be disposed at a different angle than adjacent edge segments 712 to form, for example, a saw-tooth pattern. However, each of the two or more edge segments 712 may be identical such that a pattern is repeated. For example, each of the two or more edge segments 712 may have a semicircular shape or may have a sinusoidal shape, as illustrated in FIG. 6. Further embodiments may have a top edge portion 704 that may have any combination of repeating or non-repeating edge segments 712 that may form any shape or combination of shapes. The maximum height and outer diameter of any of the side walls 703 of the embodiments illustrated in FIG. 4, 5, 6, or any of the embodiments described below may be substantially equal to the bulb height (excluding the screw base) and the maximum outer diameter of a conventional light bulb, such as the A19 light bulb, for example. However, the maximum height H and the maximum outer diameter D may each have any suitable value, including values that do not correspond to the height H and/or the outer diameter D (or the maximum outer diameter) of a conventional light bulb. The bulb assembly 702 may also include a covering element (not shown) that may be at least partially disposed over the side wall 703, and the covering element may be rigidly secured to the bulb base 710 to provide protection to the side wall 703. The covering element may be made from a clear plastic material, for example. Alternatively, the covering element may be made of any material, or have any shape, suitable for a particular application.

Figure 72A:
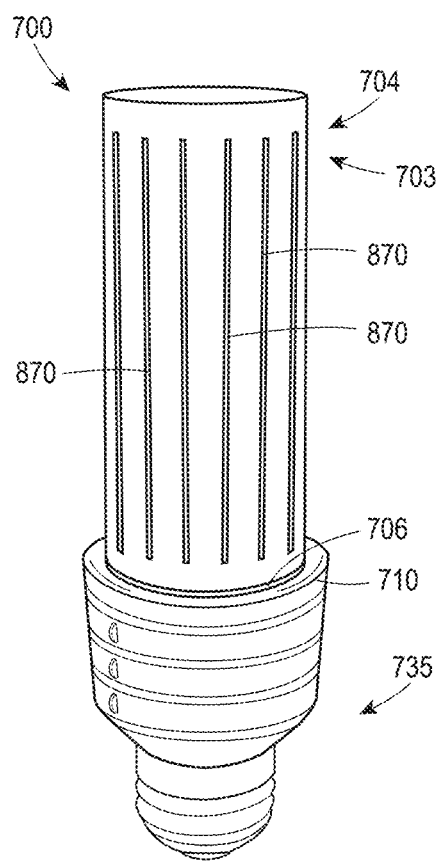
FIG. 72A is a perspective view of an exemplary embodiment of a lighting assembly.
Figure 72B:
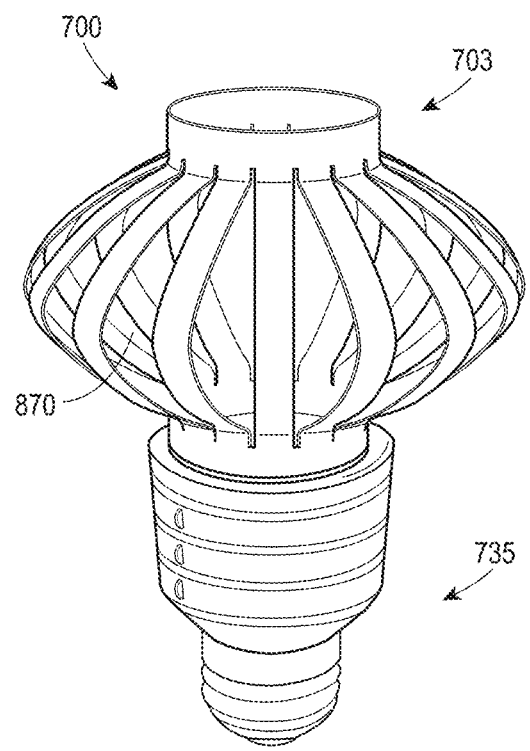
FIG. 72B is a perspective view of the embodiment of FIG. 72A.

As illustrated in FIG. 72A, an embodiment of the side wall 703 may have a plurality of longitudinal slots 870 that may extend to a point adjacent to the top edge portion 704 and to a point adjacent to the bottom edge portion 706. As such, when the top edge portion 704 of the side wall 703 is displaced in a longitudinal direction towards the bottom edge portion 706, the portions of the side wall 703 disposed between the slots 870 outwardly flare in a radial direction, as illustrated in FIG. 72B. The side wall 703 may comprise a memory material that allows the outwardly flared portions of the side wall 703 to remain in a desired position. Alternatively, a support structure, such as a hub (not shown) that is slidably disposed about a central stem, may be used to maintain the side wall 703 in a desired position.

Figures 73A, 73B:
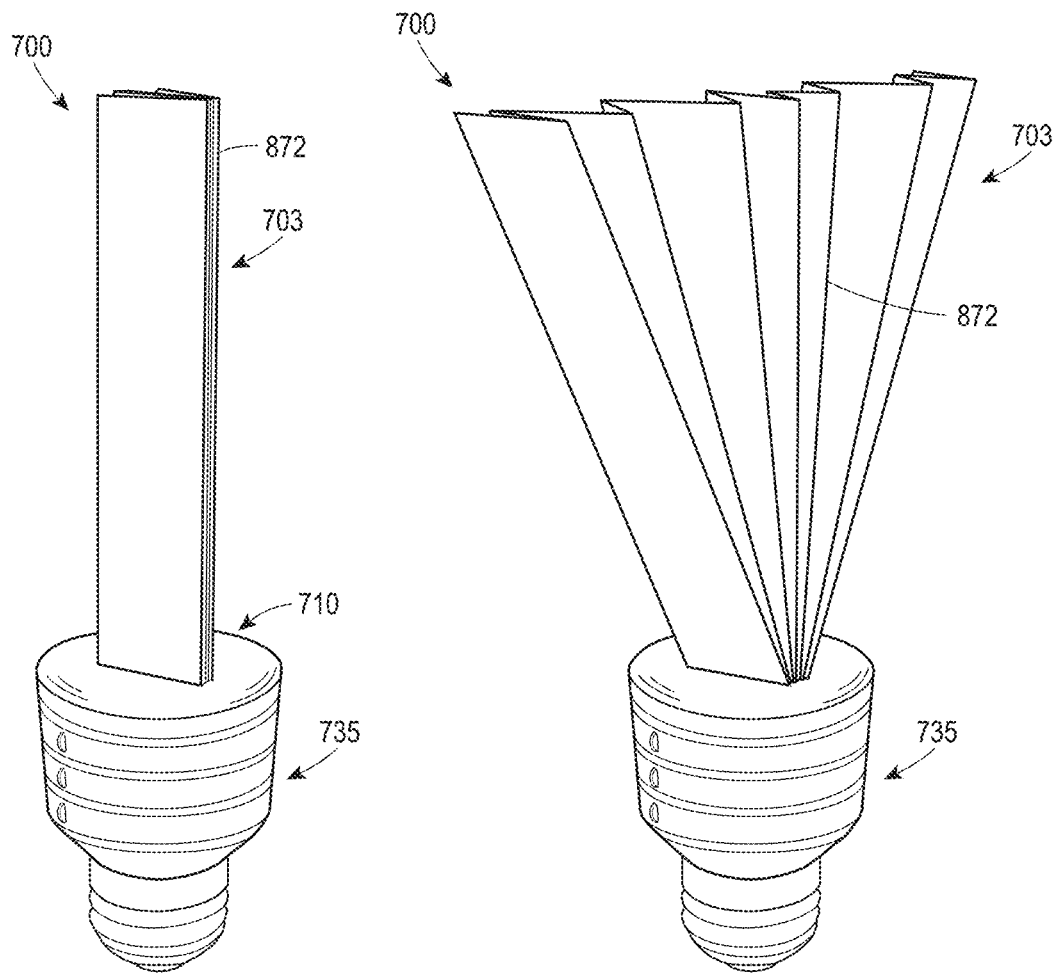
FIG. 73A is a perspective view of an exemplary embodiment of a lighting assembly.
FIG. 73B is a perspective view of the embodiment of FIG. 73A.

In a further embodiment, illustrated in FIGS. 73A and 73B, the side wall 703 may be formed into a fan-like shape by a plurality of alternating folds 872, and a first end of the side wall 703 may be fixed to the bulb base 710 (or the base assembly 735). Accordingly, in a first position illustrated in FIG. 73A, the side wall 703 may extend in a relatively flat configuration along or parallel to the longitudinal axis of the bulb base 710. In a second position illustrated in FIG. 73B, the second end of the side wall 703 may be outwardly displaced relative to the first end, thereby giving the side wall 703 a fan-like shape. The side wall 703 may comprise a memory material that allows the side wall 703 to remain in a desired position. Alternatively, the outermost portions of the side wall 703 may be weighted to allow gravity to maintain the side wall 703 the fan-like shape. Any portion of the first and/or second side of the side wall 703 may be capable of illumination.

Figure 7:
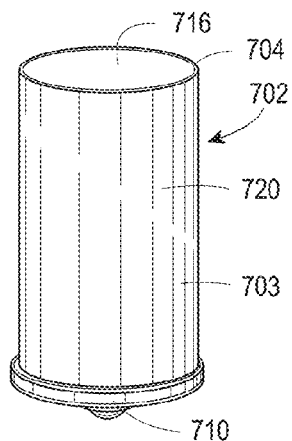
FIG. 7 is a perspective view of an exemplary embodiment of a lighting assembly.

In an additional embodiment, the top edge portion 704 of the side wall 703 may define an opening 708 that may, for example, allow illumination generated on an interior surface 714 of the side wall 703 to be upwardly projected. However, as illustrated in FIG. 7, a substantially horizontal top surface 716 may intersect the top edge portion 704 of the side wall 703 such that the bulb assembly 702 does not have an opening 708. Alternatively, the top surface 716 may be inwardly offset from the top edge portion 704 such that a lip (not shown) extends in the axial direction beyond the top surface 716. In another embodiment of the bulb assembly 702, the top surface 716 may not be horizontal, but may instead be disposed at an angle relative to a horizontal reference plane. Alternatively, the top surface 716 may be contoured or have any other non-planar shape or combination of planar and/or non-planar shapes, for example. More specifically, the top surface may have a conical shape or a semi-spherical shape, for example. The top surface 716 may be coupled to the side wall 703 by an adhesive or by mechanical coupling, such as a tab/slot arrangement or by the use of a collar that attaches to one or more of the side wall 703 or the top surface 716, for example. Alternatively, the side wall 703 and the top surface 716 may be formed from a single piece of material such that the single piece of material can be folded to form both the side wall 703 and the top surface 716.

Figure 8:
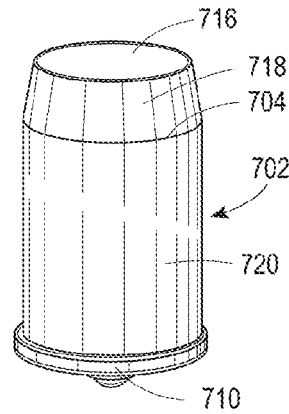
FIG. 8 is a perspective view of an exemplary embodiment of a lighting assembly.

As shown in FIG. 8, the bulb assembly 702 may include a circumferential wall 718 that extends in an axial direction beyond the top edge portion 704 of the side wall 703 to intersect the top surface 716. The circumferential wall 718 may have any suitable shape, such a frustoconical shape or a rounded shape, for example. Moreover, instead of intersecting the top surface 716, the top edge of the circumferential wall 718 may define an opening 708, or the circumferential wall 718 may include an inwardly extending lip that defines an opening 708. The circumferential wall 718 may include a plurality of wall segments (not shown) that collectively comprise the circumferential wall 718, and the wall segments may be planar and/or contoured.

Figure 9:
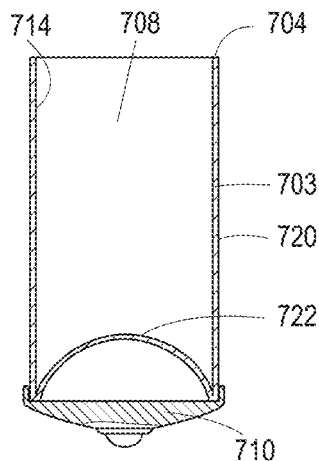
FIG. 9 is a sectional view of an exemplary embodiment of a lighting assembly.
Figure 10:
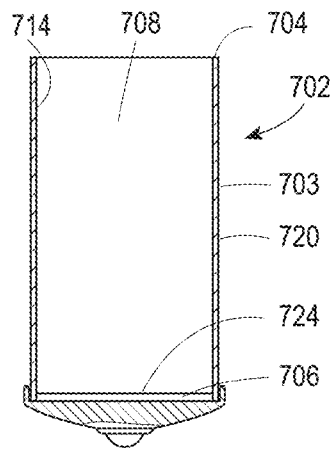
FIG. 10 is a sectional view of an exemplary embodiment of a lighting assembly.

As will be described in more detail below, any portion of the side wall 703 of the bulb assembly 702 may illuminate. For example, in the embodiment illustrated in FIG. 3, an exterior surface 720 of side wall 703 may illuminate in a first color, and the interior surface 714 of the side wall 703 may illuminate in a second color. Alternatively, both the exterior surface 720 and the interior surface 714 may illuminate in the same color. In another embodiment, only the interior surface 714 illuminates. In this configuration, illustrated in FIG. 9, a reflective surface 722 may be disposed in the interior of the cylinder formed by the side wall 703 adjacent to the bulb base 710, and the reflective surface 722 may have a substantially parabolic shape to reflect inwardly directed light from the interior surface 714 of the side wall 703 out of the opening 708. Instead of the parabolic shape shown above, the reflective surface 422 may have any suitable shape or combination of shapes, such as planar, ellipsoidal, hyperbolic, or faceted, for example. Instead of a reflective surface 722, the bulb assembly 702 may include an interior insert 724 that may illuminate to project directed light through the opening 708, as illustrated in FIG. 10. The interior insert 724 may be planar and may be disposed adjacent to, or contacting, the bottom edge portion 706 of the side wall 703. However, the interior insert 724 may be disposed at any axial location in the interior of the side wall 703, and the interior insert 724 may have any shape or combination of shapes suitable to direct light through the opening 708. The interior insert 724, or the reflective surface 722, may have an outer diameter that is slightly smaller than the diameter of the interior surface 714 of the side wall 703. For example, if the outer diameter D of the side wall 703 corresponds to the maximum outer diameter of an A19 incandescent light bulb—approximately 2⅜ inches (60.3 mm)—the outer diameter of the interior insert 724 or the reflective surface 722 may be approximately 2¼ inches (57.2 mm). However, the interior insert 724, or the reflective surface 722, may have any diameter. In further a embodiment of the bulb assembly 702, two of more interior inserts 724 may be disposed within the side wall 703, and the interior inserts 724 may have any shape or size suitable for a particular application. Similarly, two of more reflective surfaces 722 may be disposed within the side wall 703, and the reflective surfaces 722 may have any shape or size suitable for a particular application. Additionally, a combination of reflective surfaces 722 and interior inserts 724 may be disposed in the interior of the side wall 703.

As illustrated in FIGS. 29A, 29B, and 29C, the reflective surface 722 may be secured to an axially displaceable stem 780. However, the reflective surface 722 may be integrally formed with the stem 780. The reflective surface 722 may have an outer diameter that is slightly less than the inner diameter of the side wall 703. However, the reflective surface 722 may have an outer diameter of any suitable size. An axial movement of the stem 780 away from the bulb base 710 may cause light from the illuminated interior surface 714 of the side wall 703 to exit the opening 708 the side wall 703 at an angle relative to a vertical reference axis 782. More specifically, as shown in FIG. 29A, when the stem 780 is in a first position such that a bottom portion of the reflective surface 722 is adjacent to the bulb base 710, light emanating from the opening 708 may be substantially parallel to the vertical reference axis 782. As illustrated in FIG. 29B, when the stem 780 is in a second position such that a bottom portion of the reflective surface 722 is disposed a second distance from the bulb base 710, light emanating from the opening 708 may form a first angle $\checkmark_1$ with the vertical reference axis 782 such that the light emanating from the opening 708 may have a conical shape. The first angle $\checkmark_1$ may be between approximately 1° and 45°, for example. More particularly, the first angle $\checkmark_1$ may be 10°. As illustrated in FIG. 29C, when the stem 780 is in a third position such that a bottom portion of the reflective surface 722 is disposed a third distance from the bulb base 710 that is greater than the second distance, light emanating from the opening 708 may form a second angle $\checkmark_2$ with the vertical reference axis 782 that is greater than the first angle $\checkmark_1$, and the conical shape resulting from the third position has a wider diameter than the conical shape of the second position. The second angle $\checkmark_2$ may be between approximately 5° and 85°, for example. More particularly, the second angle $\checkmark_2$ may be 30°.

The stem 780 of the embodiment of FIGS. 29A, 29B, and 29C may be displaced by any method known in the art. For example, the stem 780 may be threadedly connected to a stationary axial column 784 and a manual rotation of the stem 780 relative to the stationary column 784 may result in axial displacement of the stem 780. However, the stem 780 may be prevented from rotating relative to the side wall 703, and a motor may rotate the column 784 to axially displace the stem 780. A top portion of the stem may be rotatable to control any function of the lighting device, such as the intensity or color of the illuminated light, for example. The embodiment of FIGS. 29A, 29B, and 29C may have any of the functionality described above. For example, any or all of the surfaces of the side wall may illuminate, such as the interior surface 714 only or the exterior surface 720 only.

In the embodiment illustrated in FIGS. 30A, 30B, and 30C, the reflective surface 722 may be disposed on an axially displaceable element 786. The displaceable element 786 may have a conical shape, a parabolic shape, or any other suitable shape. The displaceable element 786 may have an outer diameter that is slightly smaller than the diameter of the interior surface 714 of the side wall 703. For example, if the outer diameter of the side wall 703 corresponds to the maximum outer diameter of an A19 incandescent light bulb—approximately 2⅜ inches (60.3 mm)—the outer diameter of the displaceable element 786 may be approximately 2¼ inches (57.2 mm). However, the displaceable element 786 may have an outer diameter of any suitable size. The axial movement of the displaceable element 786 away from the bulb base 710 may cause light from the illuminated interior surface 714 of the side wall 703 to exit the opening 708 the side wall 703 at an angle relative to a vertical reference axis in the manner described above. More specifically, as shown in FIG. 30A, when the displaceable element 786 is in a first position such that a bottom portion of the displaceable element 786 is adjacent to the bulb base 710, light emanating from the opening 708 may be substantially parallel to a vertical reference axis 782. As illustrated in FIG. 30B, when the displaceable element 786 is in a second position such that a bottom portion of the displaceable element 786 is disposed a second distance from the bulb base 710, light emanating from the opening 708 may form a first angle $\checkmark_1$ with the vertical reference axis 782 such that the light emanating from the opening 708 may have a conical shape. The first angle $\checkmark_1$ may be between approximately 1° and 45°, for example. More particularly, the first angle $\checkmark_1$ may be 10°. As illustrated in FIG. 30C, when the displaceable element 786 is in a third position such that a bottom portion of the displaceable element 786 is disposed a third distance from the bulb base 710 that is greater than the second distance, light emanating from the opening 708 may form a second angle $\checkmark_2$ with the vertical reference axis 782 that is greater than the second angle $\checkmark_2$, and the conical shape resulting from the third position has a wider diameter than the conical shape of the second position. The second angle $\checkmark_2$ may be between approximately 5° and 85°, for example. More particularly, the second angle $\checkmark_2$ may be 30°. The displaceable element 786 may be displaced by any method known in the art. For example, the displaceable element 786 may be threadedly connected to a stationary axial column 784. The displaceable element 786 may be prevented from rotating relative to the side wall 703, and a motor may rotate the column 784 to axially displace the stem 780. The embodiment of FIGS. 30A, 30B, and 30C may have any of the functionality described above. For example, any or all of the surfaces of the side wall may illuminate, such as the interior surface 714 only or the exterior surface 720 only.

Figure 11:
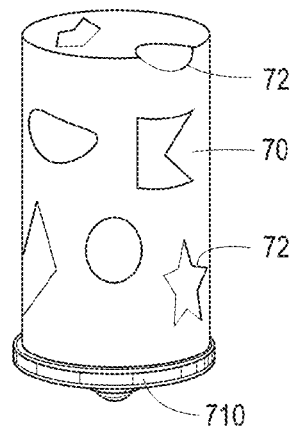
FIG. 11 is a perspective view of an exemplary embodiment of a lighting assembly.

As illustrated in FIG. 11, one or more windows 726 may be disposed any or both of the side wall 703 and the top surface 716. Each of the one or more windows 726 may have any shape or combination of shapes, such as that shape of a star, an oval, a circle, or a polygon. Additionally, one of more of the windows 726 may take the shape of letters, symbols, logos, words, or numbers. In an embodiment of the bulb assembly 702, one or more windows 726 may be disposed on the side wall 703, and the side wall 703 may be illuminated on the interior surface 714 only. The total surface area of the one or more windows 726 may comprise a percentage of the overall available surface area of the side wall 703 (i.e., the total surface area of the side wall 703 if no windows 726 were present), and this percentage may be any suitable value. For example, the total surface area of the windows 726 illustrated in FIG. 11 may comprise 25% the overall available surface area of the side wall 703.

Figure 12:
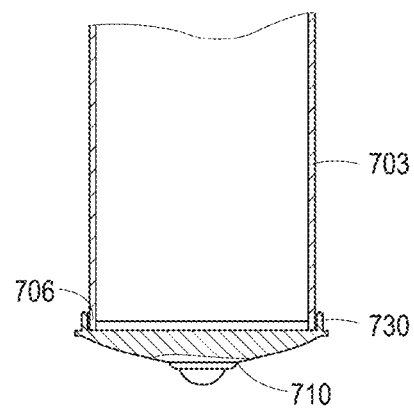
FIG. 12 is a sectional view of an exemplary embodiment of a lighting assembly.

As briefly discussed above, the bottom edge portion 706 of the side wall 703 may be coupled to a bulb base 710, which will be described in more detail below, by any manner known in the art, such as by an adhesive or a mechanical coupling, for example. More specifically, as illustrated in FIG. 12, a portion of the side wall 703 adjacent to the bottom edge portion 706 may be adhesively secured to an upwardly-projecting circumferential ridge 730 of the bulb base 710. As shown, an interior surface of the ridge 730 may be adhesively coupled to the exterior surface 720 of the side wall 703, but an exterior surface of the ridge 730 may be adhesively coupled to the interior surface 714 of the side wall 703. Alternatively, tabs (not shown) extending from the bottom edge portion 706 of the side wall 703 may be received into elongated slots (not shown) formed on a surface of the bulb base 710. In addition, one or more inwardly-directed features, such as a post or a stub, may project from an interior surface of the bulb base 710, and each inwardly-directed feature of the bulb base 710 may be received into an aperture disposed adjacent to the bottom edge portion 706 of the side wall 703. In an alternate embodiment, one or more plastic tabs (not shown) may be secured to side wall 703 adjacent the bottom edge portion 706 by any means known in the art, such as by adhesives or by mechanical fastening, and the plastic tabs may be received into tab slots (not shown) formed in the bulb base 710. In a further embodiment of the bulb assembly 702, a collar (not shown) may be coupled to the bulb base 710 in a manner that secures a portion of the side wall 703, such as, for example, an outwardly-extending tab disposed adjacent to the bottom edge portion 706 of the side wall 703. The collar may be coupled to the bulb base 710 by a tab/slot connection or by a threaded connection, for example.

As will be described in more detail below, the side wall 703 (and the top surface 716 and circumferential wall 718) may be electrically coupled to the bulb base 710 by any means known in the art. For example, one or more male pins or blades may downwardly project from the bottom edge portion 706 of the side wall 703, and the male pins or blades may be received into receptacles or slots formed in the bulb base.

Figure 22:
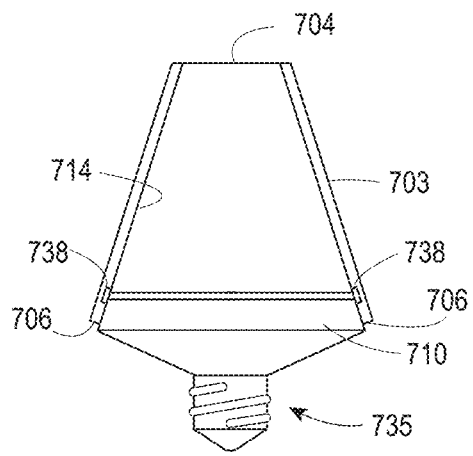
FIG. 22 is a sectional view of an exemplary embodiment of a lighting assembly.

In the embodiment illustrated in FIG. 22, the side wall 703 may be removably placed on the bulb base 710, which may be integrally formed with a base assembly 735. As will be described in more detail below, the base assembly 735 is adapted to couple to any source of power to allow the side wall 703 to illuminate. For example, as illustrated in FIG. 22, the base assembly 735 includes a lower portion having an Edison screw for coupling to a power source. The side wall 703 of the bulb assembly 702 may have a truncated converging frustoconical shape, and a circumferential conducting strip 738 may be disposed adjacent to the bottom edge portion 706 of the side wall 703. The diameter of the bottom edge portion 706 and the top edge portion 704 of the side wall 703 may have any value, with the diameter of the bottom edge portion 706 being greater than the diameter of the top edge portion 704. For example, the diameter of the bottom edge portion 706 may be approximately equal to the maximum outer diameter of an A19 incandescent light bulb—approximately 2⅜ inches (60.3 mm), and the diameter of the top edge portion 704 may be approximately 1¾ inches (44.5 mm). The bulb base 710 may have a truncated converging frustoconical shape that generally corresponds to the shape of the side wall 703 such that the interior surface 714 of the side wall 703 adjacent to the bottom edge portion 706 may snugly fit over a circumferential exterior surface 740, thereby coupling the side wall 703 to the bulb base 710. The bulb base 710 may have a maximum outer diameter that is any suitable value. For example, the maximum outer diameter may be approximately equal to or slightly larger than the diameter of the bottom edge portion 706. In addition, one or more magnets may be disposed on the bulb base 710 and the side wall 703 to mutually secure the side wall 703 to the bulb base 710. Alternatively, one or more ridges (or detents) may be formed on one of the side wall 703, and the one or more ridges may engage corresponding ridges (or detents) formed on the bulb base 710. So assembled, a conducting strip 742 disposed around the circumference of the bulb base 710 may contact the conducting strip 738 disposed on the side wall 703 such that the side wall 703 is electrically coupled to the bulb base 710.

Figure 13:
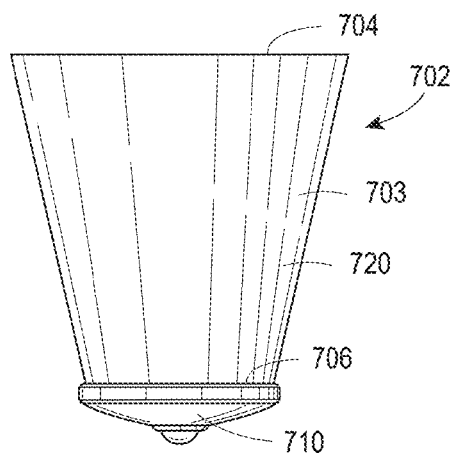
FIG. 13 is a side view of an exemplary embodiment of a lighting assembly.

In a further embodiment illustrated in FIG. 13, the side wall 703 of the bulb assembly 702 may have a substantially diverging frustoconical shape instead of the cylindrical shape illustrated in FIG. 3. More specifically, the side wall 703 may include a top edge portion 704 having a diameter that is greater than the diameter of a bottom edge portion 706. For example, the diameter of the top edge portion 704 may be approximately equal to the maximum outer diameter of an A19 incandescent light bulb—approximately 2⅜ inches (60.3 mm), and the diameter of the bottom edge portion 706 may be approximately 1¾ inches (44.5 mm). However, other than the difference in the shape of the side wall 703, the bulb assembly 702 of FIG. 13 may be substantially identical to the embodiment of the bulb assembly 702 illustrated in FIG. 3, and the bulb assembly 702 of FIG. 13 may include any or all of the features of the embodiment of FIG. 3 that are discussed above. For example, as illustrated in FIG. 13, the top edge portion 704 of the frustoconically-shaped side wall 703 may be confined to a plane, and the plane may be substantially horizontal. Alternatively, the plane may be disposed at an angle relative to a horizontal reference plane, similar to the embodiment illustrated in FIG. 4. In addition, the embodiment of the bulb assembly 702 having a frustoconically-shaped side wall 703 may also include, for example, edge segments 712 along the top edge portion 704, a circumferential wall 718, a reflective surface 722, and interior insert 724, and/or one or more windows 726. Moreover, the functionality of the embodiment of the bulb assembly 702 having a frustoconically-shaped side wall 703 may be identical to the functionality of the embodiment of the bulb assembly 702 illustrated in FIG. 3 that is discussed above. For example, any or both of the interior surface 714 or the exterior surface 720 of the side wall may illuminate in the manner discussed above.

Figure 14:
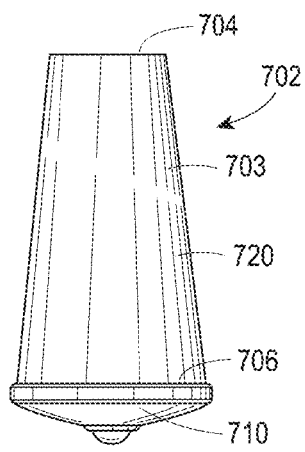
FIG. 14 is a side view of an exemplary embodiment of a lighting assembly.

In a further embodiment illustrated in FIG. 14, the side wall 703 of the bulb assembly 702 may have a substantially converging frustoconical shape instead of the cylindrical shape illustrated in FIG. 3. More specifically, the side wall 703 may include a top edge portion 704 having a diameter that is less than the diameter of a bottom edge portion 706. For example, the diameter of the bottom edge portion 706 may be approximately equal to the maximum outer diameter of an A19 incandescent light bulb—approximately 2⅜ inches (60.3 mm), and the diameter of the top edge portion 704 may be approximately 1¾ inches (44.5 mm). However, other than the difference in the shape of the side wall 703, the bulb assembly 702 of FIG. 14 may be substantially identical to the embodiment of the bulb assembly 702 illustrated in FIG. 3, and the bulb assembly 702 of FIG. 14 may include any or all of the features of the embodiment of FIG. 3 that are discussed above. For example, as illustrated in FIG. 14, the top edge portion 704 of the frustoconically-shaped side wall 703 may be confined to a plane, and the plane may be substantially horizontal. Alternatively, the plane may be disposed at an angle relative to a horizontal reference plane, similar to the embodiment illustrated in FIG. 4. In addition, the embodiment of the bulb assembly 702 having a frustoconically-shaped side wall 703 may also include, for example, edge segments 712 along the top edge portion 704, a circumferential wall 718, a reflective surface 722, and interior insert 724, and/or one or more windows 726. Moreover, the functionality of the embodiment of the bulb assembly 702 having a frustoconically-shaped side wall 703 may be identical to the functionality of the embodiment of the bulb assembly 702 illustrated in FIG. 3 that is discussed above. For example, any or both of the interior surface 714 or the exterior surface 720 of the side wall may illuminate in the manner discussed above.

Figure 15:
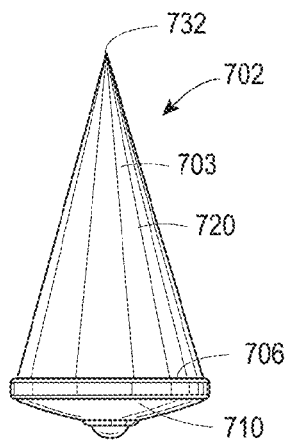
FIG. 15 is a side view of an exemplary embodiment of a lighting assembly.

In a still further embodiment illustrated in FIG. 15, the side wall 703 of the bulb assembly 702 may have a substantially conical shape instead of the converging frustoconical shape described above. More specifically, the cross-sectional diameter of the side wall 703 may constantly reduce in an axial direction from the bottom edge portion 706 to a tip 732 disposed at the topmost portion of the side wall 703. The height and diameter of the cone may have any suitable values. For example, the diameter of the bottom edge portion 706 may be approximately equal to the maximum outer diameter of an A19 incandescent light bulb—approximately 2⅜ inches (60.3 mm), and the height of the cone may be approximately equal to the height of an A19 incandescent light bulb—approximately 3½ inches (88.9 mm). Other than the difference in the shape of the side wall 703, the bulb assembly 702 of FIG. 15 may be substantially identical to the embodiment of the bulb assembly 702 illustrated in FIGS. 3 and 14. For example, the embodiment of the bulb assembly 702 having a conically-shaped side wall 703 may also include one or more windows 726. Moreover, the functionality of the embodiment of the bulb assembly 702 having a conically-shaped side wall 703 may be identical to the functionality of the embodiment of the bulb assembly 702 illustrated in FIG. 3 that is discussed above. For example, any or both of the interior surface 714 or the exterior surface 720 of the side wall may illuminate in the manner discussed above.

Figure 16A:
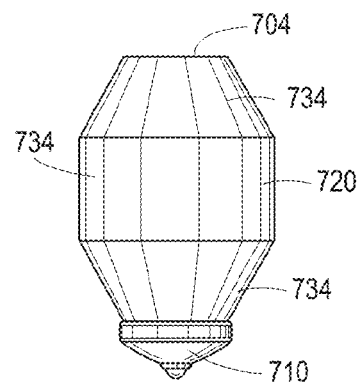
FIG. 16A is a side view of an exemplary embodiment of a lighting assembly.
Figure 16B:
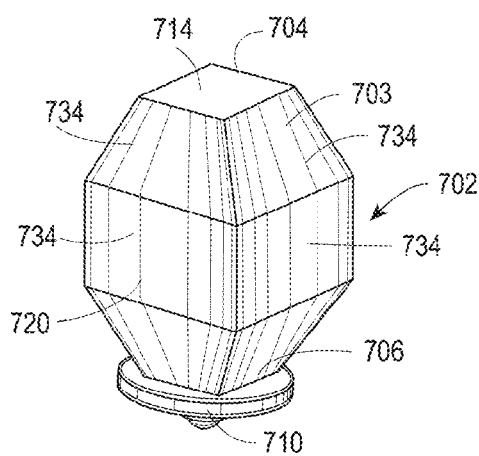
FIG. 16B is a perspective view of the embodiment of FIG. 16A.

In a further embodiment illustrated in FIGS. 16A and 16B, the side wall 703 of the bulb assembly 702 may be comprised of a plurality of faceted surfaces 734. The side wall 703 may include any number of faceted surfaces 734, and the side wall 703 may take on any overall shape. For example, as illustrated in FIGS. 16A and 16B, a top portion of the side wall 703 may take the shape of a truncated converging pyramid, an intermediate portion of the side wall 703 may take the shape of a cube, and a lower portion of the side wall 703 may take the shape of a truncated diverging pyramid. However, other than the difference in the shape of the side wall 703, the bulb assembly 702 of FIGS. 16A and 16B may be substantially identical to the embodiment of the bulb assembly 702 illustrated in FIG. 3, and the bulb assembly 702 of FIGS. 16A and 16B may include any or all of the features of the embodiment of FIG. 3 that are discussed above. For example, as illustrated in FIGS. 16A and 16B, the top edge portion 704 of the frustoconically-shaped side wall 703 may be confined to a plane, and the plane may be substantially horizontal. In addition, the embodiment of FIGS. 16A and 16B may also include, for example, edge segments 712 along the top edge portion 704, a circumferential wall 718, a reflective surface 722, and interior insert 724, and/or one or more windows 726. Moreover, the functionality of the embodiment of the bulb assembly 702 of FIGS. 16A and 16B may be identical to the functionality of the embodiment of the bulb assembly 702 illustrated in FIG. 3 that is discussed above. For example, any or both of the interior surface 714 or the exterior surface 720 of the side wall may illuminate in the manner discussed above.

Figure 17:
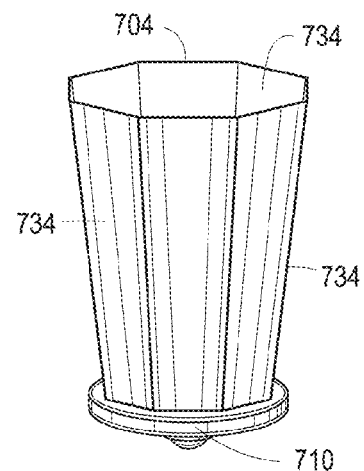
FIG. 17 is a perspective view of an exemplary embodiment of a lighting assembly.
Figure 18:
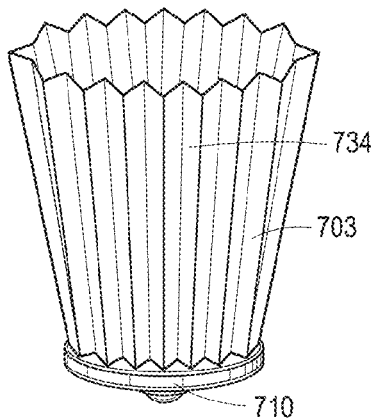
FIG. 18 is a perspective view of an exemplary embodiment of a lighting assembly.

In a further embodiment of a bulb assembly 702 having faceted surfaces 734, the faceted surfaces 734 illustrated in FIG. 17 of the side wall 703 may form a converging, truncated conical shape that may be substantially identical to the embodiment of FIG. 13 having a diverging frustoconically-shaped side wall 703. Alternatively, the faceted surfaces illustrated in FIG. 17 may be substantially horizontal such that the cross-section shape of the side wall 703 is constant along the longitudinal axis of the side wall 703. Further, as illustrated in FIG. 18, the side wall 703 may include longitudinally disposed faceted surfaces 734 that are disposed at an angle relative to adjacent faceted surfaces 734, and the longitudinally disposed faceted surfaces 734 may be vertical or may be disposed at an angle relative to a vertical reference axis so as to converge or diverge as the side wall 703 axially extends away from the bulb base 710. Although the faceted surfaces above are substantially planar, one or more of the faceted surfaces 734 may be contoured, curved, or otherwise non-planar. In any of embodiments discussed above, the maximum outer diameter and the overall height of the side wall 703 may have any value. For example, the maximum outer diameter of the side wall 703 may be approximately equal to the maximum outer diameter of an A19 incandescent light bulb—approximately 2⅜ inches (60.3 mm), and the overall height of the side wall 703 may be approximately equal to the maximum height of an A19 incandescent light bulb—approximately 3½ inches (88.9 mm).

Figure 19:
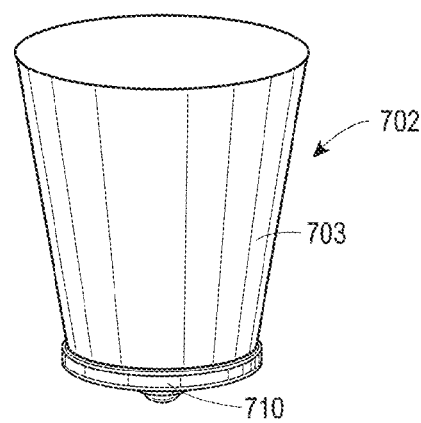
FIG. 19 is a perspective view of an exemplary embodiment of a lighting assembly.
Figure 21:
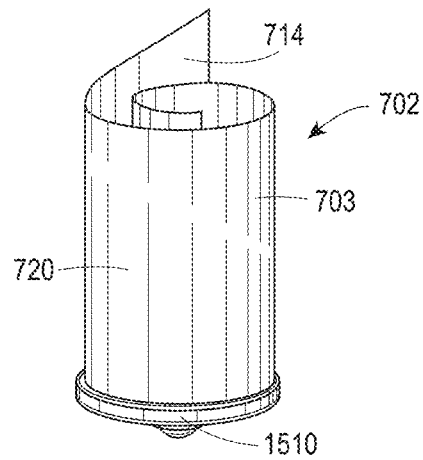
FIG. 21 is a perspective view of an exemplary embodiment of a lighting assembly.
Figures 74, 81:
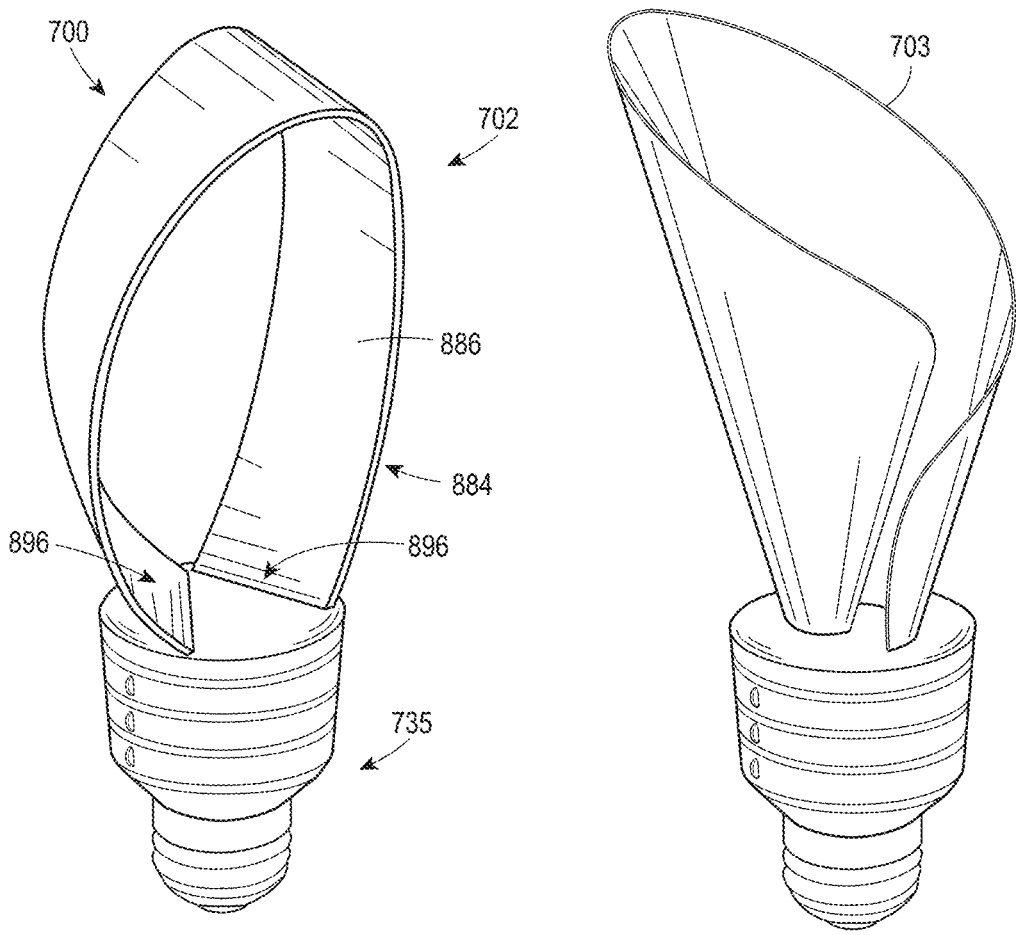
FIG. 74 is a perspective view of an exemplary embodiment of a lighting assembly.

In a still further embodiment of the bulb assembly 702, the side wall 703 may have the shape of an oval, as shown in FIG. 19, or any other non-circular shape. Such a non-circular shape may be substantially cylindrical or may converge towards the bulb base 710 or diverge away from the bulb base 710. In addition, the side wall 703 may have a cross-sectional shape that may include both planar and curved surfaces. Moreover, the side wall 703 may have a non-uniform cross-sectional shape such that the cross-sectional shape changes along the longitudinal axis of the side wall 703. For example, as illustrated in FIG. 21, the side wall may have a substantially spiral shape, and the interior surface 714 of the side wall 703 may illuminate in a first color and the exterior surface 720 may illuminate in a second color. In an alternative embodiment, the spiral-shaped side wall 703 may be formed from a sheet having a circular, ovular, or other rounded shape, as illustrated in FIG. 74. Other than the difference in the shape of the side wall 703, the bulb assembly 702 of FIGS. 19 and 83 may be substantially identical to the embodiment of the bulb assembly 702 illustrated in FIG. 3, and the bulb assembly 702 of FIGS. 19 and 21 may include any or all of the features of the embodiments that are discussed above. In any of embodiments discussed above, the maximum outer diameter and the overall height of the side wall 703 may have any value. For example, the maximum outer diameter of the side wall 703 may be approximately equal to the maximum outer diameter of an A19 incandescent light bulb—approximately 2⅜ inches (60.3 mm), and the overall height of the side wall 703 may be approximately equal to the maximum height of an A19 incandescent light bulb—approximately 3½ inches (88.9 mm).

Figure 20:
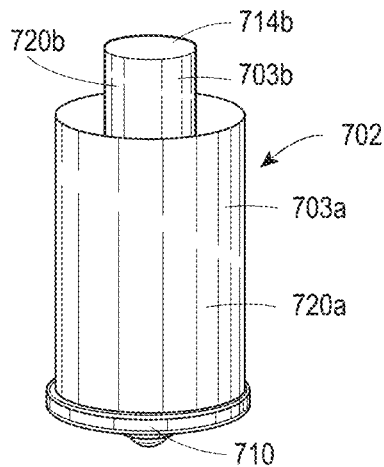
FIG. 20 is a perspective view of an exemplary embodiment of a lighting assembly.

In a still further embodiment illustrated in FIG. 20, more than one side wall 703 may be included in the bulb assembly 702. For example, a cylindrical first side wall 703a having a first diameter may be secured to the bulb base 710 in a manner previously described. A cylindrical second side wall 703b having a second diameter that is smaller than the first diameter may also be coupled to the bulb base 710 in any known manner such that the axes of the first side wall 703 and the second side wall 703 are co-axially aligned. However, the first side wall 703a and the second side wall 703b may each have any suitable cross-sectional shape and may be axially offset. In addition, the second side wall 703*b* may extend beyond the first side wall 703*a* in the axial direction, as illustrated in FIG. 20. Alternatively, the first side wall 703*a* and the second side wall 703*b* may have any suitable height. For example, the maximum outer diameter of the first side wall 703*a* may be approximately equal to the maximum outer diameter of an A19 incandescent light bulb—approximately 2⅜ inches (60.3 mm), and the overall height of the second side wall 703*b* may be approximately equal to the maximum height of an A19 incandescent light bulb—approximately 3½ inches (88.9 mm). In addition, one or more additional side walls (not shown) may also be secured to the bulb is 710, and the one or more additional side walls may have any suitable size, shape, or relative orientation.

Other than the difference in the shape of the side wall 703, the bulb assembly 702 of FIG. 20 may be substantially identical to the embodiment of the bulb assembly 702 illustrated in FIG. 3, and the bulb assembly 702 of FIG. 20 may include any or all suitable features or functions of the embodiments that are discussed above. For example, the exterior surface 720*a* of the first side wall 703*a* may illuminate in a first color, and the exterior surface 720*b* of the second side wall 703*b* may illuminate in a second color. In addition, any or all of the side walls 703*a*, 703*b* may have one or more windows 726 having any suitable shape. As an additional example, a reflective surface 720 may be disposed within the interior of the second side wall 703*b*, and the interior surface 714*b* of the second side wall 703*b* may illuminate to provide focused lighting at a point above the device 700. While the interior surface 714*b* of the second side wall 703*b* is illuminated, the exterior surface 720*a* of the first side wall 703*a* may be illuminated and dimmed.

Figure 23:
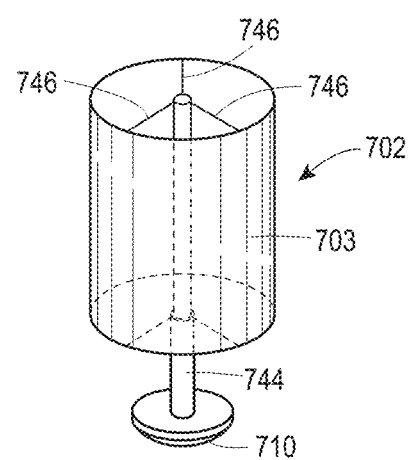
FIG. 23 is a perspective view of an exemplary embodiment of a lighting assembly.
Figure 24:
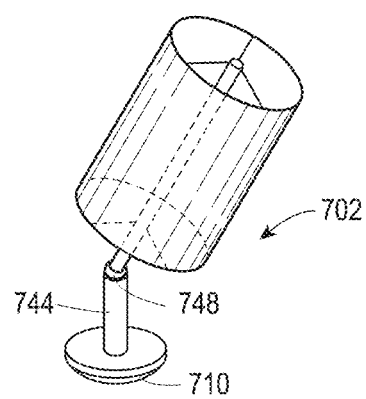
FIG. 24 is a perspective view of an exemplary embodiment of a lighting assembly.

In a still further embodiment illustrated in FIG. 23, a stem 744 may upwardly extend from the bulb base 710, and the stem 744 may be formed as a unitary part with at least a portion of the bulb base 710 or may be secured to the bulb base 710. A plurality of rods 746 may radially extend from the stem 744 to support a cylindrical side wall 503, and the electrical connections coupling the bulb base 710 to the side wall 703 may be extend within the interior of the stem 744 and at least one of the rods. Instead of a single cylindrical side wall 703, the side wall 503 may have any shape and two or more side walls 503 may be used as illustrated in FIG. 20. Any of the functionality and features described above may also be incorporated into the bulb assembly 702 illustrated in FIG. 23. In addition, as shown in FIG. 24, a hinge 748 may be disposed along the length of the stem 744 adjacent to the bulb base 710 such that a lower portion of the stem 744 may be pivoted relative to an upper portion of the stem 744.

In a further embodiment, the side wall 703 may convert from a substantially cylindrical shape to a substantially frustoconical shape, and vice versa. For example, in the embodiment illustrated in FIGS. 25A and 25B, a semi-cylindrical first side wall 703*a* may be coupled to a semi-cylindrical second side wall 703*b* about a pair of oppositely-disposed hinges 750 such that the first and second side walls 703*a*, 703*b* have a substantially cylindrical shape. The hinges 750 may secure the first and second side walls 703*a*, 703*b* to a cylindrical side wall portion 703*c*, and the inner diameter of the first and second side walls 703*a*, 703*b* may be slightly greater than the outer diameter of the cylindrical side wall portion 703*c*. So configured, each of the first and second side walls 703*a*, 703*b* may pivot about the hinges 750 such that the first and second side walls 703*a*, 703*b* have a substantially frustoconical shape. The hinges 750 may be tightly secured around the first and second side walls 703*a*, 703*b* and the cylindrical portion 703*c* such that friction maintains the first and second side walls 703*a*, 703*b* in a desired position. The hinges may also form one or more electrical connections between the first and second side walls 703*a*, 703*b*.

Figure 25A:
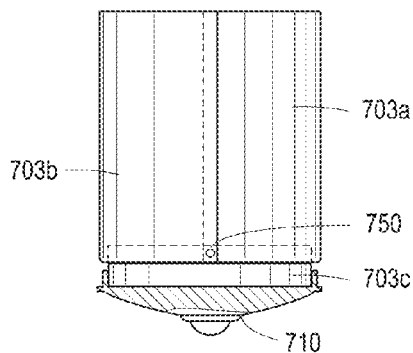
FIG. 25A is a side view of an exemplary embodiment of a lighting assembly.
Figure 25B:
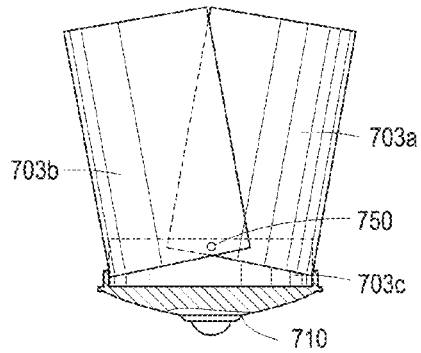
FIG. 25B is a side view of an alternate configuration of the embodiment of FIG. 25A.

Still referring to FIGS. 25A and 25B, the first and second side walls 703*a*, 703*b* may be pivoted to a desired position in any manner known in the art. For example, the first and second side walls 703*a*, 703*b* may be manually pivoted to a desired position. Alternatively, a mechanical coupling between the bulb base 710 (or the base assembly 735 if the bulb base 710 and the base assembly 735 are formed as a single unit) and the first and second side walls 703*a*, 703*b* may pivot the first and second side walls 703*a*, 703*b* into a desired position. For example, a rotating collar (not shown) may be threadedly coupled to the bulb base 710 such that rotation of the collar relative to the bulb base 710 results in an axial displacement of the collar. Specifically, each of the first and second side walls 703*a*, 703*b* may be fixed to the collar at a location between the hinges 750, and a rotation of the collar relative to the bulb base 710 causes the points of the first and second side walls 703*a*, 703*b* fixed to the collar to upwardly or downwardly displace, thereby pivoting the first and second side walls 703*a*, 703*b* into a desired position. The collar may be manually rotated, or may be rotated by a motor disposed within or external to the bulb base 710. The motor may be triggered by a switch, a timer, a light sensor, voice command, or by any method known in the art.

Figure 26:
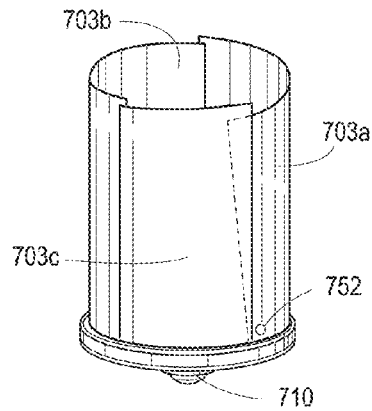
FIG. 26 is a perspective view of an exemplary embodiment of a lighting assembly.

Although first and second side walls 703*a*, 703*b* were discussed above, any number or shape of side walls may be used. For example, in the embodiment illustrated in FIG. 26, first, second, and third side walls 703*a*, 703*b*, 703*c* may be used. Moreover, any means to move the first and second side walls 703*a*, 703*b* (or any additional side walls) from a substantially cylindrical shape to a substantially frustoconical shape may be incorporated in the device 500. For example, an elongated handle (not shown) may extend through the interior of the side walls 703, and a rigid rod (not shown) may be pivotaby secured to the handle and each side wall such that when the handle is axially displaced (either manually or by other means), the rod may push or pull the side walls into a desired position. Telescoping actuators that radially extend from a central axial stem to pivot the side walls 703 are also contemplated, as are levers that pivot the side walls 703 relative to the bulb base 710, for example.

Figure 27A:
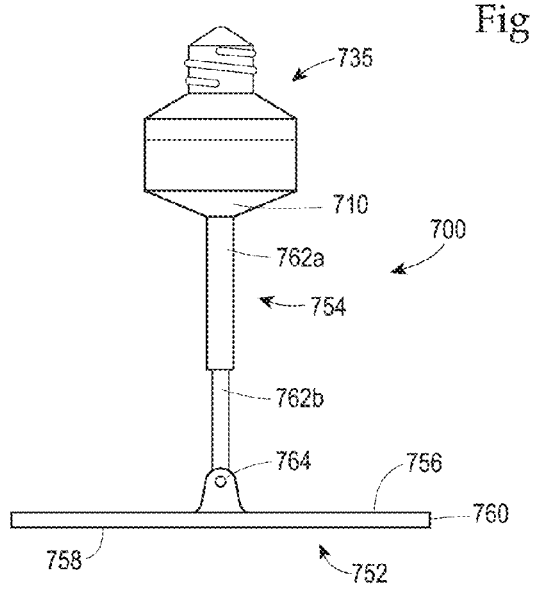
FIG. 27A is a side view of an exemplary embodiment of a lighting assembly.
Figure 27B:
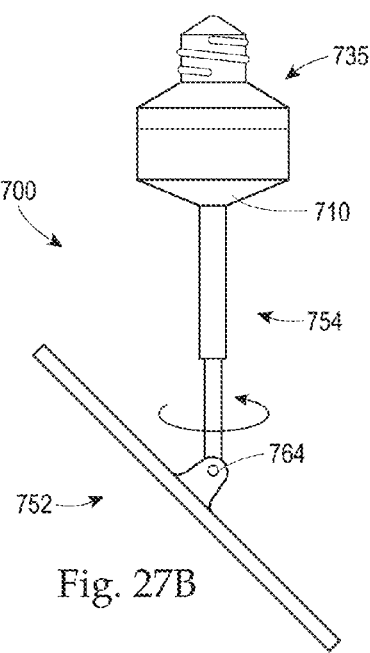
FIG. 27B is a side view of an alternate configuration of the embodiment of FIG. 27A.

In the embodiment illustrated in FIGS. 27A and 27B, an illuminating element 752 is disposed at a distal end of an elongated stem 754. The illuminating element 752 may be substantially planar, and may have the overall shape of a disk. For example, the disk may have a diameter greater than the standard diameter of a conventional recessed lighting canister. That is, if the recessed lighting canister has a diameter of 5 inches (127 mm), the illuminating element 752 may have a diameter of 7 inches (177.8 mm). In some embodiments, the illuminating element may have a diameter (or maximum dimension) of about 3 cm to about 50 cm; alternately from about 5 cm to about 40 cm; alternately from about 10 cm to about 30 cm; alternately from about 15 cm to about 30 cm; alternately from about 15 cm to 50 cm; alternately from about 15 cm to 25 cm, alternately from about 20 cm to 40 cm, alternately from about 20 cm to 50 cm; alternately from about 25 cm to 50 cm. The illuminating element may have two illuminating surfaces. The illuminating surfaces may be generally planar, may be convex, concave, or some combination of planar, convex, and concave. Each of the illuminating surfaces may have a similar or same surface area as another. In particular, each illuminating surface may have a surface area of about 7 cm² to about 2000 cm²; alternately from about 20 cm² to about 1300 cm²; alternately from about 75 cm² to about 700 cm²; alternately from about 175 cm² to about 700 Cm²; alternately from about 175 cm² to about 2000 cm²; alternately from about 175 cm² to about 500 cm²; alternately from about 300 cm² to about 1300 cm²; alternately from about 300 cm² to about 2000 cm²; alternately from about 500 cm² to 2000 cm². However, the illuminating element 752 may have any size, shape, or combination of shapes suitable for a desired application. For example, instead of a disk, the illuminating element 752 may have a square shape. The illuminating element 752 may have a top portion 756, a bottom portion 758, and a circumferential side portion 760, and any of these surfaces may be capable of illuminating.

Still referring to FIGS. 27A and 27B, the stem 754 may extend from the bulb base 710, and the bulb base 710 may be integrally formed with the base assembly 735. The stem 754 may include a first stem portion 762a that extends from the bulb base 710 and a second stem portion 762b extends from the first stem portion 762a. More particularly, the second stem portion 762b may telescopically extend from the first stem portion 762a such that the overall axial length of the stem 754 may be adjustable. For example, the maximum overall axial length of the stem 754 may be greater than the depth of a conventional recessed-lighting canister. For example, a recessed lighting canister may have a depth of about 7 cm to about 8 cm, and the stem may have an axial length of about 7 cm to about 30 cm; alternately, the recessed lighting canister may have a depth of about 10 cm and the stem may have an axial length of about 10 cm to about 35 cm; alternately, the recessed lighting canister may have a depth of about 12 cm to about 13 cm and the stem may have an axial length of about 12 cm to about 40 cm; alternately, the recessed lighting canister may have a depth of about 15 cm and the stem may have an axial length of about 15 cm to about 45 cm. In any event, the stem, whether fixed or extendable, may have an overall length from about 5 cm to about 100 cm; alternately from about 5 cm to about 50 cm; alternately from about 5 cm to about 40 cm; alternately from about 5 cm to about 75 cm; alternately from about 15 cm to about 100 cm; alternately from about 15 cm to about 75 cm; alternately from about 15 cm to about 50 cm; alternately from about 15 cm to about 35 cm; alternately from about 25 cm to about 100 cm; alternately from about 25 cm to 50 cm; alternately from about 25 cm to about 40 cm. Moreover, the second stem portion 762b may rotate relative to the first stem portion 762a. This relative rotation (or length adjustment) may trigger or adjust a function of the device, such as dimming or brightening the illumination of the top portion 756, the bottom portion 758, or the side portion 760 of the illuminating element 752, as well as illuminating or de-illuminating any of the portions 756, 758, 760. In some embodiments, the first stem portion may rotate as much as 360 degrees with relative to the second stem portion; alternately as much as 330 degrees; alternately as much as 300 degrees; alternately as much as 270 degrees; alternately as much as 240 degrees; alternately as much as 210 degrees; alternately as much as 180 degrees; alternately as much as 150 degrees; alternately as much as 120 degrees; alternately as much as 90 degrees; alternately as much 60 degrees; alternately as much as 30 degrees. However, the stem 754 may be rigid with no functional capabilities. A hinge 764 may couple the illuminating element 752 to the second stem portion 762b, thereby allowing the illuminating element 752 to pivot relative to the stem 754. However, the illuminating element 752 may be rigidly fixed to the second stem portion 762b, and the hinge may be disposed at any desirable location along the stem 754. Alternatively, no hinge may be included, and the illuminating element 752 may be non-pivotable relative to the stem 754. In operation, the base assembly 735 may be inserted into a socket in a recessed lighting cavity, and the illuminating element 752 may be rotated such that the illuminated bottom portion 758 provides directed lighting to a desired area, for example.

Figure 75B:
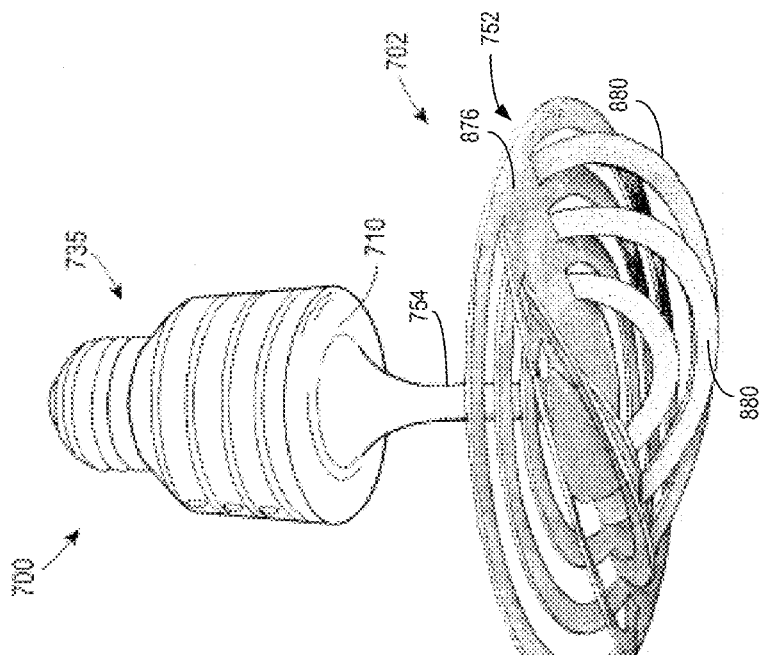
FIG. 75B is a perspective view of the embodiment of FIG. 75A.
Figure 75A:
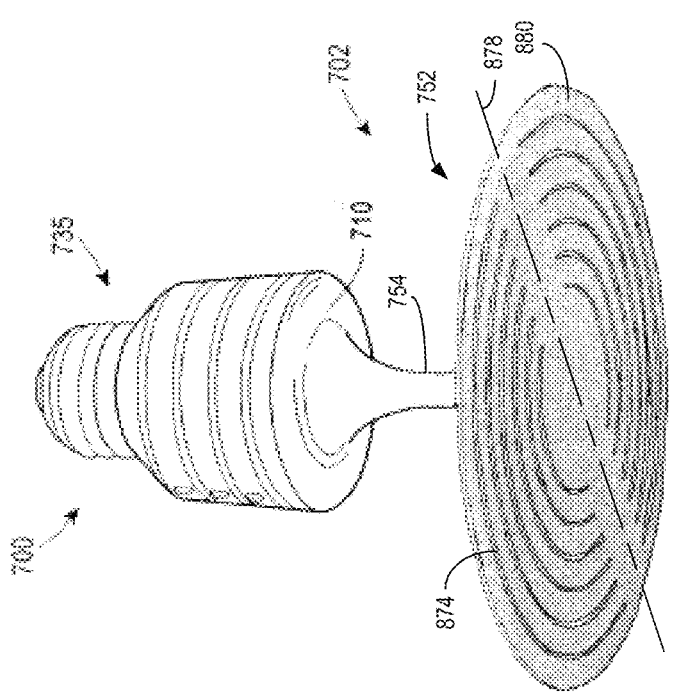
FIG. 75A is a perspective view of an exemplary embodiment of a lighting assembly.

In an embodiment illustrated in FIGS. 75A and 75B, the illuminating element 752 may have a plurality of slots 874 that extend from the top portion 756 of the illuminating element 752 to the bottom portion 758. The slots 874 may be disposed at any desired location. For example, as illustrated in FIGS. 75A and 75B, the slots may be concentrically disposed about the center of the disk-shaped illuminating element 752. The ends of the concentric slots may extend up to a central transverse portion 876 of the disk, and the transverse portion 876 of the disk may extend along an axis 878 that passes through the center of the disk. The plurality of concentric slots 876 may define a plurality of arc-shaped displaceable portions 880, and the displaceable portions 880 may be pivoted at the junction of the ends of the displaceable portions 880 and the transverse portion 876. As such, in a first configuration illustrated in FIG. 75A, the displaceable portions 880 may be substantially coplanar. However, one or more of the displaceable portions 80 may be pivoted relative to the transverse portion 876. More specifically, as illustrated in FIG. 75B, a plane passing through a top surface of a first displaceable portion 880 may be disposed at a first angle (e.g., between 0 degrees and 90 degrees) relative to a plane passing through the transverse portion 876, and a plane passing through a top surface of a second displaceable portion 880 may be disposed at a second angle (e.g., between 0 degrees and 90 degrees) relative to the plane passing through the transverse portion 876. The illuminating element 752 may comprise a memory material that allows a displaceable portion to remain in a desired position upon being displaced relative to the central transverse portion.

Figures 76A, 76B:
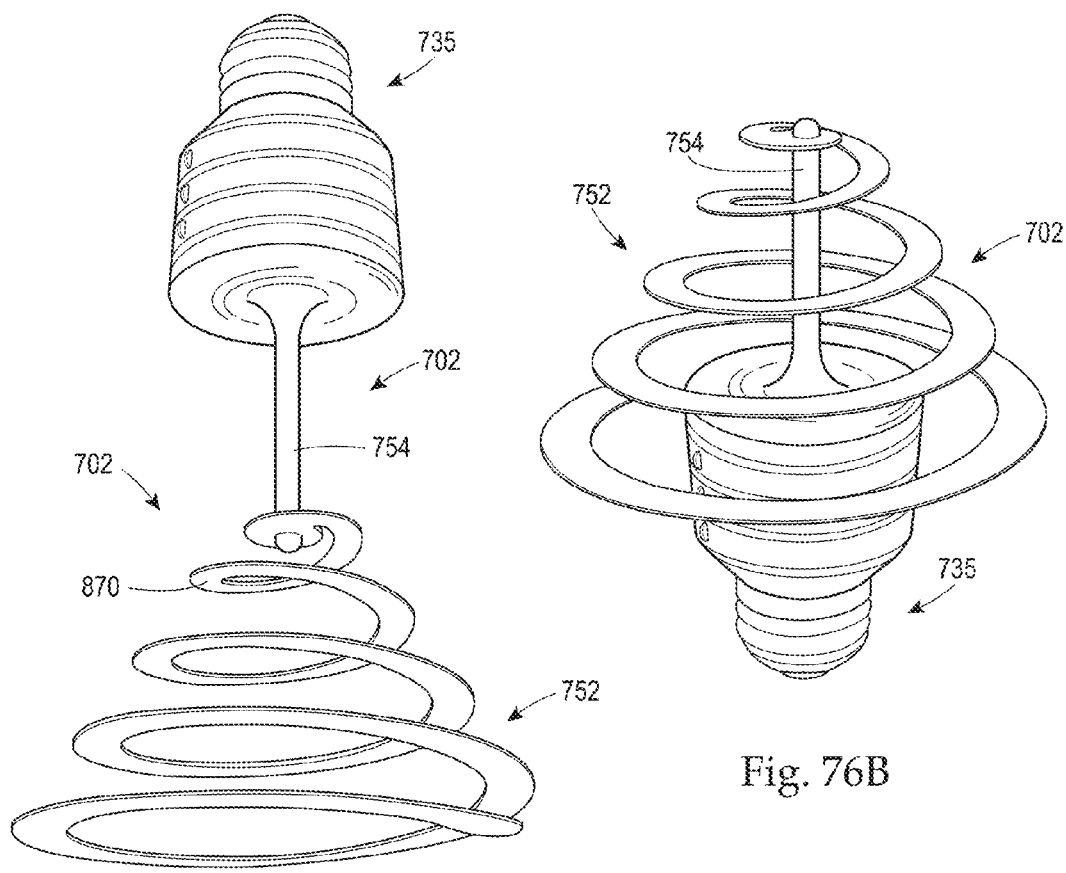
FIG. 76A is a perspective view of an exemplary embodiment of a lighting assembly.
FIG. 76B is a perspective view of the embodiment of FIG. 76A.

In an alternative embodiment illustrated in FIGS. 76A and 76B, the disk-shaped illuminating element 752 may have a single slot 874 that forms a spiral pattern disposed about the center of the illuminating element 752. So configured, when bulb assembly 702 is oriented such that the stem 754 extends upward as illustrated in FIG. 76B, the weight of the material comprising the illuminating element 752 causes the illuminating element 752 to downwardly displace around the stem 754 such that the illuminating element 752 wraps around the stem 754. Alternatively, when bulb assembly 702 is oriented such that the stem 754 extends downward (such as when the base assembly 735 is disposed in a recessed lighting power receptacle) as illustrated in FIG. 76A, the weight of the material comprising the illuminating element 752 causes the illuminating element 752 to downwardly displace from the stem 754.

Figure 77A:
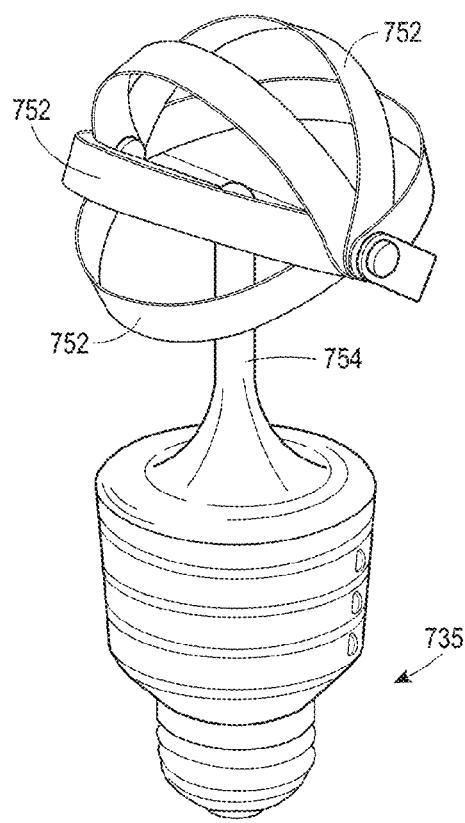
FIG. 77A is a perspective view of an exemplary embodiment of a lighting assembly.
Figure 77B:
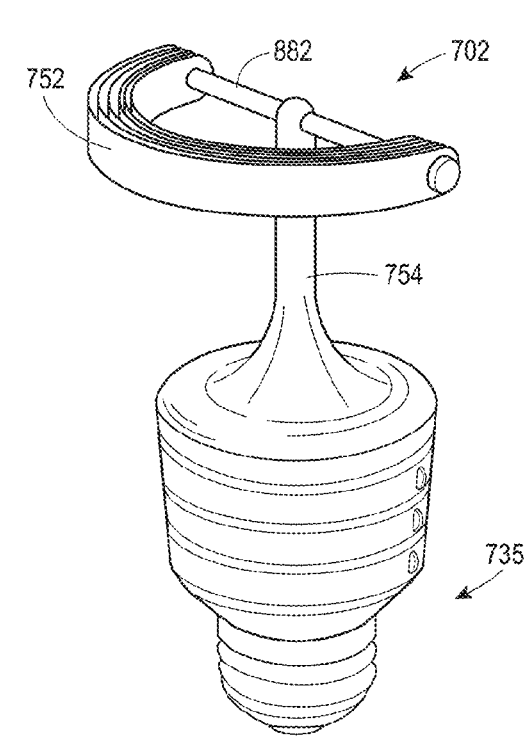
FIG. 77B is a perspective view of the embodiment of FIG. 77A.

In a still further alternative embodiment illustrated in FIGS. 77A and 77B, a horizontal rod 882 may be coupled to a distal end of the stem 754 of the bulb assembly 702. A plurality of arc-shaped illuminating elements 752 may be rotatably coupled to the rod 882. More particularly, a first end portion of each illuminating element 752 may be rotatably connected to a first end portion of the rod 882 and a second end portion of the illuminating element 752 may be rotatably connected to a second end portion of the rod 882. So configured, any or all of the arc-shaped illuminating elements 752 may be rotated about the rod 882 to a desired position. Moreover, each of the arc-shaped illuminating elements 752 may be positioned and dimensioned to allow the illuminating elements 752 to be maintained in a nested position, as illustrated in FIG. 77B.

In further embodiments, a lighting device 700 includes a bulb assembly 702, and the illuminating element or elements of the bulb assembly 702 may be one or more flexible lighting strip assemblies 884. For example, in the embodiment of the bulb assembly 702 illustrated in FIG. 78, the bulb assembly 702 may include a first lighting strip assembly 884a and a second lighting strip assembly 884b. Each lighting strip assembly 884a, 884b may include a lighting strip 886 comprising the previously-described flexible illuminating material.

The lighting strips 886 of each lighting strip assembly 884a, 884b may have any shape suitable for a desired application. For example, as illustrated in FIGS. 78 and 79, the first lighting strip 886a and the second lighting strip 886b may each have an elongated, ribbon-like shape. More specifically, each of the first and second lighting strips 886a, 886b may be partially defined by a linear first longitudinal edge 888 and a linear second longitudinal edge 890 that is parallel to and offset from the first longitudinal edge 888. The transverse distance (i.e., the distance normal to the longitudinal axis of each lighting strip 886, or the width) may have any suitable value. For example, the transverse distance may be within a first width range of approximately from about 50 mm to about 5 mm, alternatively from 40 mm to about 10 mm, alternatively from 30 mm to about 10 mm, alternatively from 25 mm to about 5 mm, alternatively from about 20 mm to about 10 mm, or alternatively combinations thereof. More specifically, the distance may be about 20 mm. Alternatively, the transverse distance may within a second width range of about 10 mm to approximately 3 mm. As an additional alternative, the transverse distance may within a third width range of approximately 50 mm to approximately 25 mm. In additional embodiments, the first longitudinal edge 888 and the second longitudinal edge 890 may be non-liner (or linear, but non-parallel), and the edges 888, 890 may converge or diverge or may be curved, partially curved, or angled relative to one or more portions of the edge. One having ordinary skill in the art would recognize that the transverse distance of embodiments having curved edges, or, for example, serrated edges, would be the distance between reference lines bisecting (or substantially bisecting) the curved or serrated edges 888, 890. In further embodiments, the transverse distance of each lighting strip 884 may be pre-established, or may be determined by the user. More specifically, individual lighting strips 884 may be removed from a master sheet, and the master sheet may be longitudinally perforated to allow the user to choose a desired width of each lighting strip 884.

The elongated lighting strip 886 of the lighting strip assembly 884 may have a first end portion 892 and a second end portion 894 opposite the first end portion 892. In some embodiments, the lighting strip assembly may have exposed conductive layers at each of the first end portion 892 and the second end portion 894. In other embodiments, the lighting strip assembly 884 may further include a connector assembly 896 that may be disposed at or adjacent to one or both of the first end portion 892 and the second end portion 894. The first longitudinal edge 888 and the second longitudinal edge 890 may each extend from the first end portion 892 to the second end portion 894 of the lighting strip 884. The connector assembly 896 may include an base portion 898, and the base portion 898 may be elongated and disposed substantially normal to a longitudinal axis of the lighting strip. The base portion 898 may be secured to the first end portion 892 and/or the second end portion 894 of the lighting strip 886 by any method known in the art, such as by mechanical coupling, by an interference fit, by ultrasonic welding, or by snap-fitting a multiple part base portion assembly around the first end portion 892 and/or second end portion 894 of the lighting strip 886, for example. The connector assembly 896 may be connected to a lighting strip 884 at the time of manufacturing, or may be secured to the end portions 892, 894 by the user if the width of each lighting strip 884 can be determined by a user.

The connector assembly 896 may also include one or more contact elements 900 adapted to electrically couple the lighting strip 886 to a source of power, and the contact element 900 may comprise any part or any assembly of parts capable of electrically coupling the lighting strip 886 to the source of power. Each contact element 900 may be coupled to the lighting strip 886 by the base portion 898. For example, the base portion 898 may be secured to the first end portion 892 and/or the second end portion 894 of the lighting strip 886, and one or more contact elements 900 may be coupled to (or retained by) the base portion 898 such that the one or more contact elements 900 are electrically coupled to the lighting strip 886. In alternative embodiments, the one or more contact elements 900 may be directly coupled to the first end portion 892 and/or the second end portion 894 of the lighting strip 886. As illustrated in FIGS. 79 and 80, the connector assembly 896 may include a single contact element 900, and the contact element 900 may take the shape of an elongated plate 901. In an alternative embodiment, each contact element 900 may include one or more cylindrical plugs. The elongated plate 901 (or any embodiment of the contact element 900) may be dimensioned to be received into a corresponding slot 902 formed in the base assembly 735, such as a top portion 735a of the base assembly 735. The one or more contact elements 900 may be removably coupled to the top portion 735a of the base assembly 735. For example, one or more slots 902 may be formed in the top portion 735a of the base assembly 735, and, more particularly, the one or more slots 902 may be formed in or on a top surface 905 of the top portion 735a of the base assembly 735. However, the one or more slots may be formed on any desired location of the base assembly 735, such as an outer cylindrical surface of the top portion 735a of the base assembly 735. The one or more contact elements 900 may be adapted to be removably received into the one or more slots 902. One or more contacts 904, such as spring contacts, may be disposed within the slot 902, and the one or more contacts 904 may be adapted to maintain physical contact with the elongated plate 901 when the elongated plate 901 is disposed in the slot 902. The one or more contacts 904 disposed in the slot 902 are electrically coupled to a power source to provide power to the lighting strip 886. The elongated plate 901 may have a detent feature (not shown) that may be positioned on the elongated plate such that the contacts 904 in the slot 902 engage the detent feature when the connector assembly 896 is properly inserted into the slot 902. The connector assembly 896 and/or the base assembly 735 may include one or more features (not shown) that ensure that the contact element is inserted into the slot 902 in a proper orientation relative to the contacts 904 in the slot 902 (to, for example, maintain correct polarity between the contacts in the slot and the elongated plate). Moreover, the connector assembly 896 and/or the base assembly 735 may include one or more features (not shown) that provide a releasable engagement feature that prevents the connector assembly from inadvertently being removed from the slot 902 of the base assembly 735.

As previously discussed, each of the lighting strips 886 of the one or more lighting strip assemblies 884 may be flexible, and the connector assembly 896 disposed at one or both ends of each of the lighting strip assemblies 884 may be removably coupled to the base assembly 735. Consequently, a user may customize the configuration of the bulb assembly 702. For example, a plurality of slots 902 may be provided in the base assembly 735, and the user may insert a first contact element 900 of a first lighting strip assembly 884*a* into a desired first slot 902 and the second contact element 900 of the first lighting strip assembly 884*a* into a desired second slot 902. The user may also insert a first contact element 900 of a second lighting strip assembly 884*b* into a third desired slot 902 and the second contact element 900 of the second lighting strip assembly 884*b* into a fourth desired slot 902. If desired, the user may then remove the first contact element 900 of the first lighting strip assembly 884*a* from the first slot 902 and insert the first contact element 900 of the first lighting strip assembly 884*a* into a fifth slot 902, for example. By being provided with a plurality of slots 902, the user is able to customize the configuration or position of the one or more lighting strip assemblies 884 relative to the base assembly 735, thereby allowing the user to create an esthetically pleasing and personalized illuminating arrangement. One having ordinary skill in the art would recognize that a lighting strip assembly 884 may be formed into any of a number of shapes, such as a round shape or a shape having one or more sharp edges.

The lighting strip or strips 886 may have any suitable length. For example, as illustrated in FIG. 78, a first lighting strip 886*a* may have a first length and a second lighting strip 886*b* may have a second length that is less than the first length. In some embodiments, the lighting strip or strips 886 may have a length of about 20 cm; alternately of about 15 cm; alternately of about 10 cm; alternately of about 25 cm; alternately of about 30 cm. Likewise, in embodiments employing two or more lighting strips 886, the lighting strips 886 may vary in length by about 1 cm; alternately by about 2 cm; alternately by about 3 cm; alternately by about 4 cm; alternately by about 5 cm; alternately by about 6 cm; alternately by about 7 cm. In some embodiments, a ratio of lengths of any two strips will be between about 1:1 and about 1:2; alternately between about 1:1 and 1:1.5; alternately between about 1:1 and 1:3; alternately between about 1:1 and 1:4; alternately between about 1:1 and 1:5. Although not shown, there may be three, four, five, or more strips of varying dimensions. The first and second contact elements 900 of the second lighting strip assembly 884*b* may be inserted into a first pair of slots 902 formed in the base assembly 735 such that the lighting strip 886*b* has the shape of a rounded arch (or loop) when viewed from the front. More particularly, the lighting strip 886*b* may have the general shape of a cross-section of a conventional light bulb (such as, for example, an A19 incandescent light bulb). In addition, the first and second contact elements 900 of the first lighting strip assembly 886*a* may be inserted into a second pair of slots 902 disposed orthogonal to the first pair of slots 902, and the lighting strip 886*a* of the first lighting strip assembly 884*a* may take the shape of a rounded arch (or loop) when viewed from the front. Similar to the second lighting strip 886*b*, the first lighting strip 886*a* may have the general shape of a cross-section of a conventional light bulb (such as, for example, an A19 incandescent light bulb). Because the first lighting strip assembly 884*a* has a greater length than the second lighting strip assembly 884*b*, a top rounded portion of the second lighting strip 886*b* is disposed below a top rounded portion of the first lighting strip 886*b*. Because the first lighting strip assembly 884*a* is disposed orthogonally to the second lighting strip assembly 884*b*, the overall shape of the first lighting strip assembly 884*a* and the second lighting strip assembly 884*b* resembles that of a stylized conventional light bulb.

Figures 84A, 84B:
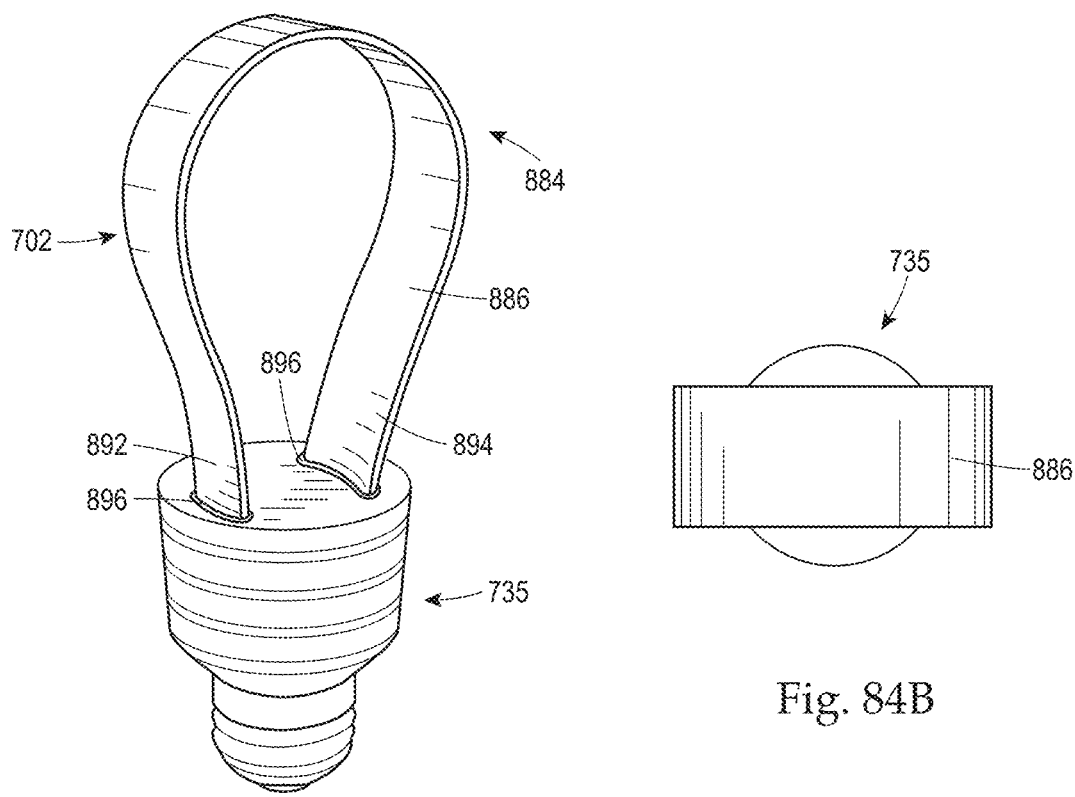

Instead of a first lighting strip 886*a* having a first length and a second lighting strip 886*b* having a second length, a single lighting strip assembly 884 may be coupled to the base assembly 735, as illustrated in FIGS. 84A and 84B. The single lighting strip assembly 884 may have a connector assembly 896 disposed adjacent to the first end portion 892 and the second end portion 894 of the lighting strip 886, and the connector assemblies 896 may each be received into appropriate slots 902 formed in the base assembly 735 in the manner discussed above. The lighting strip 886 of the lighting strip assembly 884 may take the shape of a rounded arch (or loop) when viewed from the front, and the lighting strip 886 may have the general shape of a cross-section of a conventional light bulb (such as, for example, an A19 incandescent light bulb). As such, dimensions of the lighting strip assembly 884 may correspond to the cross-sectional dimensions of a conventional light bulb, such as the A19 incandescent light bulb. As a specific example, the height of the rounded arch (or loop) may correspond to the height of the A19 incandescent light bulb, and such a height may be approximately 3½ inches (88.9 mm). The height may be defined, for example, as the vertical distance between an uppermost portion of the arch (or loop) and a horizontal or substantially horizontal top surface of the base assembly 735. However, the height may the distance between the uppermost portion of the arch (or loop) and any suitable portion of the top surface of the base assembly 735, such as an edge that partially defines one of more of the slots 902 formed in the top surface of the base assembly 735. As a further example, the maximum outer diameter of the rounded arch (or loop) may correspond to the maximum outer diameter of the A19 incandescent light bulb, and such a diameter may be approximately 2⅜ inches (60.3 mm).

Figure 85A:
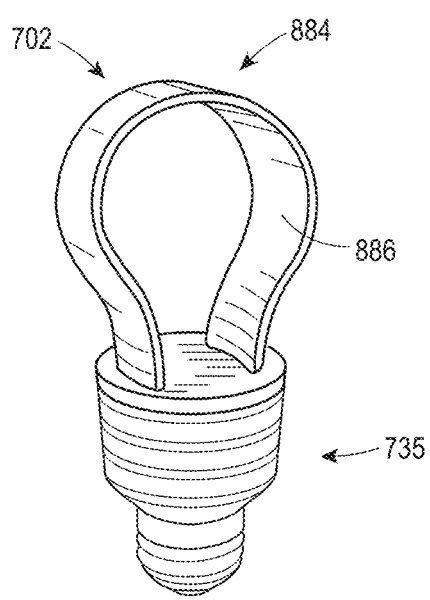
Figure 85B:
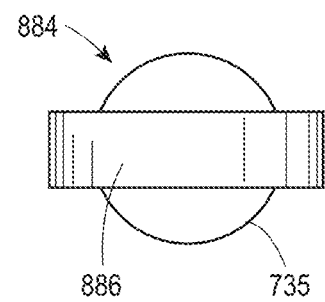

Instead of a height and maximum outer diameter values that correspond to those of a conventional light bulb, such as the A19 incandescent light bulb, the height and maximum outer diameter values of the rounded arch (or loop) may have any suitable values. For example, the height of the rounded arch (or loop) may be less than (or significantly less than) the height of the A19 incandescent light bulb, as illustrated in FIGS. 85A and 85B. More specifically, the height may be from about 1 cm to about 20 cm; alternately, from about 1 cm to about 15 cm; alternately from about 1 cm to about 10 cm; alternately from about 3 cm to about 20 cm; alternately from about 3 cm to about 15 cm; alternately from about 3 cm to about 10 cm; alternately from about 5 cm to about 20 cm; alternately from about 5 cm to about 15 cm; alternately from about 5 cm to about 10 cm. Similarly, also as illustrated in FIGS. 85A and 85B, the maximum width of the rounded arch (or loop) may be more or less than the maximum width of the A19 incandescent light bulb, and the maximum width may or may not maintain the general proportions of the A19 incandescent light bulb, for example. Specifically, in some embodiments, the maximum width of the rounded arch (e.g., in the loop formed by the lighting strip 886), may be about 2 cm to about 20 cm; alternately about 2 cm to about 15 cm; alternately about 2 cm to 10 cm; alternately about 2 cm to 5 cm; alternately about 4 cm to about 20 cm; alternately about 4 cm to about 15 cm;

alternately about 4 cm to about 10 cm. As such, if the height of the rounded arch (or loop) is 1.5" (38.1 mm), the maximum width would be approximately 1" (25.4 mm). That is, the ratio of width:height of the lighting strips 886 when formed into loops and/or arches may be from about 1:1 to about 1:3; alternately about 1:1 to about 1:2; alternately about 1:1 to about 3:4.

Figures 86A, 86B:
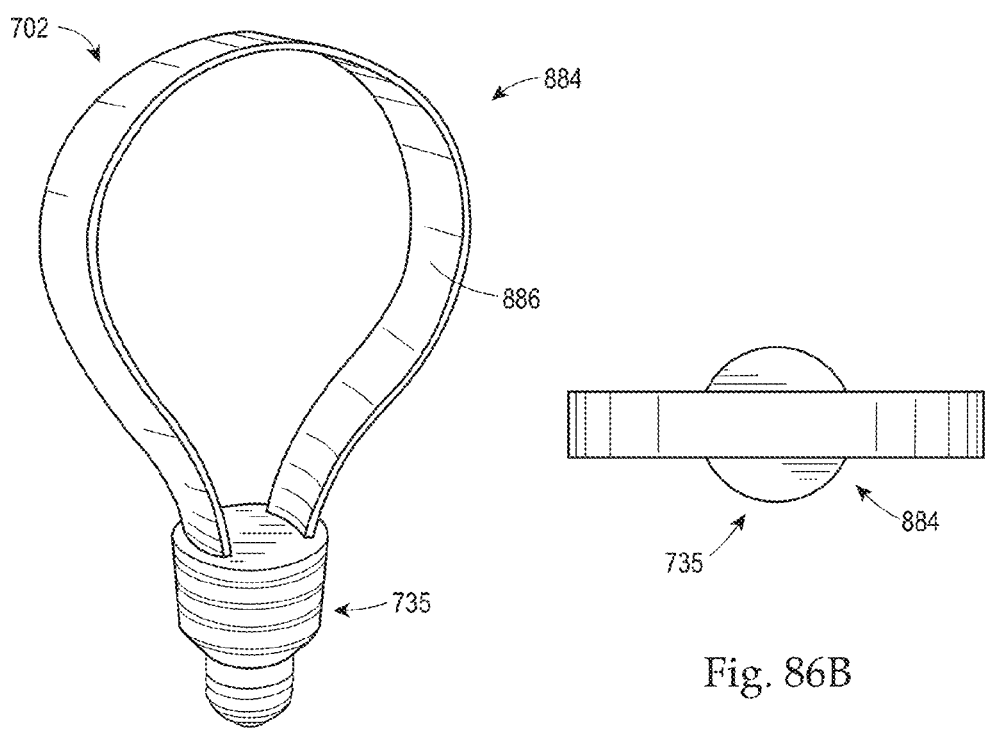

In additional embodiments, the height of the rounded arch (or loop) may be greater than (or significantly greater than) the height of the A19 incandescent light bulb, as illustrated in FIGS. 86A and 86B. More specifically, the height may be approximately 5 inches (127 mm), 6" (152.4 mm), or 7" (177.8 mm), for example. Similarly, also as illustrated in FIGS. 86A and 86B, the maximum width of the rounded arch (or loop) may be significantly greater than the maximum width of the A19 incandescent light bulb, and the maximum width may maintain the general proportions of the A19 incandescent light bulb, for example. As such, if the height of the rounded arch (or loop) is 7" (177.8 mm), the maximum width would be approximately 4.75" (120.6 mm).

In further embodiments, a first lighting strip 886a may have a first length and a second lighting strip 886b may have a second length that is less than the first length, as discussed above with reference to FIG. 78. However, as illustrated in FIGS. 87A and 87B, the height of the rounded arch (or loop) of the first lighting strip 886a may be greater than (or significantly greater than) the height of the A19 incandescent light bulb, and the height of the rounded arch (or loop) of the second lighting strip 886b may be significantly less than the height of the rounded arch (or loop) of the first lighting strip 886a. For example, the height of the rounded arch (or loop) of the second lighting strip 886b may equal to or significantly less than the height of the rounded arch (or loop) of the A19 incandescent light bulb. For example, the height of the rounded arch (or loop) of the first lighting strip 886a may be approximately 7" (177.8 mm), for example, and the height of the rounded arch (or loop) of the second lighting strip 886b may be approximately 1" (25.4 mm). Alternatively, the height of the rounded arch (or loop) of the second lighting strip 886b may be slightly less than the height of the rounded arch (or loop) of the first lighting strip 886a. In an additional embodiment, both the height of the rounded arch (or loop) of the first lighting strip 886a and the height of the rounded arch (or loop) of the second lighting strip 886b may be significantly less than the height of the A19 incandescent light bulb. One having ordinary skill in the art would recognize that any number of additional lighting strip assemblies 884 having various sizes and various mutual orientations can be coupled to a base assembly 735 to emulate the shape of a conventional light bulb (such as, for example, an A19 incandescent light bulb).

In any of the embodiments previously discussed (or discussed below), the widths of each of the lighting strips 886 may vary. For example, in the embodiment illustrated in FIGS. 87A and 87B, the first lighting strip 886a and the second lighting strip 886b may have a transverse distance (i.e., the distance normal to the longitudinal axis of each lighting strip 886, or the width) within the first range of transverse distances, and both of the transverse distances may be equal. However, the first lighting strip 886a and the second lighting strip 886b may have different transverse widths, and each of the transverse distance may be chosen from the first range, the second range, and the third range, as described above. Moreover, if more than two lighting strips 886 are used, the transverse width of any of the lighting strips 886 may be chosen from the first range, the second range, and the third range. For example, if ten lighting strips 886 are coupled to the base assembly 735 (or are capable of being coupled to the base assembly 735), all ten lighting strips 886 may have an equal transverse distance, and the transverse distance may be within the second range. One having ordinary skill in the art would recognize that the lengths of all of the lighting strips may be equal, or the length of any or all of the lighting strips may vary.

As discussed above, the lighting strip 886 of the lighting strip assembly 884 may be flexible. More specifically, the lighting strips 886 may have any suitable flexural modulus according to the materials used to manufacture the material. Moreover, regardless of the flexural modulus of the material, the material may have a minimum radius to which it can be bent without compromising the electrical and/or physical integrity of the structure (e.g., causing layers of materials to shear, without shorting electrical components, etc.). As used herein, this minimum radius is referred to as a "minimum bending radius." Both the minimum bending radius and the flexural modulus may vary according to a particular application, depending on the substrate materials used and the desired flexibility of the material. For example, a lighting strip 886 using a first substrate material may have a minimum bending radius of between 4 mm and 25 mm, while an illumination element 782 in the form of a disk using a second substrate material may have a minimum bending significantly greater, on the order of 100 mm to 200 mm or more. Thus, in some embodiments the lighting strip 886 has a minimum bending radius of about 10 mm to about 20 cm; alternately about 10 mm to about 10 cm; alternately about 10 mm to about 5 cm; alternately about 3 cm to about 5 cm; alternately about 3 cm to about 10 cm; alternately about 3 cm to about 20 cm. Alternatively, the sheet 788 may be relatively rigid, having a larger bending radius of approximately 15 cm, for example. If more than one lighting strip assembly 884 is used for an application, one having ordinary skill in the art would recognize that the minimum bending radius of all of the lighting strips 886 may be equal, or the minimum bending radius of any or all of the lighting strips 886 may vary.

Figures 82A, 82B:
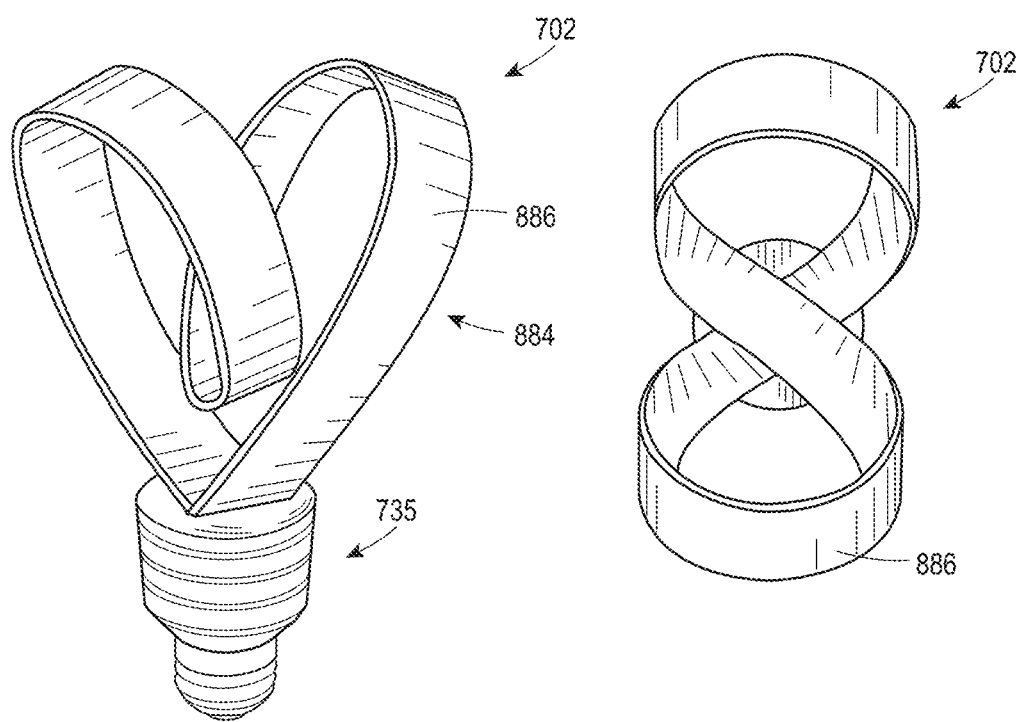
Figure 83A:
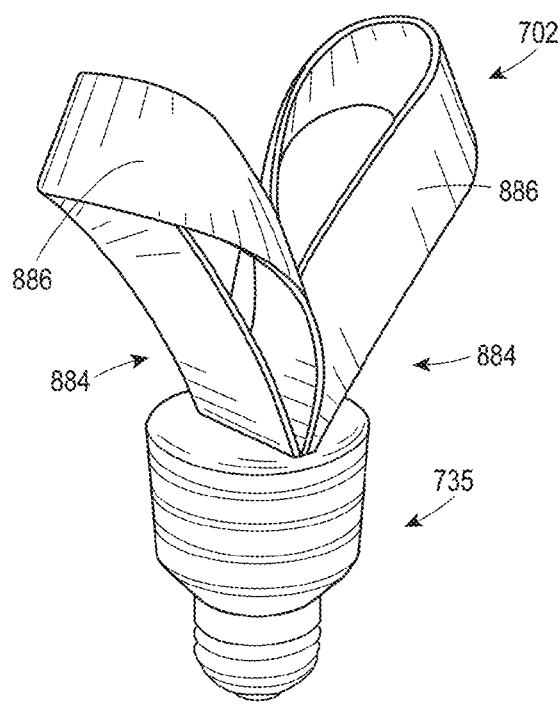
Figure 83B:
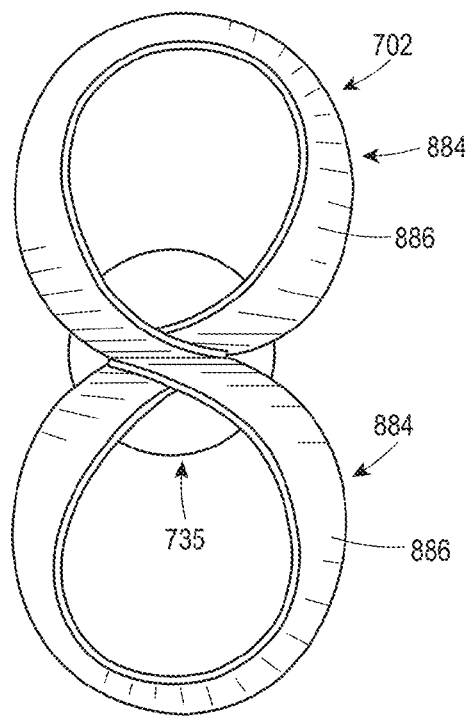

Due to the flexibility of the lighting strip 886, a first connector assembly 896 may be rotated relative to a second connector assembly 896 to twist the lighting strip. For example, as illustrated in FIG. 81, the first and second contact elements 900 of a single lighting strip assembly may be inserted into slots 902 that are disposed at an angle of between 145 degrees and 45 degrees, alternatively from 100 degrees to 45 degrees alternatively from 100 degrees to 145 degrees, alternatively from 80 degrees to 100 degrees, alternatively about 90 degrees, to create an elongated arc that extends from the base assembly 735. Alternatively, as illustrated in FIGS. 82A, 82B, the lighting strip 886 of a single lighting strip assembly 884 can be twisted to form multiple loops. Moreover, as illustrated in FIGS. 83A, 83B, the lighting strips 886 of more than one lighting strip assembly 884 can be twisted to form a desired configuration.

Each of the lighting strips 886 of the lighting strip assemblies 884 may be capable of illuminating in any desired manner. For example, the entire front surface of any or all of the lighting strips 886 may be capable of illumination. Alternatively, only portions of the front surface may be capable of illumination. In other embodiments, portions of the front surface may be capable of selective illumination such that the entire front surface of the lighting strip 886 may be illuminated or only portions of the front surface of the lighting strip may be illuminated. Similarly, the entire back surface of any or all of the lighting strips 886 may be capable of illumination. Alternatively, only portions of the back surface may be capable of illumination, or portions of the back surface may be capable of selective illumination. Selective illumination may be controlled by any method, including those previously described. In some instances, selective illumination may be by lighting strip (i.e, a first lighting strip may be illuminated, while a second lighting strip remains unilluminated, etc.).

In a still further embodiment of the lighting device 700 illustrated in FIGS. 28A and 28B, a flexible cord 766 may extend from a bulb base 710, and the bulb base 710 may be integrally formed with the base assembly 735. A hub 768 may be disposed at the distal end of the cord 766, and a plurality of support rods 770 may radially extend from the hub 768. A lighting element 772 may be supported by the plurality of support rods 770, and the support rods 770, the hub 768, and the cord 766 may provide a means to electrically connect the base assembly 735 with the lighting element 772. The lighting element 772 may have any shape, and any interior and/or exterior surface of the lighting element 772 may illuminate. For example, as shown in FIGS. 28A and 28B, the lighting element 772 may include a plurality of faceted surfaces 774 that form a generally cylindrical shape, and all (or some) of the faceted surfaces 774 may be capable of illumination. Another example is shown in FIG. 28C, where the lighting element 772 is comprised of a plurality of cylinders 776. The hub 768 may have an interface to allow a user to select or adjust a functional setting, such as to dim the lighting or switch on the illumination of internal faceted surfaces 774 only.

In another embodiment illustrated in FIGS. 31A, 31B, 31C, and 31D, a sheet assembly 787 may include a sheet 788, and both sides of the sheet 788 may be capable of illumination. The sheet 788 may be flexible, and the sheet may have any suitable minimum bending radius suitable for a given application. For example, the sheet 788 may have a minimum bending radius of between 1" (25.4 mm) and 6" (152.4 mm). Alternatively, the sheet 788 may be substantially rigid, having a larger bending radius of approximately 24" (60.96 cm), for example. Alternately, the sheet 788 may have any minimal bending radius or range of minimum bending radii previously described. The sheet 788 may have a diamond shape and may be substantially planar, as illustrated in FIGS. 31A, 31B, 31C. However, the sheet 788 may have any shape or combination of shapes, such as the contoured shape illustrated in FIG. 31D. Optionally, the sheet 788 may include a printed pattern or image or other type or ornamentation. A power cord 790 may be electrically coupled to the sheet 788, and the power cord 790 may also be electrically coupled to a power interface 792 that may be capable of coupling to a source of power, such as, for example, a standard wall outlet, to provide power to illuminate the sheet 788. However, the power interface 792 may be capable of interfacing with any source of power, such as the socket of a standard light or a car lighter outlet. The power cord 790 may be permanently coupled to the sheet 788 or it may be releaseably coupled. A functional interface 794 may be electrically coupled to the sheet 788 and the power interface 792, and the functional interface 794 may include interfaces to control the functions of the sheet 788, such as a power switch, a dimmer, or any other suitable function. The sheet assembly 787 may include at least two coupling elements 796 to allow a first portion of the sheet 788 to attach to a second portion of the sheet. For example, a first coupling element may be coupled to the first portion of the sheet and a second coupling element may be coupled to the second portion of the sheet, and the first coupling element may be adapted to engage the second coupling element to removably secure the first portion of the sheet to the second portion of the sheet.

The coupling elements 796 of the embodiment illustrated in FIGS. 31A, 31B, 31C, and 31D may be any mechanism known in the art capable of releaseably coupling at least two portions of the sheet 788 such as, for example, hook and loop fasteners or magnetic fasteners. As an additional example, a coupling element 796 may be disposed at each of the four corners of the diamond-shaped sheet illustrated in FIG. 31A. The coupling elements 796 may include a male projection 798 that can be releaseably secured within a female aperture 800 to secure the sheet in a desired shape, as illustrated in FIG. 31C. More than one type of coupling element 796 may be included, such as, for example, a plurality of inwardly-directed slits 802, and an edge portion of the sheet can be inserted into one of the silts 802 to secure the sheet in a desired position as illustrated in FIG. 31B. It is contemplated that the sheet assembly 787 can be hung from a wall, suspended from an overhead power source, hung from the ceiling, or be disposed on a flat surface.

In a further embodiment illustrated in FIGS. 32A to 32E, the device 700 may have a generally elongated shape. Specifically, a base 804 may extend in a substantially longitudinal direction. The base 804 may have any suitable length for a particular application, and the base may be dimensioned such that the overall length of the device 700 is approximately equal to a conventional fluorescent lighting fixture. For example, the base 804 may be dimensioned such that the overall length of the device 700 is 12 inches (304.8 mm), 24 inches (609.6 mm), 36 inches (914.4 mm) or 48 inches (1219.2 mm) long. The base 804 may have any shape suitable for a particular application. For example, as shown in FIG. 32A, the base 804 may be comprised of a first wall 806 and a second wall 808, and the first wall 806 and the second wall 808 may be symmetrically formed about a centrally-disposed slot wall 810 such that the base 804 has a wedge-like shape. The base 804 may be manufactured as a unitarily formed feature, or may be assembled from two or more components. A lighting element 812 may be coupled to the base 804, and the lighting element 812 may have any shape or size suitable for a particular application. For example, the lighting element 812 may be substantially planar, as illustrated in FIGS. 32A and 94B, and the lighting element 812 may extend along the entire length of the base 804 along the slot wall 810. However, the lighting element 812 may be comprised of segments that are spaced along the length of the base 804, for example. Any portion of the lighting element 812, including the entire lighting element 812, may be capable of illumination, as will be described in more detail below.

Still referring to FIGS. 32A to 32E, a cover 814 may be coupled to the base 804 by any means known in the art, including permanent coupling or removable coupling. For example, the top and bottom edges of the cover 814 may each slide into slots formed at the terminal ends of the first wall 806 and the second wall 808, respectively. When secured to the base 804, the cover 814 may have any cross-sectional shape, such as convex, concave, or flat, for example. In addition, the cover 814 may be comprised of a single unitary part, or may be comprised of several segments that collectively form the cover 814, and one segment of the cover 814 may be convex, and a second segment may be concave, for example. The cover 814 may be substantially frosted or may be transparent, and the cover 814 may also have a surface texture or be untextured. In addition, the cover 814 may have any suitable color. In an alternative embodiment, the cover 814 may illuminate instead of the lighting element 812.

Referring again to FIGS. 32A to 32E, an end cap 816 may be secured to each end of the base 804. Each end cap 816 may have any shape, and the end cap 816 may have a cross-sectional shape that is substantially identical to the cross-sectional shape of the cover 814/base 804 assembly, for example. Each end cap 816 maybe secured to each end of the base 804 by any manner known in the art, such as by a tab/slot assembly or an interference fit, for example. At least one of the end caps 816 may be coupled to a power interface 792. For example, a flexible cord 818 may extend from an end cap 816 to the power interface 792 such that when the end cap 816 is secured to the base 804, the lighting element 812 (or the cover 814 if the cover 814 is capable of illumination) is electrically coupled to the power interface 792. A functional interface 794 may be electrically coupled to the lighting element 812 (or the cover 814 if the cover 814 is capable of illumination) and the power interface 792, and the functional interface 794 may include interfaces to control the functions of the lighting element 812 (or the cover 814 if the cover 814 is capable of illumination), such as a power switch, a dimmer, or any other suitable function. The functional interface 794 may be disposed at any suitable location of the device 700, including as a module coupled to the power cord 818. Alternatively, the functional interface 794 may be integrally formed with an end cap 816 or the power interface 792.

Still referring to FIGS. 32A to 32E, two or more of the cover 814/base 804 assemblies may be secured together to form a multi-unit assembly 822. Because the individual cover 814 and base 804 shapes can vary, the multi-unit assembly 822 may have any cross-sectional shape or combination of shapes. For example, as shown in FIGS. 32C and 94E, the multi-unit assembly 822 may have a substantially cylindrical shape. Alternatively, the multi-unit assembly 822 may have a semi-cylindrical shape as illustrated in FIG. 32D. The cover 814/base 804 assemblies may be secured together by any means known in the art, such as by the use of a tab/slot configuration or by magnetic coupling. For example, a portion of an elongated tab 820 may be inserted into a slot formed by the slot wall 810 of the base 804 of each of two adjacent cover 814/base 804 assemblies to form a semi-cylinder, or a portion of the elongated tab 820 may be inserted into a slot formed by the slot wall 810 of the base 804 of each of four cover 814/base 804 assemblies to form a cylinder. If the multi-unit assembly 822 is to be suspended from the power cord 818, the power cord 818 may be coupled to a hub that may be coupled to one or all of the lowermost end caps 816 to support the multi-unit assembly 822.

Figure 33:
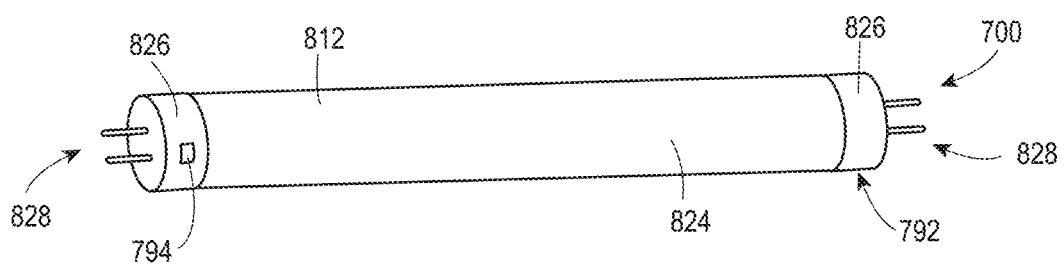
FIG. 33 is a perspective view of an exemplary embodiment of a lighting assembly.

In a further elongated embodiment illustrated in FIG. 33, a fluorescent replacement assembly 823 may have the shape of a conventional tube-type fluorescent bulb such that the fluorescent replacement assembly 823 may be inserted into conventional tube-type fluorescent sockets to replace conventional tube-type fluorescent bulbs. Specifically, the lighting element 812 of the fluorescent replacement assembly 823 may be capable of illumination, and the lighting element 812 may be substantially cylindrical. The lighting element 812 may be disposed within a rigid outer cylinder 824, and the outer cylinder 824 may be made of any suitable material, such as plastic or glass, for example. The lighting element 812 and the outer cylinder 824 may, as shown, be cylindrical in shape, or may have any cross-sectional shape or combination of shapes. Moreover, if the lighting element 812 is sufficiently rigid to withstand the torque applied upon installation, no outer cylinder 824 may be used. An end cap 826 may be disposed on both ends of the lighting element 812. The end caps 826 may have any suitable shape, and may be cylindrical and have an outer diameter substantially equal to that of the outer cylinder 824. The end caps 826 may be rigidly secured to the outer cylinder 824 (or to the lighting element 812 if no outer cylinder 824 is used) by any method known in the art, such as by threaded coupling or tab/slot locking. One or more pins 828 may extend from each of the end caps 826, and the pins 828 may collectively form any of several conventional configurations that are used to couple a conventional fluorescent bulb with a socket. The pins 828 may be electrically coupled to a power interface 792, and the power interface 792 may be electrically coupled to the lighting element 812 such that the power interface 792 may convert the voltage from the conventional socket to a voltage suitable to illuminate the lighting element 812. One or both of the end caps 826 may include a power interface 792, and the power interface 792 may be electrically coupled to the pins 828 and the lighting element 812. A functional interface 794 may be electrically coupled to the lighting element 812 and the power interface 792, and the functional interface 794 may include interfaces to control the functions of the lighting element 812 such as a power switch, a dimmer, or any other suitable function. The functional interface 794 and the power interfaces 792 may be integrally formed in one or both end caps 726. The outer diameter of the outer cylinder 824 (or the lighting element 812 if no outer cylinder 824 is necessary) may be substantially equal to the outer diameter of a conventional fluorescent bulb. For example, the outer diameter of the outer cylinder 824 may be 1½ inches (38.1 mm). The overall length of the fluorescent replacement assembly 823 (excluding the length of the pins 828) may be substantially equal to the length of a conventional fluorescent bulb. For example, the length of the fluorescent replacement assembly 823 may be 12 inches (304.8 mm), 24 inches (609.6 mm), 36 inches (914.4 mm) or 48 inches (1219.2 mm). However, the outer diameter of the outer cylinder 824 and the length of the fluorescent replacement assembly 823 may have any suitable value.

As described briefly above, in addition to taking any number of conceivable physical forms, a lighting assembly according to the present description may provide any number of operational functions. Each function may include one or more configurable parameters and, depending on the particular embodiment, may be implemented in either of a combination of a bulb, a base, and a coupling mechanism, by software, firmware, hardware, and/or a combination of software, firmware, and/or hardware.

Figure 37A:
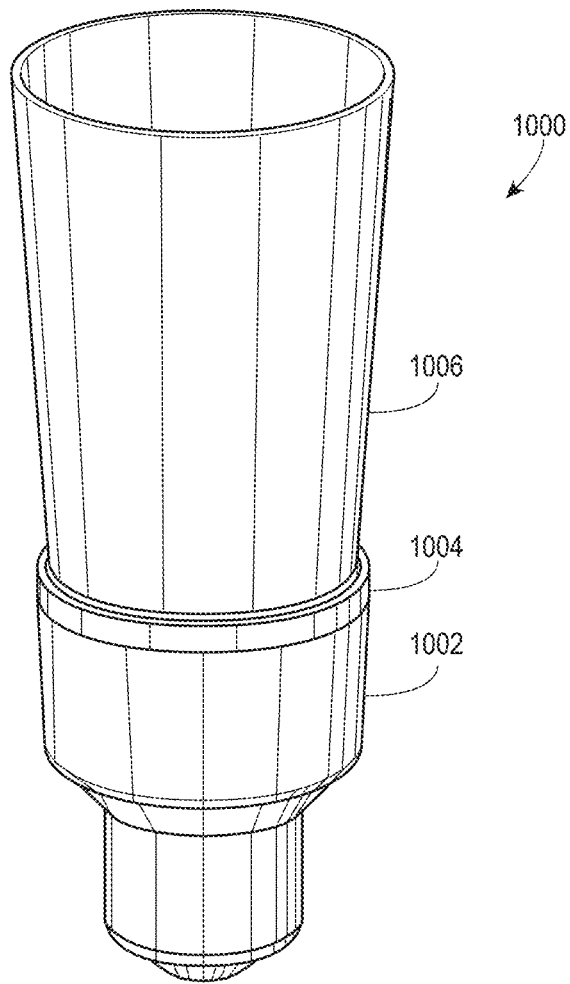
FIG. 37A is a perspective view of an exemplary embodiment of a lighting assembly.
Figure 37B:
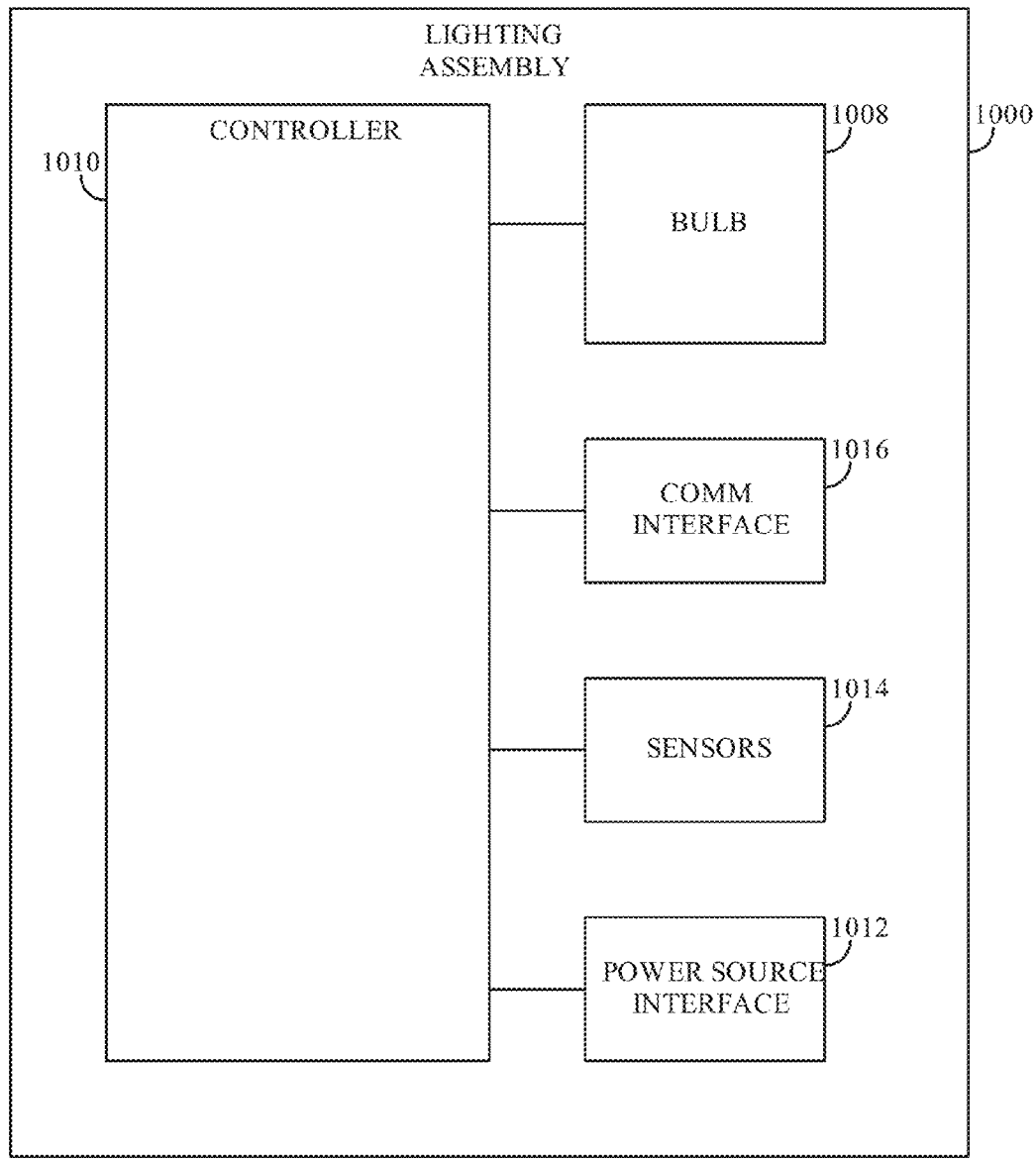
FIG. 37B is a block diagram of the exemplary embodiment of the lighting assembly in FIG. 37A.

In some embodiments, for example, an assembly 1000 includes a base portion 1002 integrally formed with and coupled to a seat portion 1004, as depicted in FIG. 37A. The seat portion 1004 receives a bulb portion 1006 that may, in turn, be integrally formed with the base or may be separately formed and fixedly or removably coupled to the base portion 1002. The bulb portion 1006 may include any light emitting element and, in particular, may include an illuminated sheet, an incandescent or fluorescent bulb (not shown), a shade, one or more LEDs, etc. As depicted in the functional block diagram illustrated in FIG. 37B, the assembly 1000 includes a bulb 1008 (e.g., the illuminated sheet), a controller 1010, and a power source interface 1012. The power source interface 1012 may serve to physically and/or electrically couple the assembly 1000 to a power source (not shown), which may be an AC and/or a DC power source. The power source interface 1012 may also, possibly in cooperation with the controller, transform, adapt, switch, filter, condition, and/or perform impedance matching on the electrical signal provided by the power source. For example, where the bulb 1008 includes one or more light emitting diodes, the power source interface 1012 may transform a 120 VAC signal provided by the power source into a lower-voltage DC signal according to the characteristics of the diodes and the configuration of the one or more illuminating circuits forming the bulb 1008, and/or to provide to the controller 1010 an appropriate operating voltage. As another example, the power source interface 1012 may adapt to various voltages and frequencies of electrical power signals provided by the power source to allow, for example, the same assembly 1000 to be used with a 60-Hertz, 120 VAC signal, with a 50-Hertz, 120 VAC signal, with a 60-Hertz, 240 VAC signal, etc. As still another example, the power source interface 1012 may switch connections between multiple power sources (e.g., power from a mains line and power from an energy storage device). As yet another example, the power source interface 1012 may filter and/or condition an electrical signal provided by the power source, to remove noise from the electrical signal, convert the electrical signal from AC to DC, and/or to remove or isolate one or more signals (e.g., a communication signal). The assembly 1000 may also include one or more sensors 1014 and one or more components (e.g., receivers and transmitters) forming a communication interface 1016.

Figure 38A:
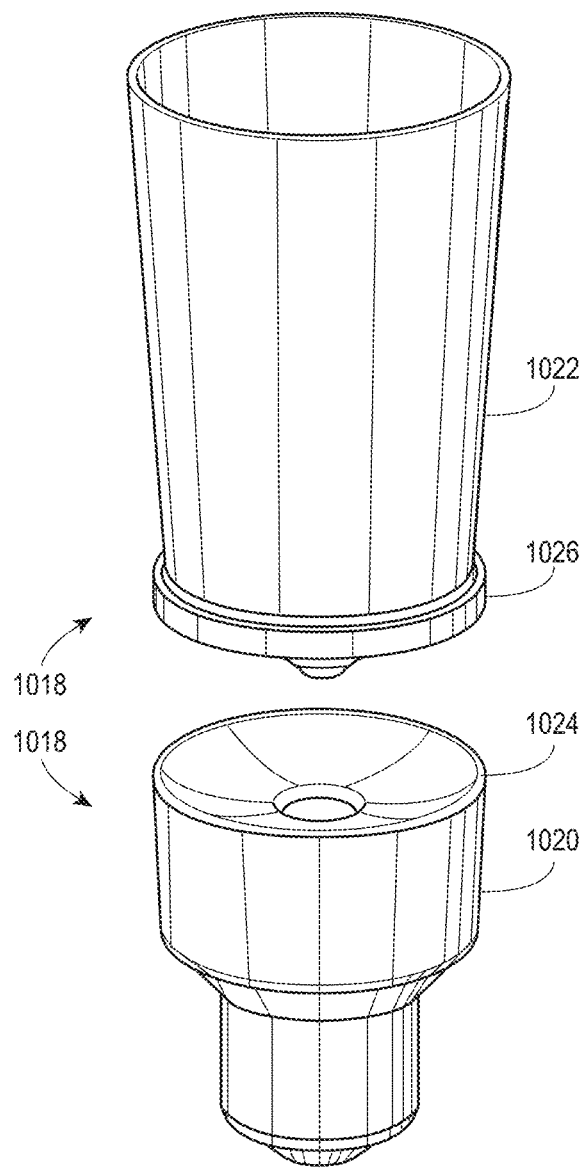
FIG. 38A is a perspective view of a second exemplary embodiment of a lighting assembly.

In other embodiments, such as that depicted in FIG. 38A, two or more assemblies 1018 may be separately formed. The assemblies 1018 may include a base assembly 1020 and a bulb assembly 1022, that may be removably coupled to one another. The base assembly 1020 and the bulb assembly 1022 may include respective coupling portions 1024 and 1026, that cooperate with one another to join the base assembly 1020 to the bulb assembly 1022 both electrically and physically. The bulb assembly 1022 may include any light emitting element and, in particular, may include an illuminated sheet, an incandescent or fluorescent bulb (not shown), a shade, one or more LEDs, etc. As depicted in the functional block diagram illustrated in FIG. 38B, the base assembly 1020 may include a primary power source interface 1028, operating in the manner described above with respect to the power source interface 1012. The base assembly 1020 may also include a controller 1030, one or more components forming a communication interface 1032, and one or more sensors 1034.

The base assembly 1020 also includes a coupling interface 1039, which itself includes a secondary power source interface 1036 and a data interface 1038 for electrically coupling, respectively, power and data signals provided by the base assembly 1020 to corresponding interfaces 1040 and 1042 of a coupling interface 1043 of the bulb assembly 1022. In some embodiments, the power signal(s) provided by the base assembly 1020 to the bulb assembly 1022 are provided by means of an inductive transfer of energy.

The data signals may be any data signals passing between the bulb assembly and the base assembly, depending on the specific embodiment. By way of example and not limitation, exemplary data signals may include: signals between one or more sensors in the bulb assembly and a controller in the base assembly; signals sent from a controller or a communication interface in the base assembly to a transmitter in the bulb assembly; signals received by a receiver in the bulb assembly and relayed to a controller in the base assembly; and/or signals from the bulb assembly identifying to the base assembly the type of bulb and/or the features of the bulb assembly. While illustrated in FIG. 38B as distinct interfaces, the interfaces 1036 and 1038 (and 1040 and 1042) may be a single interface where, for example, an electrical power signal serves as a carrier signal for a data signal.

In some embodiments, respective data interfaces 1038 and 1042 may implement wireless communication, such as a near field communication protocol, the Bluetooth protocol, a radio-frequency identification (RFID) protocol, etc.

In some embodiments, the controller 1030 may be implemented in the bulb assembly 1022 instead of in the base assembly 1020. Additionally, the base assembly 1020 may, in some embodiments, include only the power interface 1036 and the power source interface 1028, while the remainder of the sensors 1034, the controller 1030, and/or the communication interface 1032 may be part of the bulb assembly 1022. Embodiments implementing such a "dumb" base assembly 1020 and incorporating the controller, and possibly other components, into a "smart" bulb assembly 1022 may allow a consumer to add functionality to the lighting assembly by replacing the bulb assembly 1022 and leaving the base assembly 1020 in place (i.e., connected to the power source). Additionally, the use of a smart bulb assembly 1022 with a dumb base assembly 1020 may allow any particular light emitting element 1044 to be implemented with a corresponding controller 1030, such that the controller 1030 controls the functionality available according to the light emitting element 1044. For example, a light emitting element 1044 having multiple illumination circuits would have a corresponding controller 1030 configured to control the multiple illumination circuits.

The bulb assembly 1022 includes one or more illuminating circuits 1044, each of which illuminating circuits 1044 is electrically and, optionally, selectively-coupled to the interface 1040 to power a corresponding plurality of illuminating elements in the illuminating circuit 1044. One or more sensors 1046 may also be included within the bulb assembly 1022, and may be electrically coupled to one or both of the interfaces 1040 and 1042. For example, the sensor 1046 may receive operating power from the interface 1040 while sending and/or receiving data signals (e.g., indicating a sensed parameter) to the controller 1030 through the interfaces 1042 and the 1038. Alternatively, one or more of the sensors 1046 may receive operating power from signals provided via the interface 1042. The physical and electrical implementation of the interfaces 1036/1040 and 1038/1042 will be described with respect to specific embodiments in the "coupling" section, below.

Figure 38B:
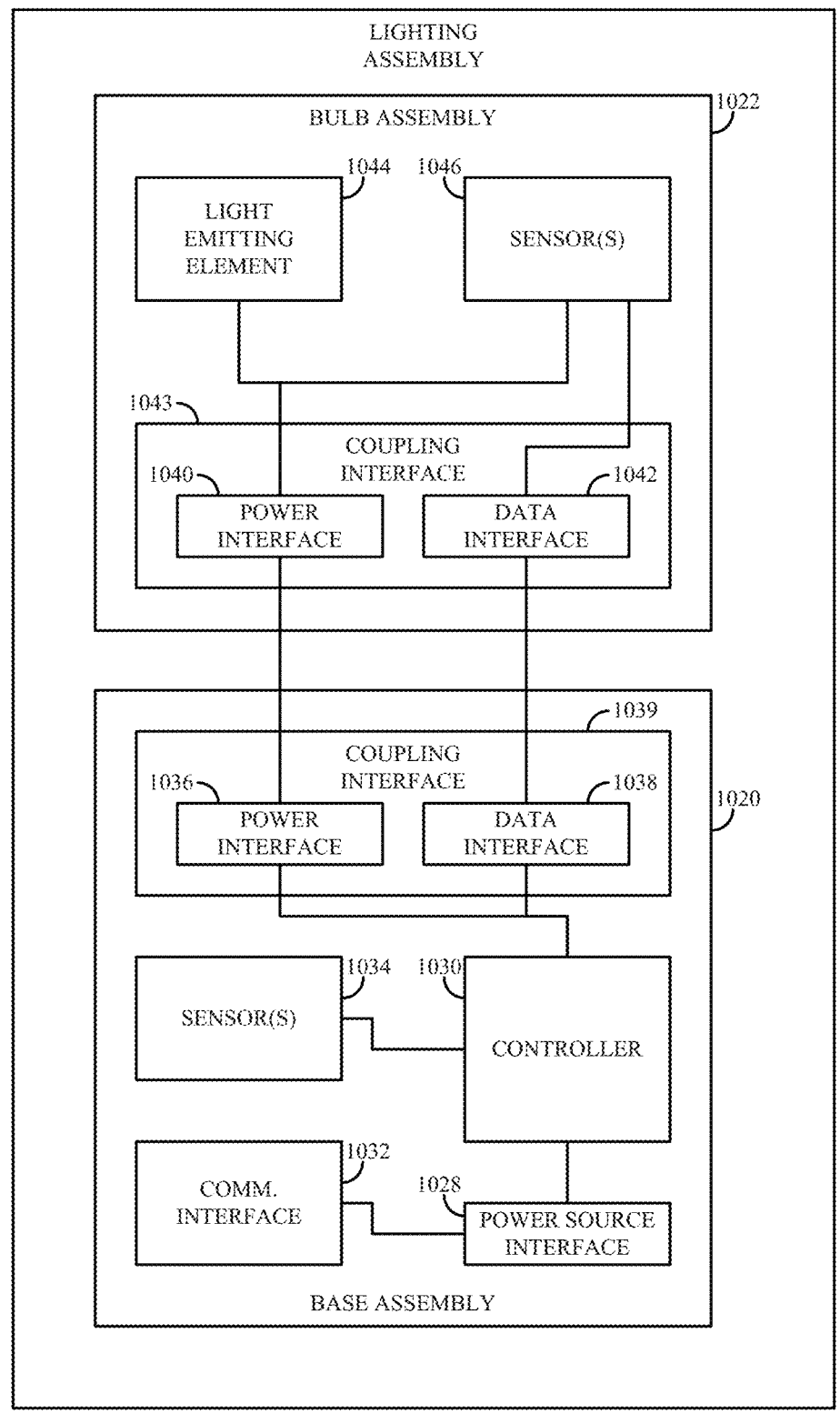
FIG. 38B is a block diagram of the exemplary embodiment of the lighting assembly in FIG. 38A.
Figure 38C:
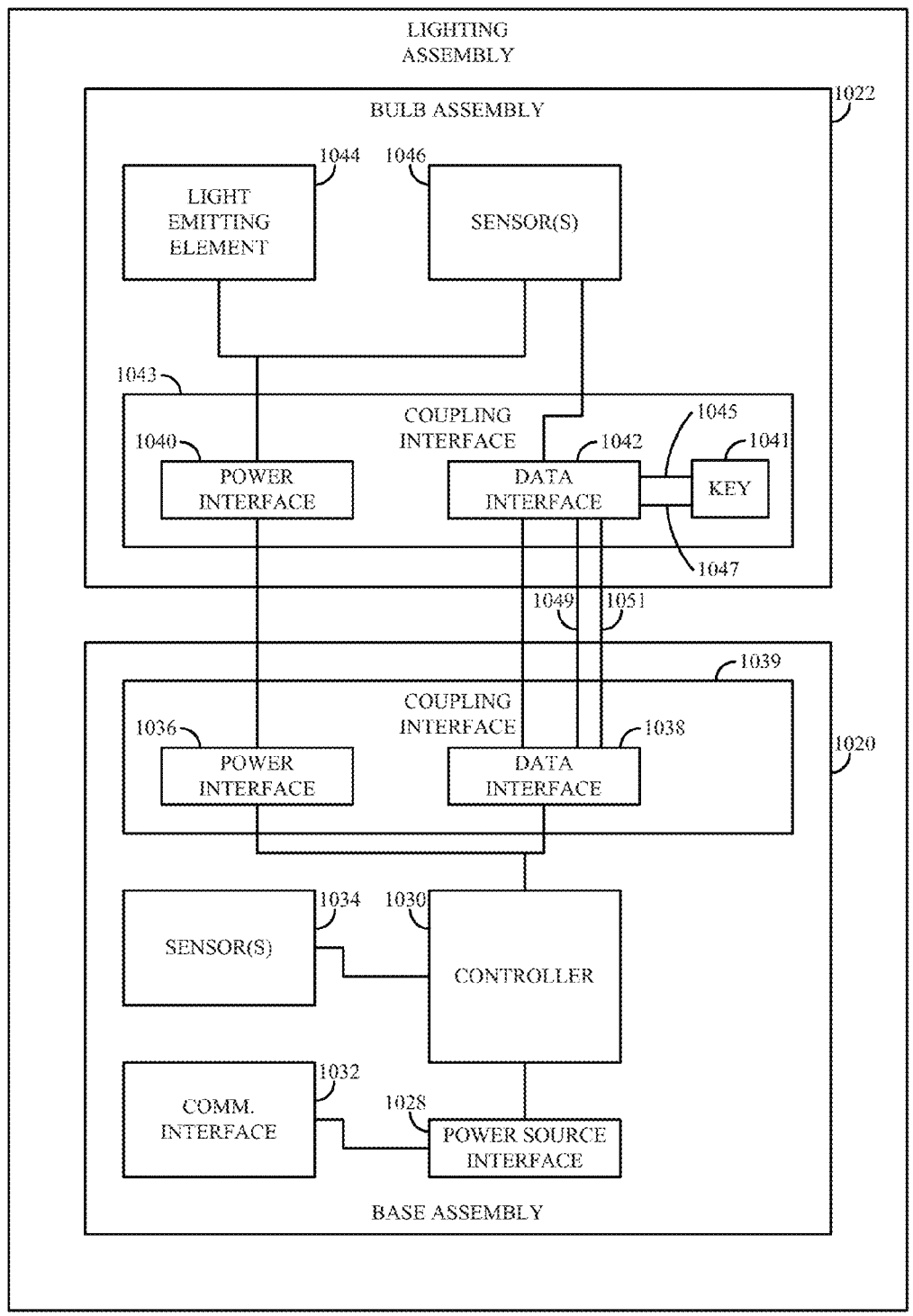
FIG. 38C is a block diagram of an exemplary embodiment of a lighting assembly including an electronic key mechanism.

As described briefly above, some embodiments of the base assembly 1020 and the bulb assembly 1022 may include one or more features interoperable to prevent the use of unauthorized bulb assemblies with the base assembly 1020. These "lock and key" features may be electronic, electrical, and/or mechanical in nature. FIG. 38C, depicts a block diagram of a lighting assembly similar to that depicted in FIG. 38B, but including an electronic and/or electrical lock and key interface. Specifically, the coupling interface 1043 of the bulb assembly 1022 includes an electronic key device 1041. The electronic key device 1041 may be a simple integrated circuit (IC) device, for example, operable to perform a specific function upon application of electrical power and/or receipt of a specific signal. The electronic key device 1041 may have a power interface (i.e., a pin or connection for receiving power; not shown) electrically coupled to the data interface 1042 via an electrical connection 1045, and a data interface (i.e., one or more pins or connections for receiving/transmitting data, not shown) electrically coupled to the data interface 1042 via an electrical connection 1047. As previously described, the data interface 1043 may be coupled to the data interface 1038 of the coupling interface 1039 in the base assembly 1020, and may include electrical connections 1049 and 1051 corresponding, respectively, to the power and data interfaces 1045 and 1047 to the electronic key device 1041. In this manner, the electronic key device 1041 may receive power and receive/transmit data from/to the controller via the data interface 1038.

Of course, the electronic key device 1041 could be any device operable to receive power from the base assembly 1020 when connected thereto and to transmit data, via wired or wireless signal, to the controller 1030 in the bulb assembly 1020. For example, the electronic key device 1041 could be a radio frequency identification (RFID) device operable both to receive wireless power and to transmit wireless data.

In any event, the controller 1030 is programmed not to provide power to the power interface 1036 (or through the power interface 1040 to the bulb assembly 1022) in the absence of a compatible bulb assembly 1022. That is, if the base assembly 1020 is connected to a power source (e.g., plugged into an AC main, secured in a conventional light bulb socket, etc.) the power interface 1036 is de-energized when not coupled to a bulb assembly 1022, or when the coupled bulb assembly 1022 is incompatible with the base assembly 1022 (i.e., if the bulb assembly 1022 does not include the electronic key device 1041 or if the electronic key device 1041 does not properly authenticate). The base assembly 1020 may provide a minimal power signal—for example, via the data interface or a wireless transmitter—to power the electronic key device 1041 when one is present. In response to receiving the power signal, the electronic key device 1041 may provide data, via the data interface or a wireless interface, to the base assembly 1020 and, in particular, to the controller 1030. Having received the data transmitted by the electronic key device 1041, the controller 1030 may interpret the received data and, accordingly, may selectively enable one or more functions. In embodiments in which the controller 1030 is implemented in the bulb assembly 1022, the key device 1041, correspondingly, may be located in the base assembly 1020.

Figure 38D:
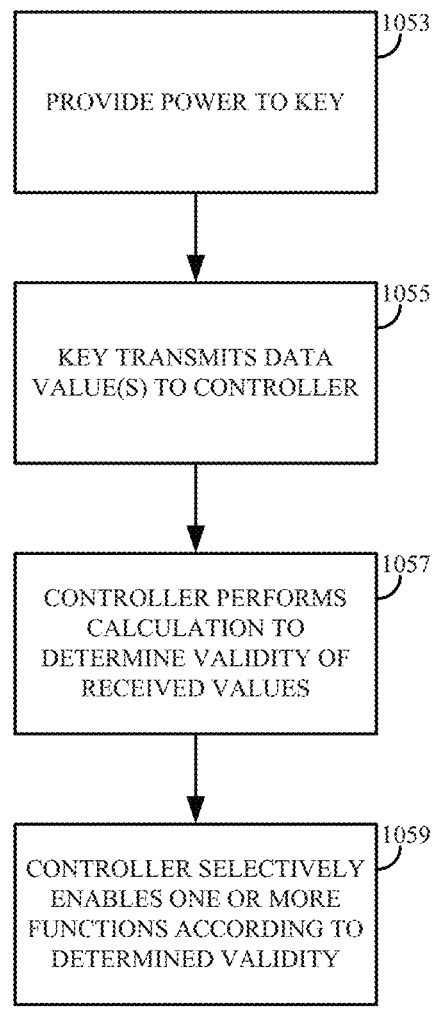
FIG. 38D is a flow chart illustrating an exemplary method of selectively enabling interoperability between a base and a bulb assembly.

FIG. 38D is a flow chart illustrating an exemplary method of selectively enabling interoperability between a base assembly 1020 and a bulb assembly 1022. When the bulb assembly 1022 is coupled to the base assembly 1020, power is provided to the electronic key device 1041 (block 1053). The electronic key device 1041 transmits one or more data values to the controller 1030 in the base assembly 1020 (block 1055). The one or more data values may include, for example, a serial number of the bulb assembly. The data, whether or not in the form of a serial number, may be programmed according to any algorithm and, in particular, to an algorithm that may make it difficult to reliably replicate the data without foreknowledge of the algorithm. In some embodiments, the data (again, whether or not in the form of a serial number) may include information indicative of one or more properties of the bulb assembly including, by way of example and not limitation: presence and type of sensors integrated in the bulb assembly, number and type of circuits implemented in the bulb assembly, compatibility with various functions such as timers, dimmers, and the like, bulb shape, communication protocols implemented, color(s) available on the lighting element, etc.

Having received the data transmitted from the electronic device key 1041, the controller 1030 may perform one or more calculations and/or operations to determine the validity of the received values (block 1057). For example, the controller 1030 may use one or more portions of the received data as inputs to an algorithm, and compare the output of the algorithm to one or more portions of the received data. If the controller 1030 determines that the data is valid (at block 1057) and, therefore, that the bulb assembly 1022 is compatible, the controller 1030 selectively enables one or more functions according to the determined validity (block 1059). The one or more functions may include, for example and without limitation: providing power to the power interface 1036 to power the bulb assembly 1022, providing dimming or timer functionality, controlling one or more circuits in the bulb assembly 1022, responding to one or more sensors in the bulb assembly 1022 or the base assembly 1020, or any other function described herein.

Figure 38E:
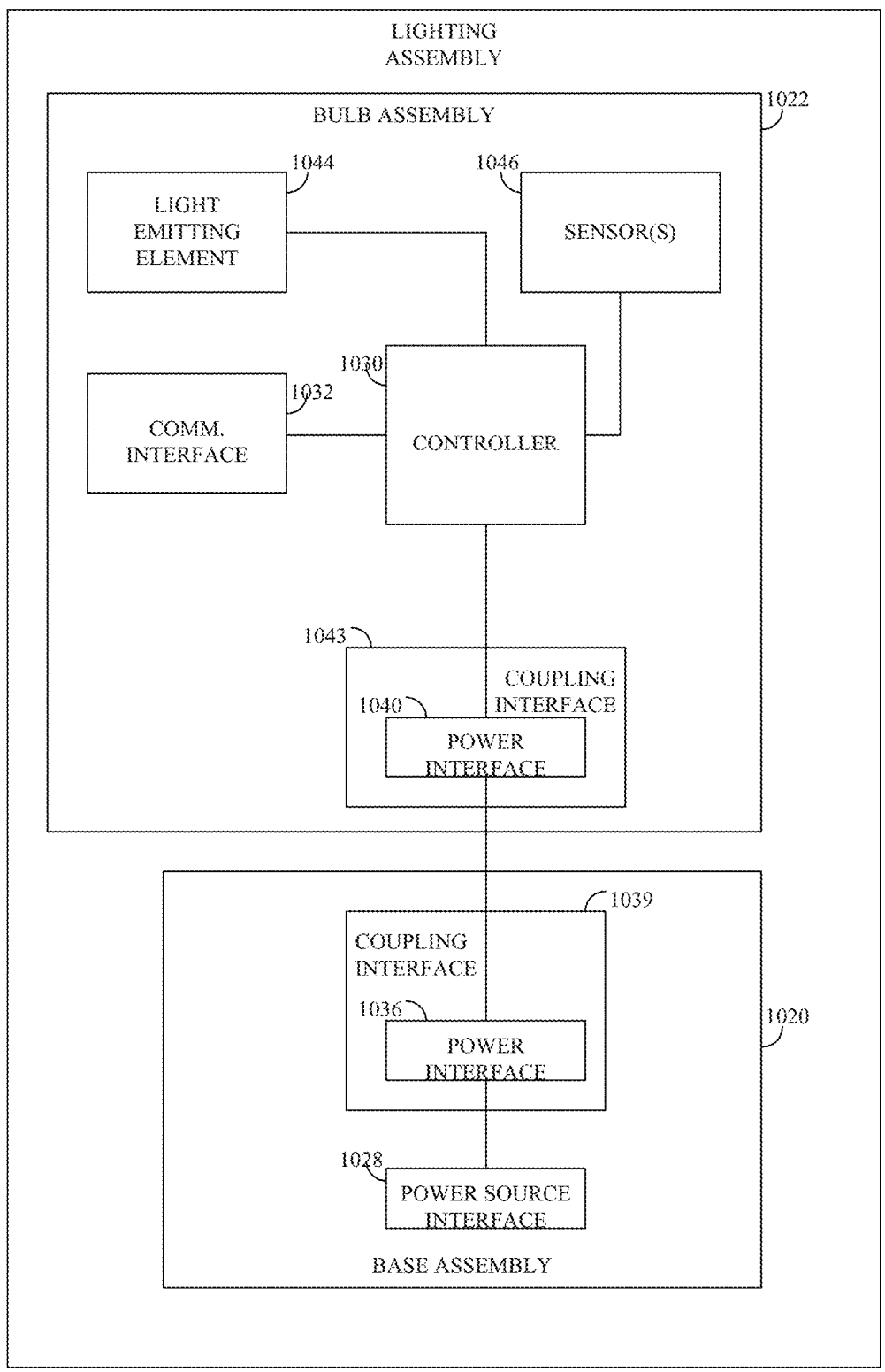
FIG. 38E is a block diagram of a third exemplary embodiment of a lighting assembly.

In some embodiments, one or more features of the lighting assembly described above has being disposed in the base assembly 1020 may, instead, be disposed in the bulb assembly 1022. Specifically, in some embodiments, one or both of the controller 1030 and/or the communications interface 1032 may reside in the bulb assembly 1022, as depicted in FIG. 38E. In these embodiments, it may be unnecessary for the coupling interface 1039 and/or the coupling interface 1043 to include respective data interfaces 1038 and 1042, as only power need be supplied to the bulb assembly 1022. Thus, each of the coupling interfaces 1039 and 1043 may include a power interface 1036 and 1040, respectively, for transferring power from the base assembly 1020 to the bulb assembly 1022. In turn, the power interface 1040 may provide power to the controller 1030, which may provide power to the communication interface 1032, the light emitting element 1044, the sensors 1046, etc. Of course, each of the communication interface 1032, the light emitting element 1044, and/or the sensors 1046 could be powered directly from the power interface 1040, in some embodiments. Embodiments including such a "smart bulb" may ensure that bulb assemblies having varied configurations and/or varied functionality likewise include corresponding controllers configured and/or programmed to support those configurations and/or functionality. For example, a bulb assembly having two illumination circuits may have a controller configured and/or programmed to control both illumination circuits independently, a bulb assembly having an integrated ambient light sensor may have a controller configured and/or programmed to receive and respond to signals from the sensor, etc.

Figure 39:
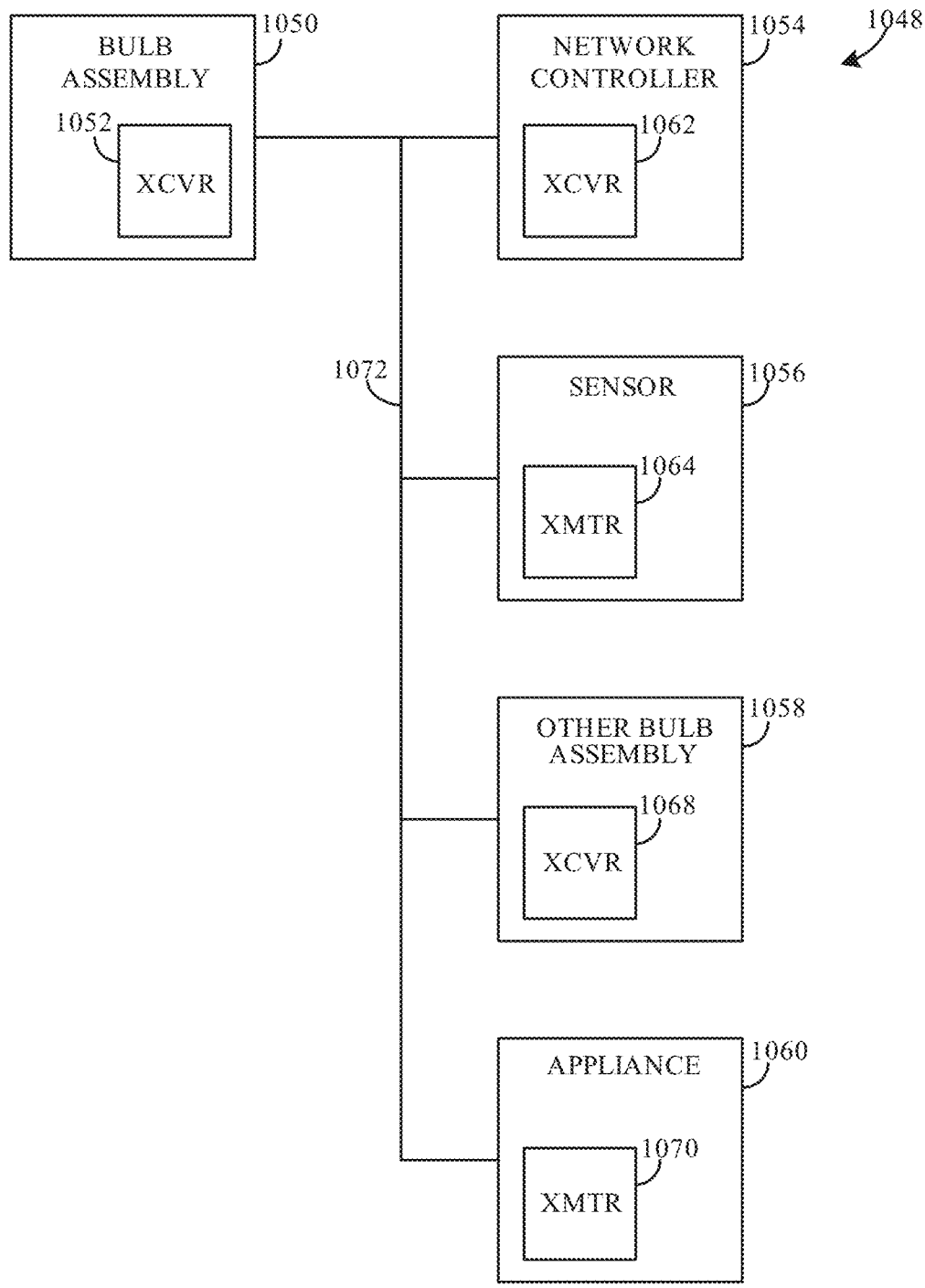
FIG. 39 is a block diagram of an exemplary home automation network implementing a lighting assembly in accordance with the presently described embodiments.

Various embodiments of the bulbs, bases, and assemblies described herein may be communicatively coupled to one or more other devices, for example, the communication interface 1016 or the communication interface 1032. FIG. 39 depicts a device network 1048. The device network 1048 includes an assembly 1050, which may be similar to the assembly 1000 of FIG. 37B or to the bulb assembly 1022 of FIG. 38B. In any event, the assembly 1050 includes a communication interface (e.g., the communication interface 1016 with the communication interface 1032) and, in particular, includes one or more transceivers 1052. The assembly 1050 may communicate, using the transceiver 1052, with one or more other devices. The other devices may include one or more controllers 1054, one or more sensors 1056, one or more other bulb assemblies 1058, one or more appliances 1060, and/or any other device compatible with the physical and logical network implemented. Each controller 1054, sensor 1056, other bulb assembly 1058, appliance 1060, or other device may include a receiver, a transmitter, and/or a transceiver. For example, each of the controller 1054, the other bulb assemblies 1058, and the appliances 1060, may include a transceiver 1062, 1068, and 1070, respectively, while the sensors 1056 may include only transmitters 1064. A physical network 1072, which would may be wired or wireless, communicatively connects the transceivers 1052, 1062, 1068, and 1070, and the transmitter 1064.

The device network 1048 may be, for example, a home automation network. As such, the physical network 1072 may be a wired network, such as optical fiber, cable, digital subscriber line (DSL), twisted-pair, universal serial bus (USB), FireWire, power lines, etc. The physical network 1072 may also be a wireless network, using any RF, infrared, or other wireless technology. By way of example, and not limitation, wireless networks may include IEEE 802.11 (WiFi), wireless telephony standards such as GPRS, UMTS, Bluetooth, and any other compatible wireless network. The devices on the device network 1048 may communicate with one another over the physical network 1072 using any proprietary or open standard adapted for home automation purposes. Well known home automation protocols include the X10 protocol, Universal powerline bus (UPB), ONE-NET, and ZigBee, among others.

The devices 1050, 1054, 1056, 1058, and 1060 may cooperate using the device network 1072 to provide home automation capability. In some embodiments, the controller 1054 may be an X10 controller, operable to receive commands from and/or send commands to the other devices on the network 1072. For example, the controller 1054 may receive, via the transceiver 1062, commands from the sensors 1056 (i.e., signals transmitted by the transmitter 1064) and may send commands to other devices on the network 1072 such as the assembly 1050. Depending on the protocol implemented by the controller 1054 and the devices on the network 1072, the commands transmitted to the devices on the network 1072 and, in particular, to the assembly 1050, include turning on the device, turning off the device, increasing or decreasing brightness, requesting a status, or executing a pre-programmed mode.

In some embodiments, the controller 1054 may be, or may be communicatively coupled to, a mobile device (not shown). The mobile device may execute one or more applications operable to send and/or receive commands on the device network 1072, or may be operable to send commands to and/or to receive commands from the controller 1054, where the controller 1054 is coupled to the mobile device. Such applications are described in related application WO 2012/148385, entitled "Sensing and Adjusting Features of an Environment." For example, in some embodiments, the mobile device is a smart-phone device (or a personal digital assistant, portable media player, tablet computer, etc.) executing an application adapted for execution on the smart-phone device. The application may communicate through a wireless (or a wired) interface between the mobile device and a corresponding transceiver on the device network 1072, which transceiver may be part of (or communicatively coupled to) the controller 1054. The mobile device may transmit commands directly to and/or receive commands directly from the device network 1072, or may do so via an intermediary controller such as the controller 1054.

Figure 40:
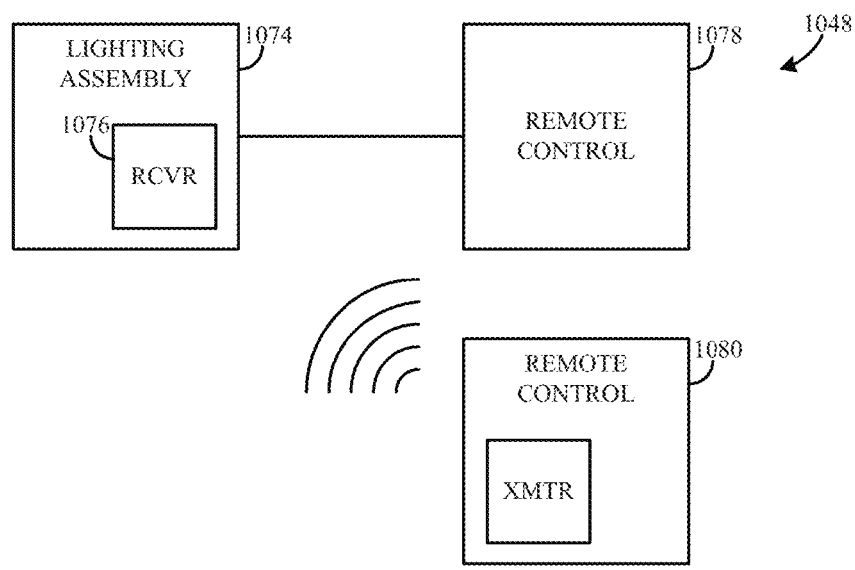
FIG. 40 is a block diagram of an exemplary lighting system in which an exemplary lighting assembly receives commands from a remote control.

In some embodiments, a conventional remote control (which may be a wall-mounted control panel, in some embodiments) may allow a user to control an assembly including the lighting element disclosed herein. FIG. 40 depicts a block diagram of a lighting assembly 1074. The lighting assembly 1074 includes one or more receivers 1076 for receiving one or more command signals from one or more remote control devices. The remote control devices may be a wired remote 1078 or a wireless remote 1080. In some embodiments, a lighting assembly 1074 may include one or more receivers operable to receive signals from both the wired remote 1078 and a wireless remote 1080. Of course, while the wireless remote control 1080 may implement an infrared communication protocol (e.g., IrDA) or an RF protocol, the wireless remote control 1080 may transmit commands via any wireless protocol adapted to be used for such control. Similarly, the wired remote control 1078 may be wired specifically to the lighting assembly 1074, or may communicate with the receiver 1076 via a power wiring, such as with Universal powerline bus. In any event, the remote control 1078 and/or the remote control 1080 may operate to cause the lighting assembly 1074 to turn on, to turn off, to brighten, to dim, to enter a preset mode, or to activate any other function associated with the lighting assembly 1074, including other functions described in greater detail below.

Figure 41:
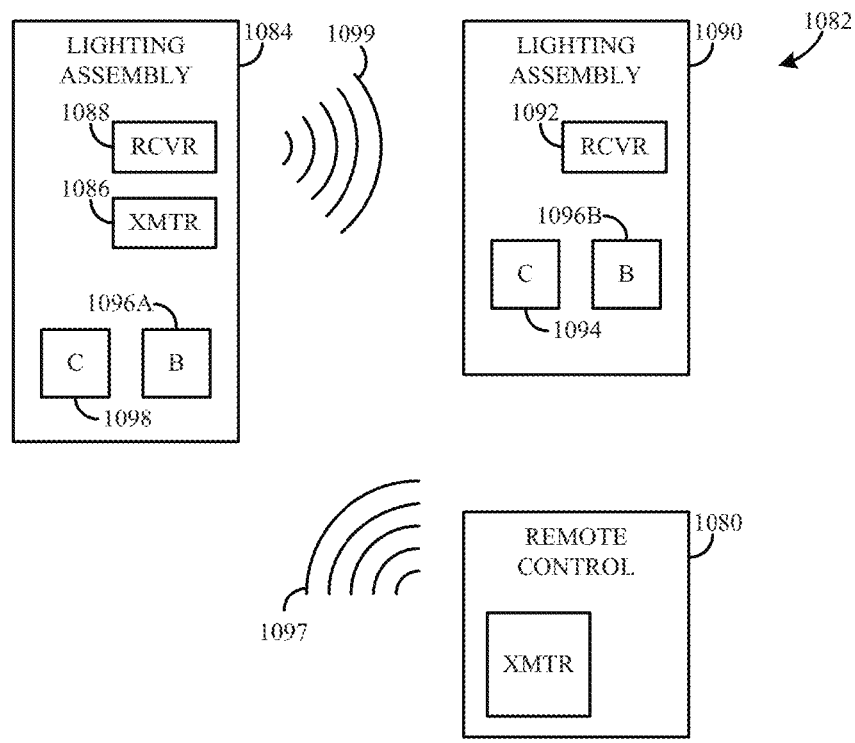
FIG. 41 is a block diagram of an exemplary lighting system in which an exemplary lighting assembly cooperates with another lighting assembly.

In some embodiments, one lighting assembly may serve to provide remote control functionality with respect to another lighting or assembly. FIG. 41 depicts a system 1082 implementing such "cascading" control. A first lighting assembly 1084 may include a bulb assembly 1022 and a base assembly 1020, as depicted in FIG. 38B, or may be integrated as in the lighting assembly 1000 depicted in FIG. 37B. In any event, the lighting assembly 1084 includes a bulb or other light emitting element(s) 1098, a controller 1096A, one or more transmitters 1086, and one or more receivers 1088. The receiver 1088 may be operable to receive one or more signals 1097 from a remote control device 1080, from the home automation controller 1054, or from other lighting assemblies 1050.

By operation of the transmitter 1086, the lighting assembly 1084 may also transmit and/or relay commands and/or signals to other lighting assemblies, such as the lighting assembly 1090, also depicted in FIG. 41. In this manner, the remote control 1080 may transmit the signal 1097 to the lighting assembly 1084. The signal 1097 may be received by the receiver 1088 and retransmitted as a signal 1099 by the transmitter 1086. The signal 1099 may be received by a receiver 1092 and the lighting assembly 1090.

In some embodiments, a sensor communicatively coupled to the lighting assembly 1084 may cause an action in the lighting assembly 1084 (e.g., turning on the bulb assembly 1098), and the lighting assembly 1084 may, in turn, cause the lighting assembly 1090 to take a similar or different action. For example, if the sensor is implemented as a low-light detector, detection of low lighting conditions by sensor may cause the lighting assembly 1084 and, in particular, the controller 1096A to switch on the bulb assembly 1098, and the transmitter 1086 within the lighting assembly 1084 may transmit the signal 1099 for reception by the receiver 1092 in the lighting assembly 1090. An instruction encoded on the signal 1099 may instruct the lighting assembly 1090 and, in particular, the controller 1094 to activate the bulb assembly 1094 within the lighting assembly 1090.

Figure 42:
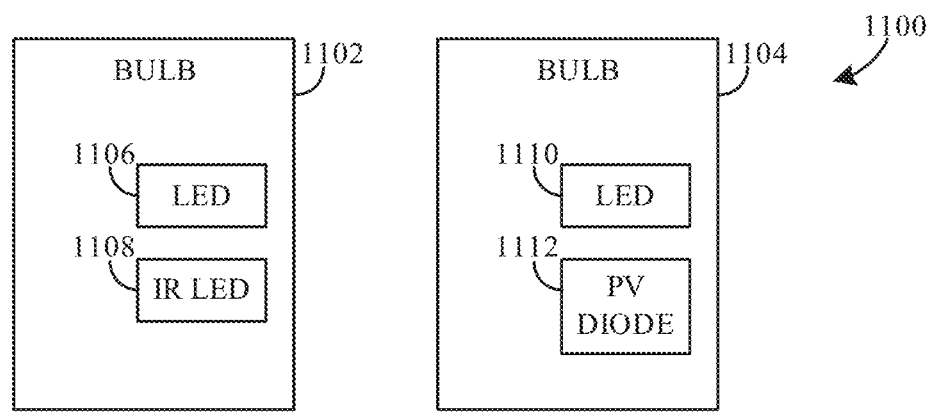
FIG. 42 is a block diagram of two exemplary bulb assemblies.

In some embodiments, the transmitter 1086 may be implemented as a circuit within the bulb 1096A and/or the receiver 1092 may be implemented as a circuit within the bulb 1096B. In an exemplary embodiment depicted in FIG. 42, a system 1100 includes a first bulb 1102 and a second bulb 1104, which may be disposed in respective lighting assemblies, such as the lighting assemblies 1084 and 1090. The bulb 1102 may include a first circuit 1106 implementing an LED light emitting apparatus, and a second circuit 1108 implementing an IrDA transmitter. Likewise, the bulb 1104 may include a first circuit 1110 implementing an LED light emitting apparatus, and a second circuit 1112 implementing an IrDA receiver. The circuits 1106 and 1108 may be arranged such that the circuit 1108 forms a band around an outer circumference of the bulb 1102.

Figure 43:
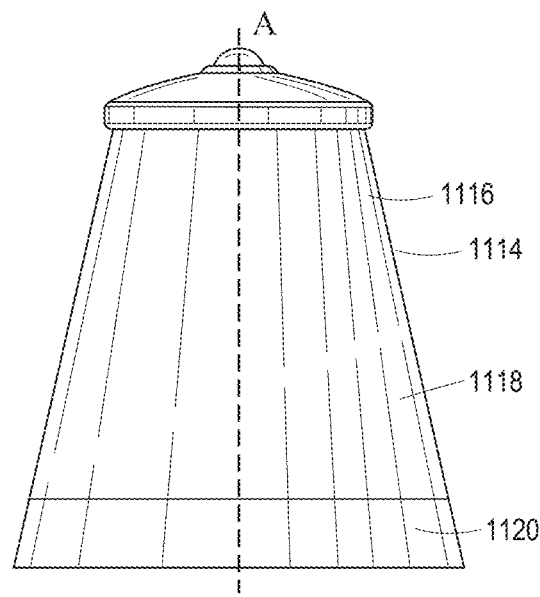
FIG. 43 is a side view illustrating an exemplary bulb assembly.

For example, FIG. 43 depicts a bulb 1114 implemented as a truncated, right circular cone. An exterior surface 1116 of the bulb 1114 includes a first area 1118 in which visible-light emitting elements, such as the LEDs described herein, are disposed, and a second area 1120 in which infrared light-emitting elements are disposed. In this manner, a lighting assembly such as the lighting assembly 1084 of FIG. 41 may transmit an infrared signal that radiates, generally transverse to an axis A, outwardly from the bulb 1114 in all directions. Likewise, the second area 1120 may include infrared light-receiving elements. In this manner, a lighting assembly such as the lighting assembly 1090 of FIG. 41 may receive an infrared signal from any direction generally transverse to the axis A.

The second circuit 1108 of the bulb 1102 (i.e., the transmitter) may be communicatively coupled to a controller such as the controller 1098 of the lighting assembly 1084. Likewise, the second circuit 1112 of the bulb 1104 may be communicatively coupled to a controller such as the controller 1094 of the lighting assembly 1090. In embodiments in which the lighting assembly comprises a bulb assembly and a base assembly, separately formed, the respective signals between the controller and the respective second circuits 1108 and 1112 of the bulbs 1102 and 1104 may pass through a coupling mechanism as described in further detail below.

Of course, the transmitter 1086 and the receiver 1092 need not implement the IrDA protocol. The transmitter 1086 and the receiver 1092 could, instead, implement a proprietary infrared protocol or, in fact, could implement any suitable wireless protocol. Moreover, the individual transmitter 1086 and receiver 1092, while depicted in FIGS. 42 and 43 as implemented in the bulbs 1102 and 1104, respectively, need not be disposed in the bulbs and may instead be disposed within a base such as the base assembly 1020 depicted in FIG. 38B.

Figure 44:
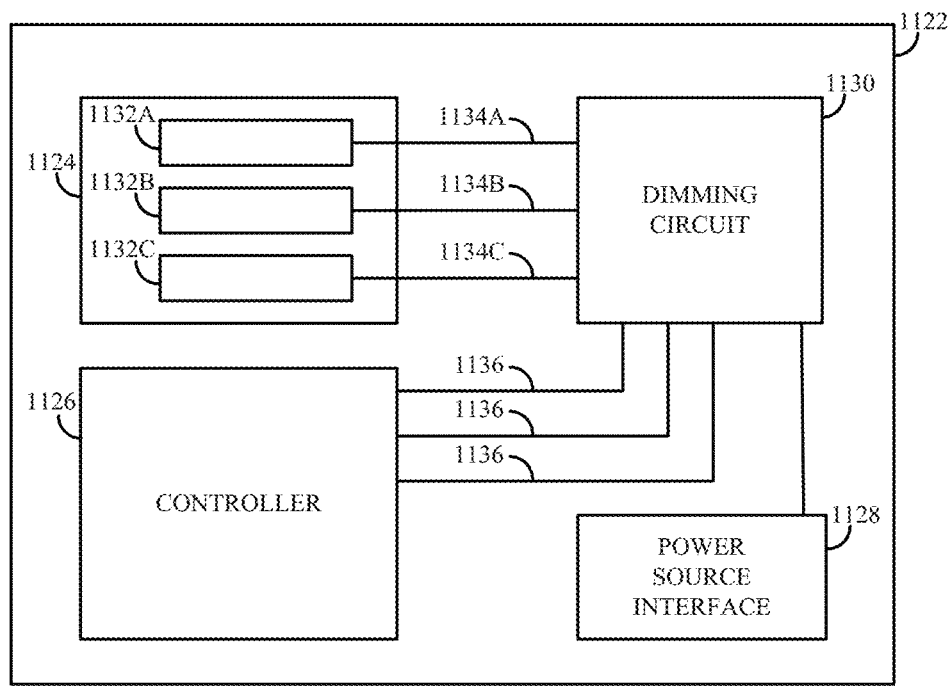
FIG. 44 is a block diagram of an exemplary lighting assembly including a dimming circuit.

Lighting assemblies implementing the lighting apparatus described herein, may also include integrated dimming circuitry. FIG. 44 depicts a lighting apparatus 1122. The lighting apparatus 1122 includes a bulb 1124, a controller circuit 1126, a power interface 1128, and the dimming circuitry 1130. The bulb 1124 may be an illuminated sheet, in some embodiments. As described above, the power interface 1128 is electrically coupled to the controller circuit 1126 and, directly or indirectly, to the bulb 1124. The bulb 1124 is depicted as having multiple illuminating circuits 1132A, 1132B, 1132C. Each of the multiple illuminating circuits 1132A, 1132B, and 1132C, is powered separately via the dimming circuit 1130. The illuminating circuits 1132A, 1132B, and 1132C are electrically coupled to the dimming circuitry 1130 via connections 1134A, 1134B, and 1134C, respectively. The controller 1126 may provide control signals to the dimming circuitry 1130, via one or more control lines 1136. In some embodiments the power interface 1128 provides to the dimming circuitry 1130 a desired voltage for lighting each of the multiple illuminating circuits 1132A-C, while providing to the controller 1126 a desired voltage for operating the components comprising the controller 1126. In other embodiments, the power interface 1128 provides to the controller 1126 a desired voltage for operating each of the multiple illuminating circuits 1132A-C, and the desired voltage for each of the multiple illuminating circuits 1132A-C is provided to the dimming circuitry 1130. Additionally, in some embodiments, one or more signals may pass directly between the controller 1126 and the bulb 1124, such as in the instance that a sensor is embedded in the bulb 1124 (see, e.g., FIG. 43). In some embodiments, the dimming circuitry 1130 may implement pulse width modulation to control the brightness of one or more of the illuminating circuits 1132A-C.

Figure 45:
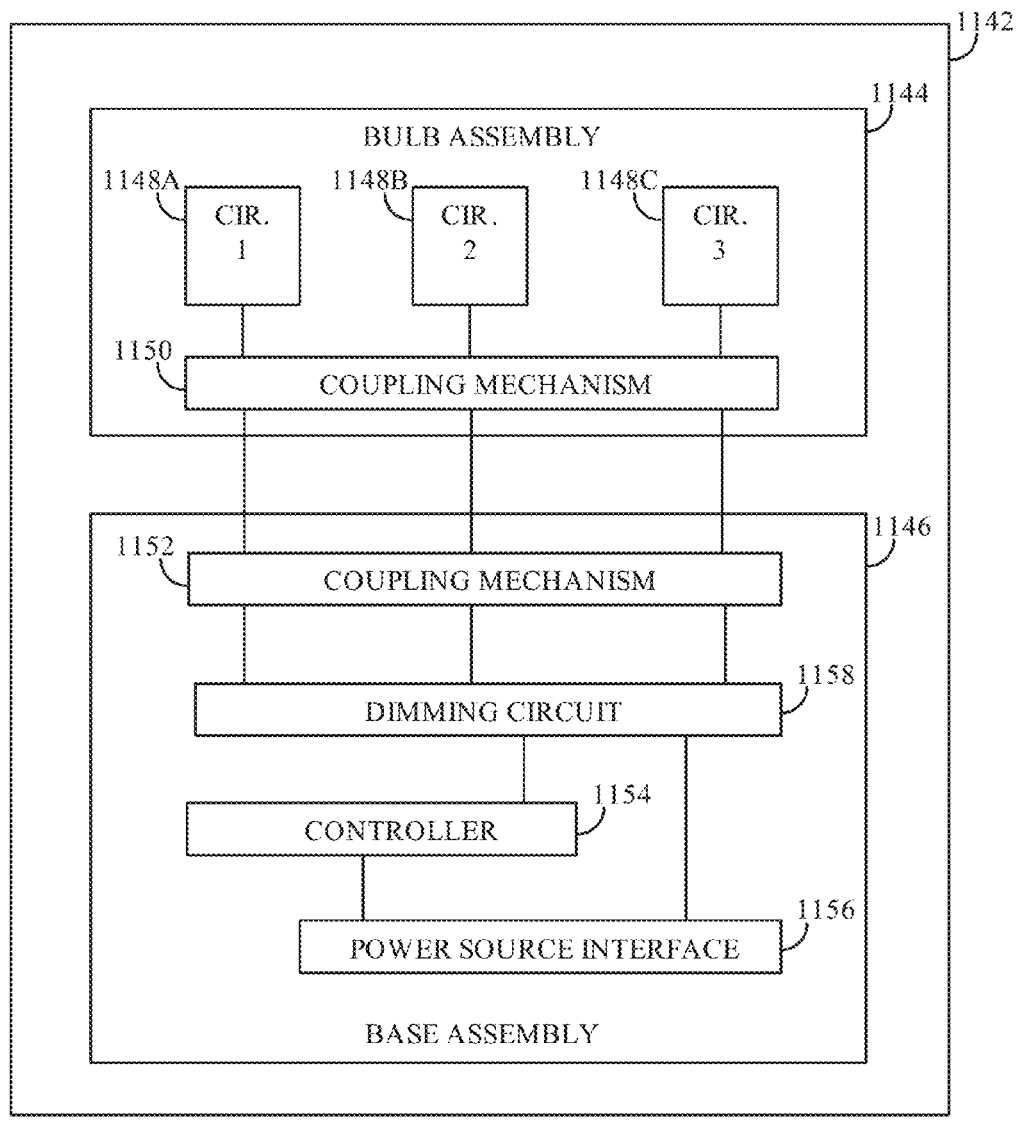
FIG. 45 is a block diagram of a second exemplary lighting assembly including a dimming circuit.

Like FIG. 44, FIG. 45 depicts a lighting assembly 1142 including integrated dimming circuitry. The lighting assembly 1142 includes a bulb assembly 1144 and a base assembly 1146. Similarly to the lighting assembly 1122, the bulb assembly 1144 is depicted as having three illuminating circuits 1148A-C. The illuminating circuits 1148A-C are electrically coupled to a coupling mechanism 1150. The coupling mechanism 1150 in the bulb assembly 1144 is coupled electrically and mechanically with a corresponding coupling mechanism 1152 in the base assembly 1146. The base assembly 1146, in addition to the coupling mechanism 1152, includes a controller 1154, a power interface 1156, and a dimming circuit 1158. As with the lighting assembly 1122, the power interface 1156 electrically couples the lighting assembly 1142 to a power source (not shown). The power interface 1156 transforms, adapts, switches, filters, conditions, and/or performs impedance matching on the electrical signal received from the power source, and provides one or more electrical signals to the controller 1154 and to the dimming circuitry 1158. The electrical signals provided by the power interface 1156 to the controller 1154 include an electrical signal adapted to power the components of the controller 1154, and may also include an electrical signal adapted to power the bulb assembly 1144. The electrical signal adapted to power the bulb assembly 1144 may, in turn, be provided by the controller 1154 to the dimming circuitry 1158 and, through the coupling mechanisms 1152 and 1150, to the lighting circuits 1148A-C. Alternatively, the power interface 1156 may provide an electrical signal adapted to power the illuminating circuits 1148A-C directly from the dimming circuitry 1158.

The dimming circuitry 1158, in turn, provides one or more electrical signals to the illuminating circuits 1148A-C, via the coupling mechanisms 1152 and 1150, according to one or more signals received from the controller 1154. Of course, some embodiments may have more or less than three illuminating circuits 1148A-C and, accordingly, the dimming circuitry 1158 may provide more or less than three signals. For example, some bulb assemblies 1144 (or bulbs 1124) may have only a single illuminating circuit 1148, and only a single signal provided to the illuminating circuit 1148 from the dimming circuitry 1158.

The dimming circuitry 1158 will now be described with reference to FIG. 46, which depicts an exemplary dimming circuitry block 1160. In the dimming circuitry 1160 an electrical signal 1162, which may be provided by a power interface (e.g., the power interface 1156) directly or through a controller (e.g., the controller 1154), may be selectively provided to the one or more illuminating circuits (e.g., circuits 1148A-C) through one or more switches 1164A-C. In lighting assemblies having multiple illuminating circuits, selectively switching on each of the illuminating circuits may be sufficient to provide multiple levels of brightness. That is, if each of the illuminating circuits provides the same level of illumination (e.g., equivalent to a 50 W incandescent bulb), the light output of the lighting assembly may be one, two, or three times that level of illumination (e.g., equivalent to a 50-100-150 W three-way bulb). Alternatively, the multiple illuminating circuits may each illuminate at different levels to provide additional lighting levels. For example, if the lighting assembly has three illuminating circuits with levels of illumination equivalent to 20, 40, and 80 W incandescent light bulbs, lighting levels equivalent to 20, 40, 60, 80, 100, 120, and 140 W could be provided by selectively providing a power signal to one, two, or three of the illuminating circuits.

Figure 46:
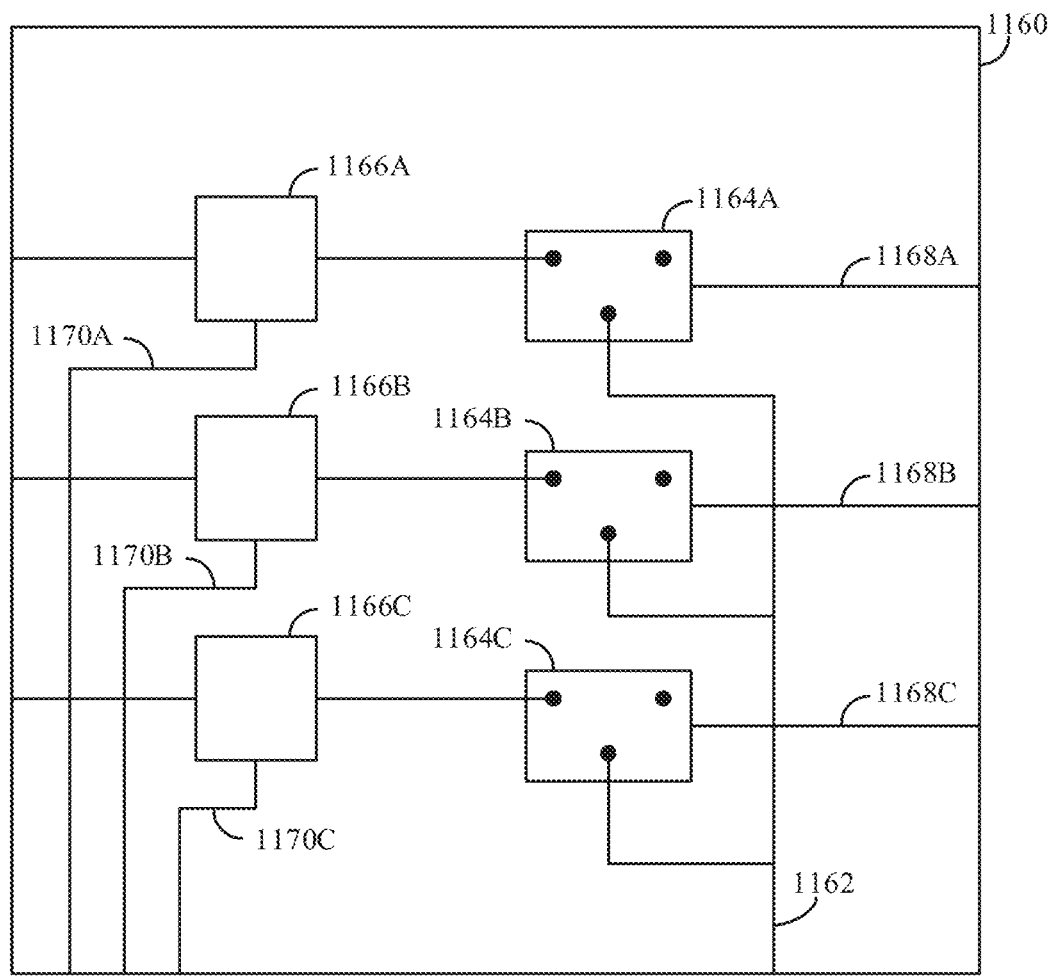
FIG. 46 is a block diagram illustrating an exemplary embodiment of a dimming circuit that may be implemented in an exemplary lighting assembly.

Alternatively, or additionally as depicted in FIG. 46, a triac circuit 1166A-C may be disposed between each illuminating circuit and the respective switch 1164A-C selectively providing power to the illuminating circuits. As generally known, the triac circuits 1166A-C may include a capacitor and a variable resistor, in addition to a triac. By varying the resistance of the variable resistor in an individual triac circuit 1166, the amount of energy provided to the attached illuminating circuit (and, therefore, the amount of light produced by the illuminating circuit) may be varied. The combination of the switches 1164 and the triac circuits 1166 allows for greater variability in the lighting intensity. Of course, any known dimming technology compatible with the implemented lighting element and adapted for use with the illuminating circuits described herein may be used.

A controller (e.g., the controller 1154) may, via control lines 1168A-C, provide control signals necessary to activate the switches 1164A-C and/or may provide, via control lines 1170A-C, the control signals necessary to vary the resistance of the variable resistor in each triac circuit 1166A-C. In some embodiments, the switches 1164A-C may be solid-state switches. In some embodiments, the dimming circuitry 1160 (or the controller providing signals to the dimming circuitry 1160) may include other components, including by way of example and not limitation, digital-to-analog converters and analog-to-digital converters.

Figure 47:
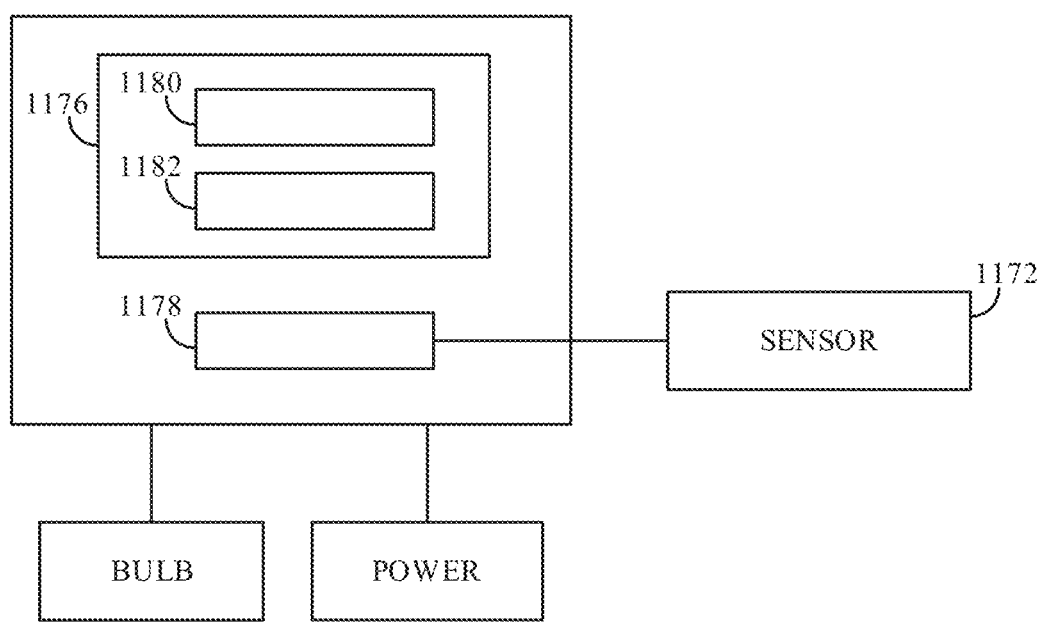
FIG. 47 is a block diagram of an exemplary lighting assembly including a sensor.

The lighting assembly, whether implemented as a single unit (as in FIG. 44) or as coupled sub-assemblies (as in FIG. 45), may include one or more sensors and/or detectors. The sensors/detectors may include one or more of light detectors, motion detectors, sound detectors, temperature sensors, pressure sensors, voltage detectors, smoke detectors, carbon monoxide detectors, and the like. Each of the one or more sensors and/or detectors may be incorporated into the base assembly, may be incorporated into the bulb assembly, or may be a module adapted for communicative and/or physical coupling to the lighting assembly. FIG. 47 depicts a single sensor 1172 electrically coupled to a controller 1174. The controller 1174 includes a control logic block 1176, and an I/O block 1178. The I/O block 1178 may include any circuitry implemented for the purpose of receiving an input signal or transmitting an output signal and, in particular, may function to receive signals from the sensor 1172, to receive one or more electrical signals from a power source, to output one or more electrical signals to a bulb, to output one or more control signals, etc.

FIG. 47 depicts the logic block 1176 as including a general purpose processor 1180 and a memory 1182. The memory 1182, which may include one or both of non-volatile memory and volatile memory, may store instructions executable by the processor 1180 to implement one or more control algorithms on the processor 1180. So programmed by the instructions stored on the memory device 1182, the processor 1180 may become a special-purpose processor. The one or more control algorithms may perform specified actions in response to various stimuli. Without limitation, exemplary control algorithms may:

(1) energize an illuminating circuit in response to a signal from a light detector (i.e., a photovoltaic diode) falling below a predetermined threshold level;

(2) de-energize an illuminating circuit in response to a signal from a light detector falling below a predetermined threshold level;

(3) energize an illuminating circuit in response to a signal from a light detector rising above a predetermined threshold level;

(4) de-energize an illuminating circuit in response to a signal from a light detector rising above a predetermined threshold level;

(5) progressively increase the brightness of an illuminating circuit in response to a decreasing signal from a light detector;

(6) progressively decrease the brightness of an illuminating circuit in response to a decreasing signal from a light detector;

(7) progressively increase the brightness of an illuminating circuit in response to an increasing signal from a light detector;

(8) progressively decrease the brightness of an illuminating circuit in response to an increasing signal from a light detector;

(9) energize an illuminating circuit in response to a signal from a sound detector;

(10) de-energize an illuminating circuit in response to a lack of signal from a sound detector;

(11) energize an illuminating circuit in response to a signal from a motion detector;

(12) de-energize an illuminating circuit in response to a lack of signal from a motion detector; or

(13) energize an illuminating circuit in response to a signal from a smoke detector indicating the detection of smoke.

The logic block 1176 may, alternatively, be implemented in hardware instead of software. That is, instead of the processor 1180 and the memory 1182, the logic block 1176 may be implemented as a field-programmable gate array (FPGA) or an ASIC.

In some embodiments, the sensor 1172 is a sound detector (e.g., a microphone), which cooperates with the controller 1174 to execute one or more commands in response to a signal from the sound detector. In specific embodiments, computer executable instructions stored on the memory 1182 may be used to configure the processor 1180 to include speech processing capability, and to recognize a set of commands (e.g., "light on," "light off," etc.) issued vocally by a user and detected by the sound detector. In other embodiments, the logic block 1176 may include a special purpose processor (not shown), such as a digital signal processor (DSP), an ASIC, an FPGA, or a specially-programmed general-purpose processor, in addition to the processor 1180, for implementing speech recognition. In still other embodiments, the processor 1180 may be configured to recognize auditory signals other than (or in addition to) voice commands. For example, the processor 1180 may be configured to recognize signals transmitted from a sound detector in response to clapping, whistling, and the like. The implementation of control in response to sound detection could, additionally, provide an interface to cascading or home automation control, such as allowing a user to issue a command affecting multiple lighting assemblies. For example, a user could issue a command such as "all lights off," which could cause the lighting assembly to relay the command to a home automation controller and/or to issue a command to other lighting assemblies directly.

Figure 48:
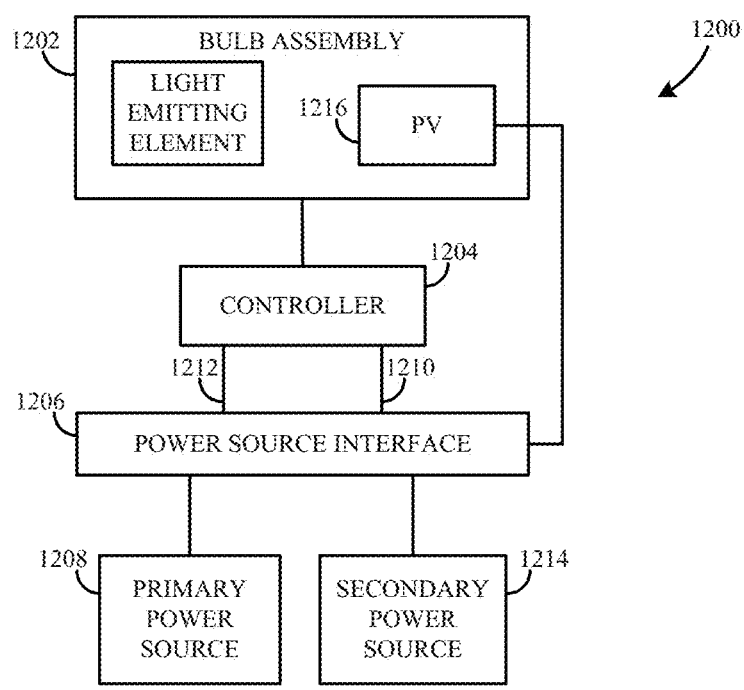
FIG. 48 is a block diagram of an exemplary lighting assembly having a secondary power source.

FIG. 48 depicts an embodiment of a lighting assembly 1200. The lighting assembly 1200 includes a bulb 1202, a controller 1204, and a power interface 1206. The power interface 1206 may be connected to a primary power supply 1208. In some embodiments, the primary power source 1208 is a mains line (e.g., 120 V AC at 60 Hz), while in other embodiments, the primary power source 1208 is a power storage device (e.g., a battery). The power interface 1206 may receive as input an electrical signal from the primary power source 1208, and may receive one or more electrical signals operable to power the components of the controller 1204 and the bulb 1202. The one or more electrical signals may include a first electrical signal for powering the components of the controller 1204 and a second electrical signal for powering the bulb 1202. Alternatively, if the bulb 1202 and the controller 1204 require the same voltage operation, the power interface 1206 may provide a single electrical signal to the controller 1204 and to the bulb 1202.

The power interface 1206 may also receive and/or provide to the controller 1204 one or more additional signals. For example, one or more home automation protocol signals (e.g., X10 signals) may be carried by an AC signal provided by the primary power source 1208. The home automation protocol signals may be received with the AC electrical signal at the power interface 1206. The power interface 1206 may, via appropriate filtering, separate the home automation protocol signal from the AC electrical signal, and may pass the home automation protocol signal to the controller 1204 via a data connection 1210. Concurrently, the power interface 1206 may appropriately condition the AC electrical signal (e.g., by converting the AC electrical signal to a low-voltage DC electrical signal), and may pass the conditioned signal to the controller 1204 to provide operating power for the components thereof, via a power connection 1212.

The lighting assembly 1200 and, in particular, the power interface 1206, may additionally be connected to a secondary power source 1214. The secondary power source 1214 may be a secondary mains line or a power storage device such as a battery or a capacitive device. Like the primary power source 1208, the secondary power source 1214 may provide an electrical signal to the power interface 1206, from which the power interface 1206 may derive one or more electrical signals for provision, via the electrical connection 1212, to the controller 1204.

In some embodiments, the power interface 1206 selectively provides to the controller 1204 and/or the bulb 1202 an electrical signal derived from either the primary power source 1208 or the secondary power source 1214. The power interface 1206 may select either the primary power source 1208 or the secondary power source 1214 according to one or more criteria. The one or more criteria may include, by way of example and not limitation, availability of the primary power source 1208, stability of the electrical signal provided by the primary power source 1208, quality of the electrical signal provided by the primary power source 1208, cost of the power provided by the primary power source 1208, etc. Circuitry and/or program logic for evaluating the one or more criteria used to select between the primary power source 1208 or the secondary power source 1214 may be part of the power interface 1206, the controller 1204, or both.

In some embodiments, the primary power source 1208 may be an AC mains supply while the secondary power source 1214 may be a battery. If the primary power source 1208 becomes unstable or unavailable, the controller 1204 and/or the power interface 1206 may cause the bulb 1202 (and the controller 1204) to operate from the secondary power source 1214. For example, in embodiments where the secondary power source 1214 is a capacitive device, the power interface 1206 and/or the controller 1204 draw power from the secondary power source 1214 to carry the bulb 1202 and/or the controller 1204 through voltage sags experienced by the primary power source 1208. In another example, a capacitive device employed as the secondary power supply 1214 may be sufficient to provide full or reduced power to all, or fewer than all, of one or more illuminating circuits in the bulb 1202, allowing the bulb 1202 to continue to provide full or partial illumination for some period of time after the primary power supply 1208 becomes unavailable.

Also, in some embodiments in which the secondary power source 1214 is a power storage device, the secondary power source 1214 may be charged using power from the primary power source 1208. The use of power from the primary power source 1208 to charge the secondary power source 1214 may be regulated by the power interface 1206. Additionally, or alternatively, one or more photovoltaic devices may provide charging energy to the secondary power source 1214. In the lighting assembly 1200 depicted in FIG. 48, the bulb 1202 is depicted as including a circuit 1216 comprising a plurality of photovoltaic diodes. Power from the photovoltaic circuit 1216 may be used to charge the secondary power source 1214.

Figure 49:
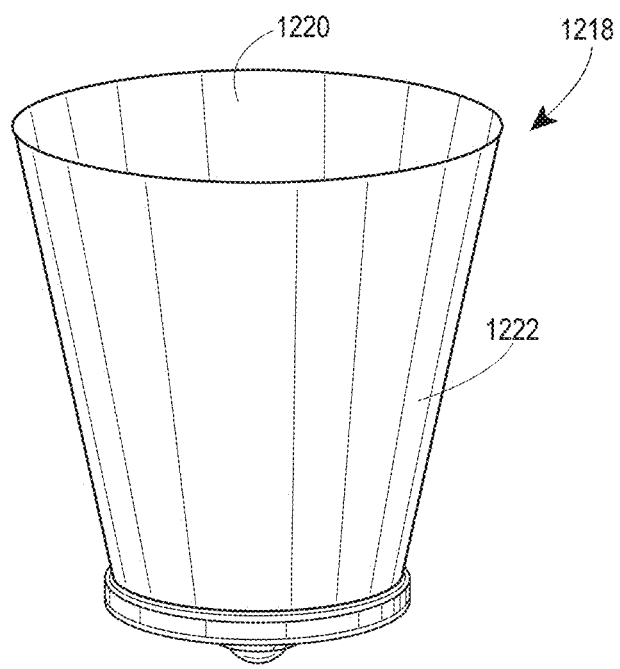
FIG. 49 is a perspective view of an exemplary bulb assembly having two illuminating surfaces.

FIG. 49 depicts one exemplary embodiment of a bulb 1218 that includes a photovoltaic circuit. The bulb 1218 may take the form of a truncated right circular cone, formed from a multilayer material having disposed on a layer of the multilayer material a plurality of discrete light-emitting devices, as described with reference to FIG. 2. The multilayer material and/or the discrete diode devices form a layered diode apparatus. In particular, the bulb 1218 may be an apparatus 1228 formed of back-to-back apparatuses similar to the diode apparatus depicted in FIG. 2.

Referring again to FIG. 49, the bulb 1218, has an interior surface 1220 and an exterior surface 1222, which may correspond, respectively, to respective diode layers of the apparatus 520. Though in some embodiments, the diodes on the interior surface 1220 and the diodes on the exterior surface 1222 may be light emitting diodes, in other embodiments, the diodes on the interior surface 1220 may be light emitting diodes, and the diodes on the exterior surface 1222 may be photovoltaic diodes. In this manner, the interior surface 1220 may be adapted to collect light and convert the collected light to energy for storage in, for example, the secondary power source 1214, while the exterior surface 1222 may be adapted to convert energy from the primary power source 1208 and/or the secondary power source 1214 into light.

It should be appreciated that there is no requirement that either of the primary power source 1208 or the secondary power source 1214 be a mains line. In fact, some embodiments may omit the secondary power source 1214 and implement an energy storage device as the primary power source 1208, and in some embodiments both the primary power supply 1208 and the secondary power supply 1214 may be energy storage devices. When coupled to a bulb having both light emitting and photovoltaic devices, such as the bulb 1218 depicted in FIG. 49, the lighting apparatus may be self-charging. For example, photovoltaic diodes on one surface (e.g., the upper surface 1220) may convert light into energy to charge an energy storage device during the day, and light emitting diodes on the same or a different surface (e.g., the lower surface 1222) may convert the stored energy back into light at night.

The use of multiple illuminating circuits within a bulb also lends itself to other applications. In some embodiments, each of two or more illuminating circuits may energize elements (e.g., filaments, gasses, LEDs, etc.) emitting light in different colors or at different color temperatures. By selectively energizing one or both of the first and second illuminating circuits, the color and/or color temperature of the light emitted from the apparatus may be selected. For example, a first plurality of light emitting diodes may emit red light and a second plurality of light emitting diodes emit blue light. Accordingly, red, blue, or magenta lighting may be selected by selectively or combinatorially energizing the first and second illuminating circuits. If a third illuminating circuit is added to the apparatus, an additional color or color temperature element may be deposited on the third illuminating circuit. In some embodiments, the third illuminating circuit may have deposited thereon a plurality of elements that emit green light. Implementing red, blue, and green light emitting diodes on separate illuminating circuits allows selection of red, blue, green, magenta, yellow, cyan, or white light.

In some embodiments, each individual illuminating circuit may be electrically coupled to a dimming circuit such as the dimming circuit 1160 depicted in FIG. 46. By selectively increasing or decreasing the brightness of the light emitted by the diodes on each of the illuminating circuits, the color of the light emitted by the apparatus 1230 may be precisely controlled.

Figure 50:
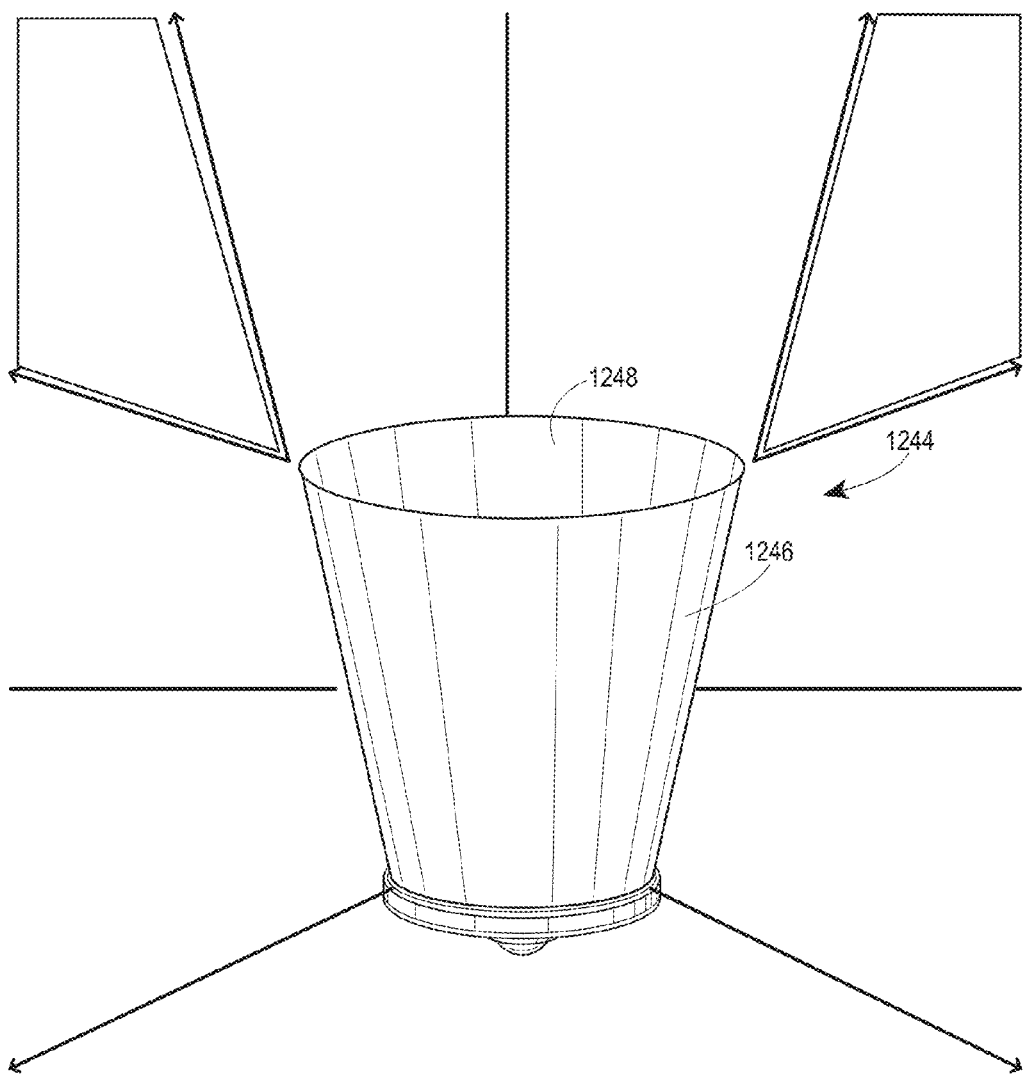
FIG. 50 is an illustration of an exemplary illuminating pattern from a lighting assembly having two illuminating surfaces.

The concepts of employing multiple illuminating circuits and/or multiple illuminated surfaces may also be applied, in combination with various bulb shapes, to achieve varying or selected illumination patterns. FIG. 50 illustrates an exemplary embodiment of a bulb 1244 implementing multiple surfaces and multiple illuminating circuits to create varying illumination patterns. The bulb 1244 has an exterior surface 1246 and an interior surface 1248, the light emitting diodes of each of the exterior surface 1246 and the interior surface 1248 electrically coupled to two individual illuminating circuits. Energizing one illuminating circuit to illuminate the exterior surface 1246 may cause illumination of a relatively broad area, while energizing the other illuminating circuit to illuminate the interior surface 1248 may cause illumination across a more narrow area. Of course, energizing both illuminating circuits to illuminate both of the exterior surface 1246 and the interior surface 1248 may provide the greatest illumination intensity.

One or more timing functions may also be implemented in various embodiments of the lighting assemblies described herein. In some embodiments, a daily timer function operates to energize one or more illuminating circuits in the bulb at a pre-programmed time each day. Advantageously, embodiments implementing the daily timer function do not require a separate, external timer device to provide execution of a daily lighting schedule. In other or additional embodiments, one or more timer functions may be programmable to deactivate an illuminating circuit of a bulb after a programmable period has expired from a triggering event. The triggering event may be the activation of a light (e.g., by a motion detector, by a switch, etc.) or may be some other event (e.g., a time of day, detection of a programmed light level, etc.). In still other or additional embodiments, one or more timer functions may be programmable to activate an illuminating circuit of a bulb after a programmable period has expired from a triggering event.

It will be apparent that various ones of the functions described herein with respect to the lighting assembly may be implemented in combination with one another. Dimming functionality, for instance, may operate in cooperation with multiple illuminating circuits to adjust color and/or lighting patterns. Sensors and/or detectors may operate in cooperation with timing functionality to illuminate one or more illuminating circuits upon detection of sound or motion, upon detection of darkness, and the like, and to extinguish the illumination after a predetermined period has elapsed. Home automation or remote connectivity (e.g., X10 compliance, mobile device application, etc.) may cooperate with timing functionality, directional selection, color selection, motion, sound, and light detectors, cascading control connectivity, and dimming circuitry to allow programming of detector sensitivity, lighting schemes, timer values, and the like. Cascading control connectivity may operate in cooperation with motion, sound, and/or light detectors to allow a single detector to control multiple lighting devices.

It is not strictly necessary that functionality be built-in, activated, or accessible upon installation of a lighting assembly. In some embodiments, hardware and/or software necessary to implement one or more functions may be present in the lighting assembly, but may be inactivated or inaccessible. Depending on the implementation, one or more functions may be activated after purchase and/or installation of the lighting assembly. For example, a function (e.g., a dimmer function) may be activated via a command issued by a home automation controller, upon input of a purchase code into the automation controller. In embodiments in which a lighting assembly includes a base assembly and a separable bulb assembly, a base assembly may include inactive functionality, which may be activated when the base assembly is coupled to a bulb assembly that supports the inactive functionality. As but one example of this, a base assembly having programmed functionality and circuitry operable to implement motion detection may activate or make available that functionality only upon coupling of the base assembly to a bulb assembly having an integrated motion detection sensor.

In some embodiments, some functionality may be present, yet unavailable for use or for activation. Advantageously, such embodiments may allow a manufacturer to produce only a single hardware implementation, while providing one or more optional functions to consumers. That is, first and second devices having identical hardware could be programmed during the manufacturing process to enable various functionality, for example through the use of flag bits in a memory device and, in particular, in a read-only memory (ROM) device.

Figure 51A:
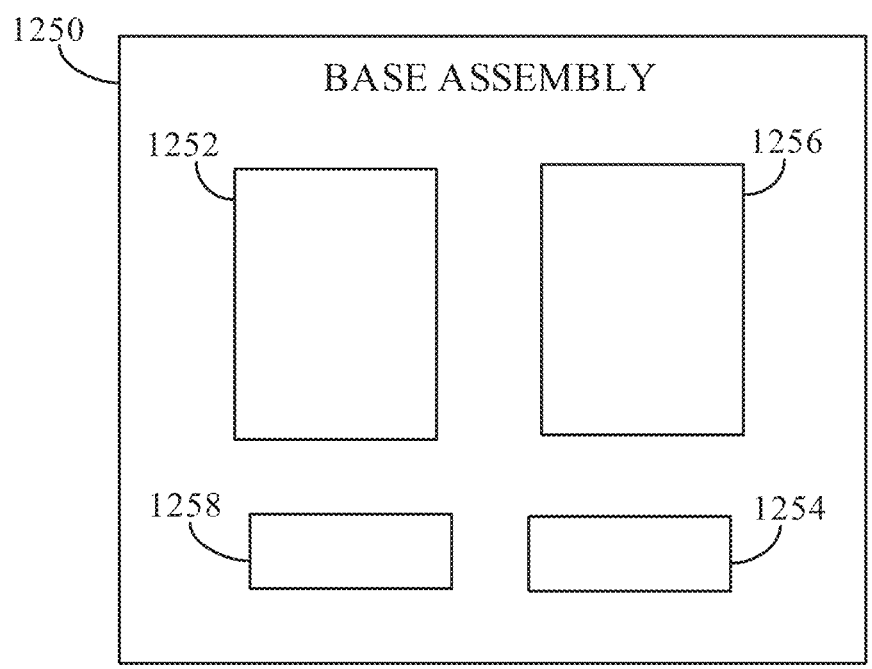
FIG. 51A is a block diagram of an exemplary base assembly of a presently described lighting assembly.

Relatedly, some embodiments may implement one or more module interface connections. FIG. 51A is a block diagram of an embodiment of a base assembly 1250. The base assembly 1250 includes a controller 1252, a power interface 1254, and coupling interface 1256. Additionally, the base assembly 1250 includes a module interface 1258. The module interface 1258 may be adapted to electrically couple one or more modules external to the base assembly 1250 to the controller 1252 and, in some instances, to mechanically couple one or more modules to the base assembly 1250. The module interface 1258 may provide one or more physical and electrical interfaces to accommodate one or more external modules. While the one or more physical interfaces may be standardized, one or more of the physical interfaces may be adapted for a particular module or a particular subset of modules, while one or more other physical interfaces may be adapted for different modules. In some embodiments, the module interface 1258 includes one or more physical and electrical interfaces formed as receptacles for a corresponding plug on an external module.

Figure 51B:
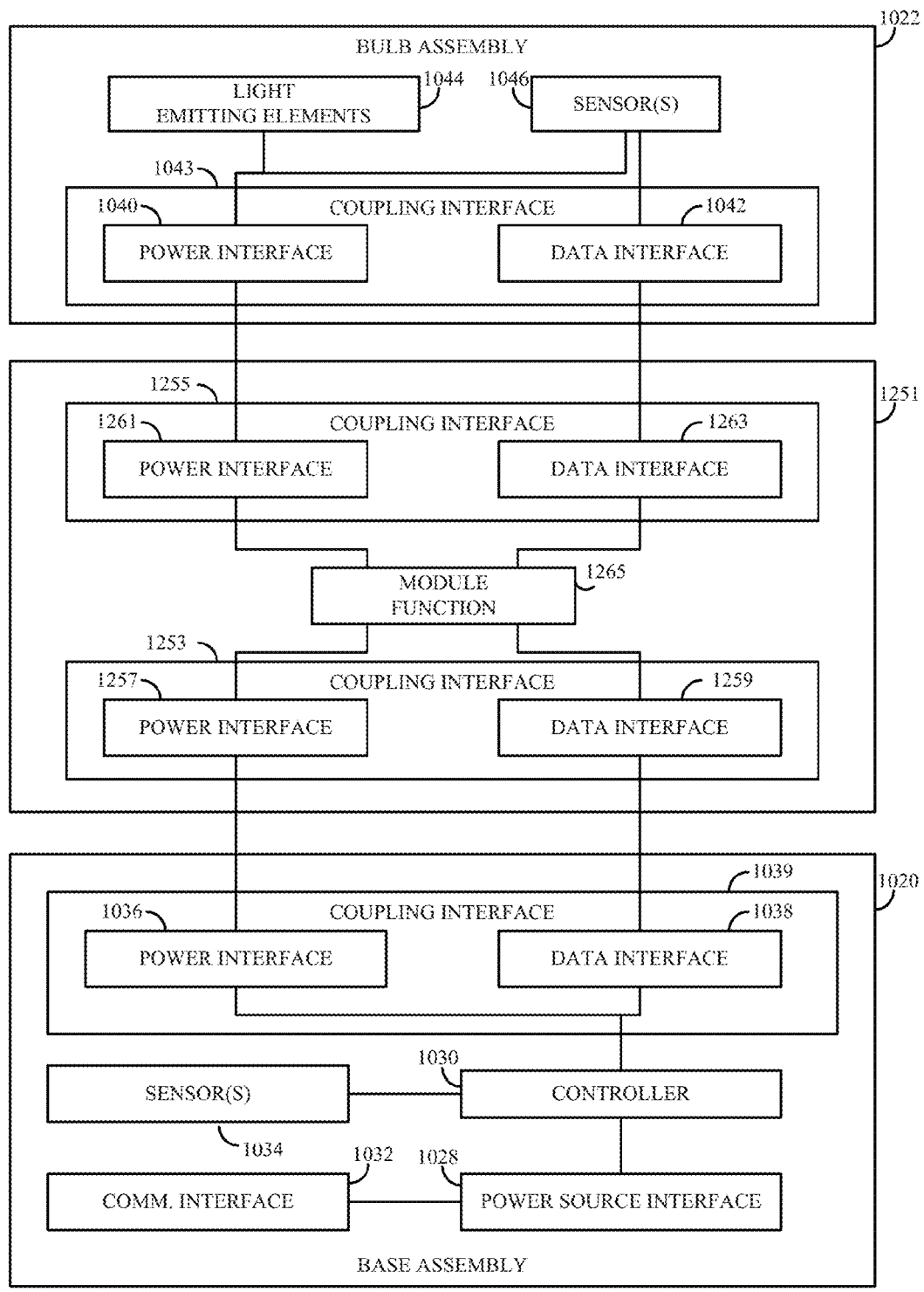
FIG. 51B is a block diagram of an exemplary lighting assembly including a module according to a presently described embodiment.

In some embodiments, the module interface 1258 may correspond, at least partially, with the coupling interface 1039. FIG. 51B is a block diagram of an exemplary embodiment of a lighting assembly implementing a modular functionality scheme in which the module interface 1258 corresponds to the coupling interface 1039. In FIG. 51B, the base assembly 1020 is depicted as including the coupling interface 1039, the sensors 1034, the controller 1030, the communication interface 1032, and the power source interface 1028. Likewise, the bulb assembly 1022 is depicted as including light emitting element 1044, the sensors 1046, and the coupling interface 1043.

Each of the coupling interfaces 1039 and 1043 includes a power interface 1036 and 1040, respectively, and a data interface 1038 and 1042, respectively. The controller 1030 may implement basic functionality or, in embodiments in which implemented functionality does not require the controller 1030, may be omitted entirely from the base assembly 1020. In embodiments such as that of FIG. 51B, a module 1251 may be electrically, and in certain embodiments physically, disposed between the base assembly 1020 and the bulb assembly 1022. The module 1251 has a coupling interface 1253 (base-module coupling interface) and a coupling interface 1255 (bulb-module coupling interface), each adapted electrically, and in some embodiments physically, a respective one of the coupling interface 1039 of the base assembly 1020 and the coupling interface 1043 of the bulb assembly 1022. That is, the power interface 1036 of the coupling interface 1039 may be coupled to a power interface 1257 of the coupling interface 1253, the data interface 1038 of the coupling interface 1039 may be coupled to a data interface 1259 of the coupling interface 1253, the power interface 1040 of the coupling interface 1043 may be coupled to a power interface 1261 of the coupling interface 1255, and the data interface 1042 of the coupling interface 1043 may be coupled to a data interface 1263 of the coupling interface 1255. The base-module coupling interface 1253 may receive an electrical signal from the base assembly 1020 via the power interface 1257 in the coupling interface 1253 and the power interface 1036 in the coupling interface 1039. In some embodiments, the base-module coupling interface 1253 may include an inductive coupling element coupled to a complementary inductive coupling element in the coupling interface 1039. In some embodiments, the base-module coupling interface 1253 may receive a data signal from the base assembly 1020 via the data interface 1259 in the coupling interface 1253 and the data interface 1038 in the coupling interface 1039.

The module 1251 may include a module function block 1265 electrically coupled to the coupling interfaces 1253 and 1255. The module function block 1265 may include any circuitry and/or programming necessary to implement a desired function including, but not limited to, processors, sensors, memory, FPGAs, ASICs, firmware, software, discrete components, and the like. In some embodiments, the module function block 1265 may implement a timer function, such as a daily on/off timer function or a delayed on/off timer function. In some embodiments, the module function block 1265 may implement a motion detector function, and may include a sensor for detecting motion and circuitry and/or programming necessary to implement a control function in response to detection of motion. In some embodiments, the module function block 1265 may implement one or more dimmer functions to control, or to allow a user to control, the intensity of one or more illumination circuits in the lighting assembly. In some embodiments, the module function block 1265 may implement control, or additional control (e.g., an expansion circuit), over one or more circuits in the lighting assembly to control the color, color temperature, lighting direction, and/or lighting surfaces associated with the illumination. If, for example, the base assembly implements control for only a single illumination circuit, the module 1251 and, in particular, the function block 1265, may implement control of two illumination circuits by, for example, receiving a single power input from the base and implementing two independently controllable power outputs from the module to the bulb assembly.

Accordingly, the module 1251 may receive one or more signals via the coupling interface 1253, may alter the one or more received signals according to the function implemented by the function block 1265, and may provide one or more altered second signals via the interface 1255. As just one example, the module 1251 may implement a dimming function and, therefore, may receive an electrical signal (e.g., an AC electrical signal) from the base assembly, modify the received electrical signal (e.g., by switching the signal, stepping down the voltage of the signal, modulating the signal, etc.), and provide the modified electrical signal to the bulb assembly 1022 via the coupling interface 1255. In some embodiments, the modified electrical signal may be provided to the bulb assembly 1022 via an inductive coupling element in the coupling interface 1255 coupled to a complementary inductive coupling element in the coupling interface 1043.

The module function block 1265 may also cooperate with circuitry and/or programming in the bulb assembly 1022 and/or the base assembly 1020 to implement the functionality associated with the module 1251. For example, as described, the base assembly 1020 may include the controller 1030. The module function block 1265 may include a sensor (not shown) operable to cooperate with the controller 1030 to allow the controller 1030 to implement additional functionality. Of course, the controller 1030 may be preprogrammed to implement the additional functionality upon addition of the module 1251, or may require an update in order to implement the functionality associated with the module 1251. In some embodiments, the module function block 1265 includes means for updating another component in the lighting assembly, such as for updating programming associated with the controller 1030. Alternatively, in some embodiments, the controller 1030 may be updated via another interface (such as the communication interface 1032). Similarly, the module function block 1265 may cooperate with the sensor or sensors 1046 in the bulb assembly 1022.

Of course, the module function block 1265 may communicate with either or both of the bulb assembly 1022 and the base assembly 1020 via the coupling interfaces 1255 and 1039, respectively. In some embodiments, for example, the module 1251 and, in particular, the module function block 1265, may receive operating power from the base assembly 1020 through the power interface 1036 and the power interface 1257, while receiving and or transmitting data between the base assembly 1020 and the module 1251 via the data interface 1038 and the data interface 1259. In some embodiments, the bulb assembly 1022 may receive operating power, provided to the module 1251 by the base assembly 1020, from the module 1251 via the power interface 1261 and the power interface 1040, and may exchange data with the base assembly 1020 and/or the module 1251 via the data interface 1263 and the data interface 1042. One or both of power and/or data, or portions thereof, may pass through the circuitry of the module function block 1265, or may bypass the module function block 1265 and be passed directly between the coupling interfaces 1253 and 1255 of the module 1251.

Figures 51C, 51D:
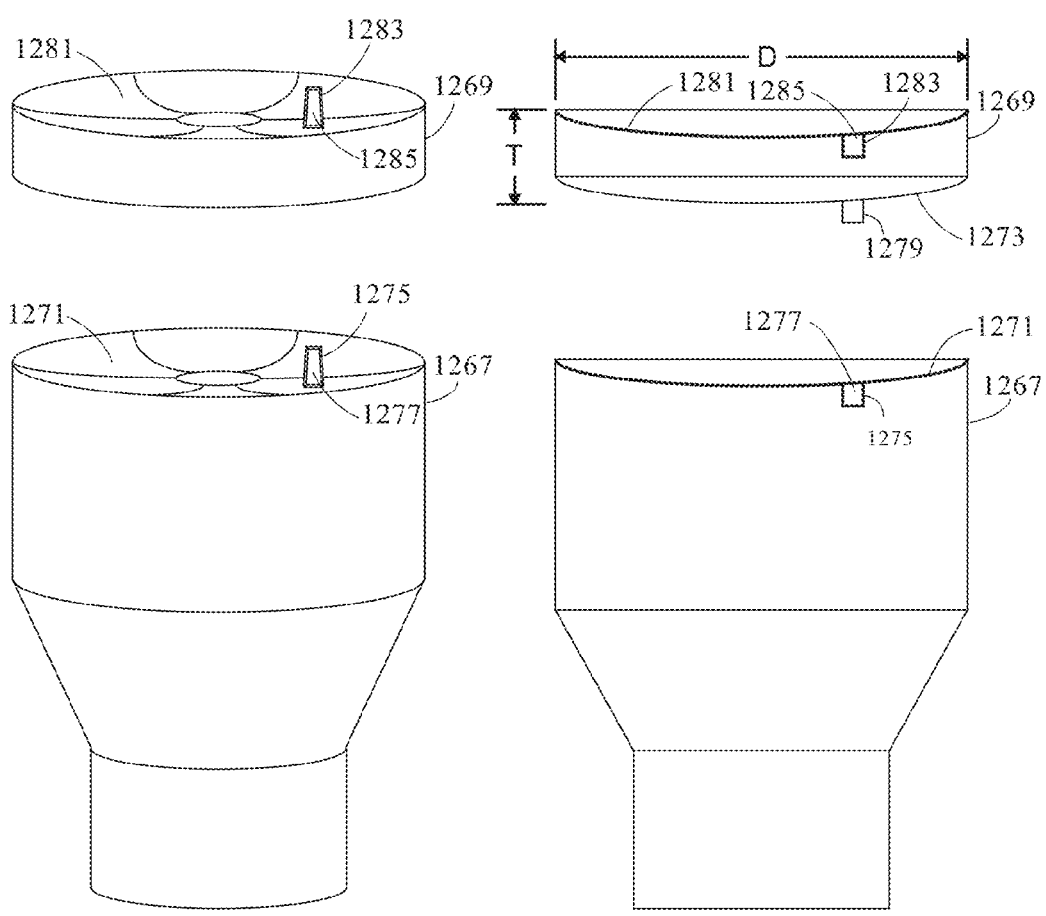
FIG. 51C is a perspective view illustrating a base assembly and a corresponding module for connecting to the base assembly.
FIG. 51D is a side view illustrating the base assembly and corresponding module depicted in FIG. 51C.

FIGS. 51C and 51D illustrate perspective and side views, respectively, of a base assembly 1267 and a corresponding module 1269. In the depicted embodiment, the base assembly 1267 has a coupling surface 1271 concavely shaped so as to couple with a correspondingly shaped convex surface, such as a convex surface 1273 on the module 1269 or a convex surface (not shown) on a bulb assembly (not shown). Also in the depicted embodiment, a connector receptacle 1275 is disposed such that an opening 1277 of the connector receptacle 1275 is flush with the surface 1271. The connector receptacle 1275 is adapted to mate with a corresponding plug connector 1279 extending from the surface 1273 of the module 1269. The module 1269 depicted in FIGS. 51C and 51D is disk-shaped. That is, the module 1269 has a thickness T small relative to its diameter D. The module 1269 also has a surface 1281 identical (or at least similar) in curvature (e.g., convex) to the surface 1271, such that a bulb assembly (not shown) adapted to couple with the surface base assembly 1267 via the surface 1271 in the absence of the module 1269, could likewise couple to the module 1269 via the surface 1281. The module 1269 may similarly include a connector receptacle 1283 disposed in the module 1269 such that an opening 1285 of the connector receptacle 1283 is flush with the surface 1281.

Of course, in some embodiments, the curvature of the surfaces 1271 and/or 1281 may differ from that depicted in FIGS. 51C and 51D, or the surfaces 1271 and/or 1281 may not be curved at all. Additionally or alternatively, in some embodiments, the connector receptacles 1275 and 1285 and the connector plug 1279 may have different geometries than that depicted in FIGS. 51C and 51D. Instead of having the opening 1277 of the connector receptacle 1275 disposed flush with the surface 1271, for example, the receptacle 1275 as a whole may protrude from the surface 1271, the connector plug 1279 may be recessed into the surface 1273 of the module 1269, etc. In still other embodiments, data and/or power connections on each of the base assembly 1267 and the module 1269 may pass through the surfaces 1271 and 1273 instead of (or in addition to) the connector receptacle 1275 and the connector plug 1279, or the connector receptacle 1275 and the connector plug 1279 may be omitted completely.

While external modules are contemplated for the purpose of implementing additional functionality through the addition of hardware to the lighting assembly, in some embodiments external modules may serve only to activate or enable one or more functions of which the lighting assembly is capable prior to connection to the external module, but which were previously inactive or unavailable. That is, in some embodiments external modules may act as "dongles" for activating functionality. In other embodiments, an external module may include hardware and/or software and/or firmware for implementing a motion detector, a sound detector, a light detector, a secondary power supply, a backup power supply, a photovoltaic charging device, a timer function, and/or remote connectivity (e.g., remote control, cascading control, compatibility with a home automation system, etc.). Embodiments implementing connectivity with external modules may be particularly advantageous, for example, where it is desirable that a sensor be in a position other than proximal to the lighting assembly, such as where a sensor located outdoors controls illumination of the lighting assembly located indoors.

As described above with respect to the lighting assembly depicted in FIGS. 38C and 38D, the module 1269 may cooperate with the base assembly 1267 and/or with a bulb assembly to provide a lock and key feature to the lighting assembly. For example, the module 1269 may include an electronic key device (not shown) which may communicate via the connectors 1279 and 1275 with the base assembly 1267 and, in particular, the controller in the base assembly 1267. The module 1269 may also pass one or more signals to/from an electronic key device in a bulb assembly to implement a second lock and key feature. That is, the controller may be operable to provide power to electronic key devices in one or more modules and in one or more bulb assemblies, to validate and/or interpret data received from the one or more electronic key devices, and to implement features or functions, individually or in any combination, in the base assembly, the modules and/or the bulb assemblies.

In some embodiments, an external module may cooperate with a counterpart module to accomplish an accessibility function. For instance, a module adapted to plug into a telephone jack, or to connect to a mobile phone, may cooperate with a module adapted to couple to the base assembly 1252 through the module interface 1258 to cause the lighting assembly to indicate an incoming call (e.g., by flickering, flashing, etc.). As another example, a module adapted to coupled to the base assembly 1252 through the module interface 1258 may cooperate with a module connected to an alert device (e.g., to a smoke detector, a carbon monoxide detector, a security system, a doorbell, a baby monitor, etc.) to cause the lighting assembly to indicate one or more conditions associated with the alert device (e.g., by flickering, flashing, etc.). The external modules, in addition to implementing a communication function to couple the base assembly 1252 another device, may also include a visual signaling device, such as a strobe light or an LED indicator. Of course, while accessibility functions may, in some embodiments, be added by connection of an external module to the base assembly 1250, the same accessibility functions could be implemented within the base assembly.

The lighting assembly may also include various visual or audible indicators, to indicate operation of various functions integrated into the lighting assembly. In some embodiments, the lighting assembly and, in particular, the base of the lighting assembly, may include one or more conventional LED indicator lights. The LED indicator lights may be operable to indicate, for example, that the lighting assembly is connected to a power source, that a timing function is enabled, that a photodetector is enabled, or that one or more particular illuminating circuits in the bulb assembly are energized. The LED indicator lights may be individual LED lamps built into the side of the base. Alternatively, the LED indicators may illuminate one or more annular light pipes extending around the circumference of the base. Similar indication may, in some embodiments, be integrated into the bulb assembly. For example, one or more illuminating circuits may form annular indicators on a surface of the bulb, or may form small indicator areas on the surface of the bulb.

Figure 52:
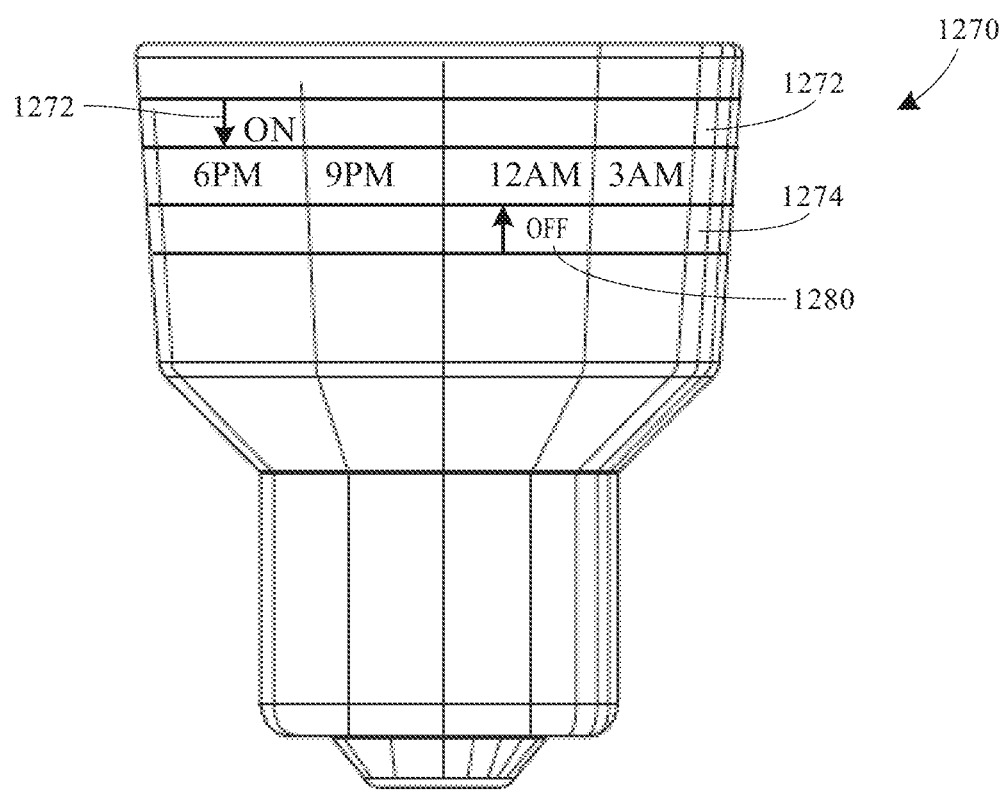
FIG. 52 is a side view illustrating an exemplary embodiment of a base assembly.

Various control mechanisms may be built into the base and/or bulb assemblies to effectuate control of the function(s) incorporated into the lighting assembly. In some embodiments, such as that depicted in FIG. 52, a base assembly 1270 may include one or more annular control rings 1272, 1274. In the embodiment depicted in FIG. 52, the annular control rings 1272, 1274 allow a user to configure a timer function of the base assembly. In particular, a user may align an indicator 1276 on the annular control ring 1272 with one of a plurality of times 1278 indicated on the base assembly 1270 to set an "on" time for the timer function. The user may align an indicator 1280 on the annular control ring 1274 with one of the plurality of times 1278 indicated on the base assembly 1270 to set an "off" time for the timer function.

Figure 53:
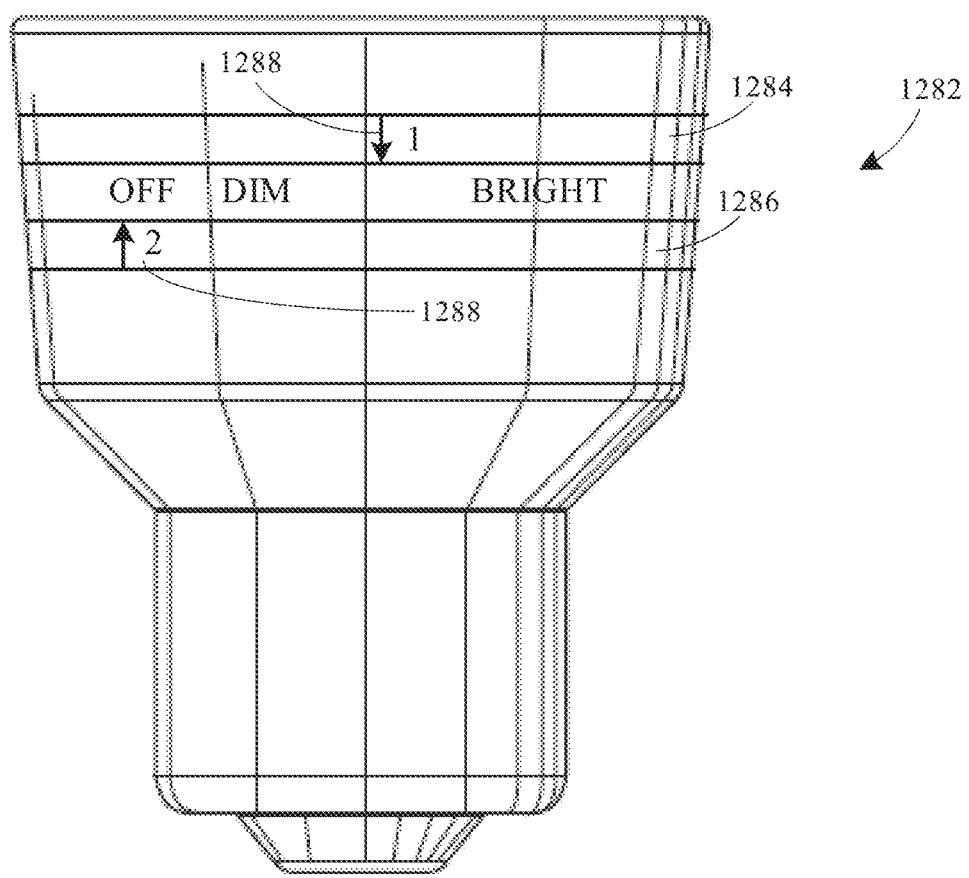
FIG. 53 is a side view illustrating a second exemplary embodiment of a base assembly.

Additionally or alternatively, annular control rings may implement control of other functions. For example, FIG. 53 depicts a base assembly 1282, in which annular control rings 1284 and 1286 respectively control two illuminating circuits in a bulb assembly (not shown). Each of the annular control rings 1284 and 1286 includes an indicator 1288 that, by rotating the respective annular control rings 1284 or 1286, may selectively cause a corresponding illuminating circuit to energize, brighten, and dim the attached illuminating element.

Figure 54:
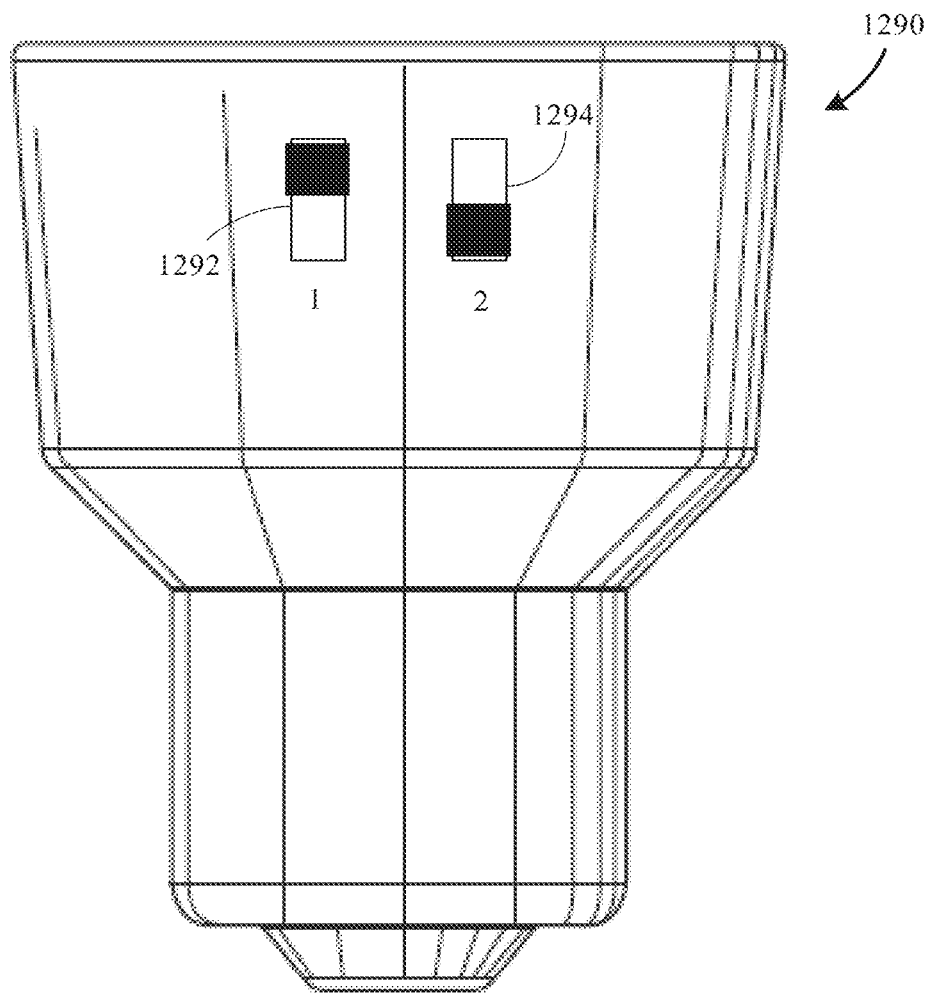
FIG. 54 is a side view illustrating a third exemplary embodiment of a base assembly.

Multi-position switches may also be used to implement control of various functionality. FIG. 54 depicts a base assembly 1290 having two, two-position switches 1292 and 1294. The switches 1292 and 1294, respectively, may operate to energize or de-energize corresponding illuminating circuits to turn on or off the illuminating elements attached to each illuminating circuit. By moving each of the switches 1292 and 1294 to the "on" position, the user may energize, respectively first and second illuminating circuits in an attached bulb assembly (not shown), causing the illuminating elements coupled to the respective illuminating circuit to illuminate. Of course, while the base assembly 1290 is depicted as having two switches 1292 and 1294, the base assembly 1290 could have a more or fewer switches. Additionally, while the switches 1292 and 1294 are described as controlling respective illuminating circuits in a bulb assembly, the switches 1292 and 1294 could also (or instead) control other functions. For example, the switches 1292 and 1294 could control illuminating circuits corresponding to upper and lower surfaces of the bulb assembly, thereby controlling the direction and type of light provided by the bulb assembly. The switches 1292 and 1294 could also activate and deactivate timer functions, sensor functions, dimmer functions, or any other function amenable to control by a two-position switch. Moreover, while the switches 1292 and 1294 are described as two-position switches, it should be clear that switches having other numbers (e.g., three, four, five, etc.) of positions may also be used to control functionality of the lighting assembly.

Figure 55:
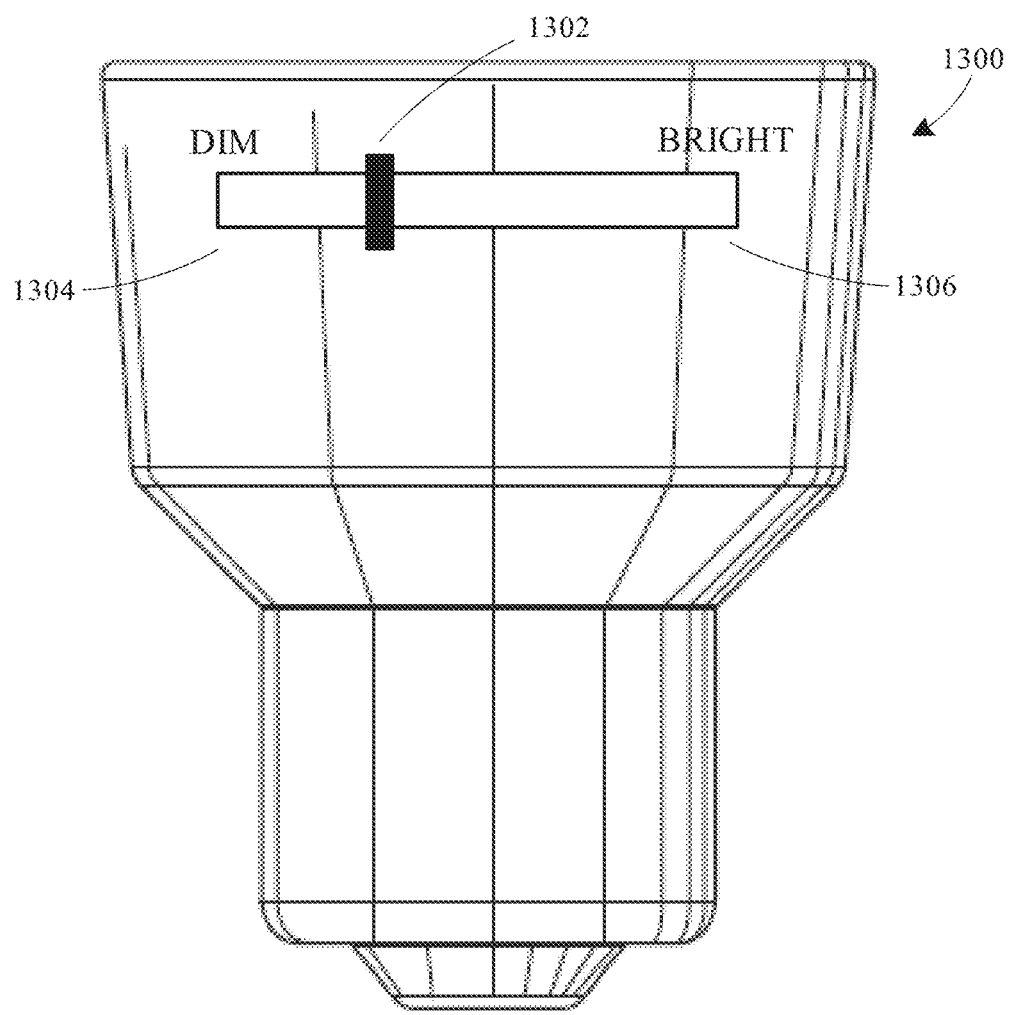
FIG. 55 is a side view illustrating a fourth exemplary embodiment of a base assembly.

As depicted in FIG. 55, in some embodiments, a base assembly 1300 implements one or more slider mechanisms 1302 to control one or more functions associated with the base assembly 1300. The slider mechanism 1302 is depicted in FIG. 55 as a dimmer control operable to move over a continuous range of positions between an end 1304, labeled "dim," and an end 1306, labeled "bright." In other embodiments, the slider mechanism 1302 may operate to set the sensitivity of a sensor or to set a timer (e.g., to turn the light off after a configurable amount of time). In some embodiments, the slider mechanism 1302 may control the color of light emitted from a bulb assembly (not shown). The slider mechanism 1302 may, for example, vary the voltage applied to an analog-to-digital converter, causing a controller (not shown) in the base assembly 1300 to selectively dim and/or brighten each of two or more illuminating circuits in a bulb, with each illuminating circuit having coupled thereto illuminating elements emitting at different wavelengths.

Figure 56:
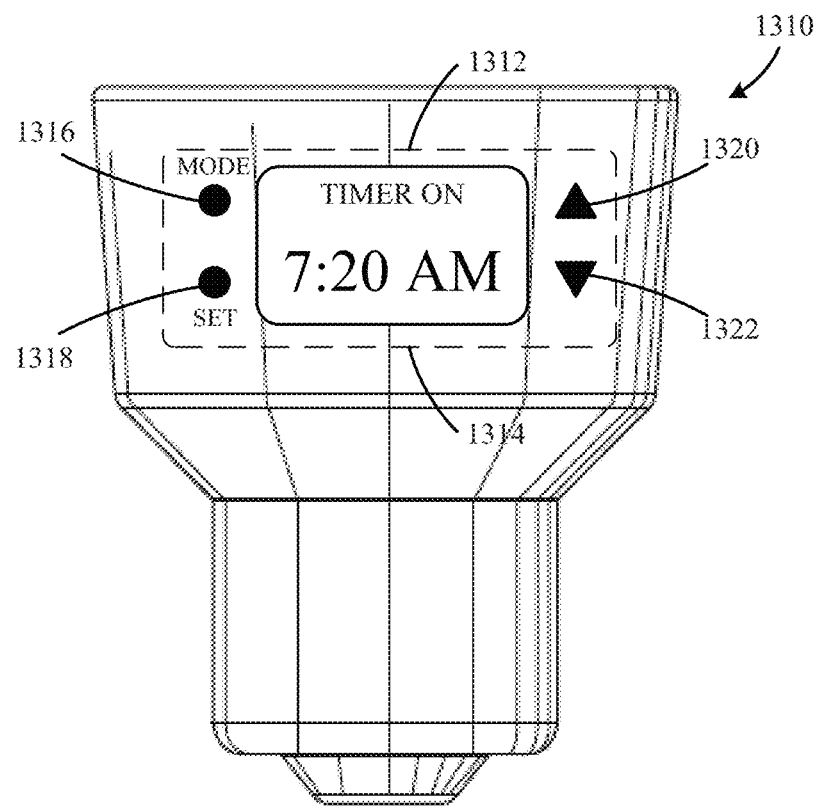
FIG. 56 is a side view illustrating a fifth exemplary embodiment of a base assembly.

In still other embodiments, such as the embodiment depicted in FIG. 56, a base assembly 1310 may include an electronic user interface module 1312. The electronic user interface module 1312 may include a display (e.g., an LED, LCD, or electrophoretic display) 1314, and one or more buttons 1316-1322. The electronic user interface module 1312 may operate to control a function of the bulb assembly. If the module 1312 operates to control a timer function, for example, a button 1316 may allow the user to place the module 1312 in a "timer on" mode or in a "timer off" mode, a button 1318 may allow the user to set a current time, an "on" time, and/or an "off" time, and buttons 1320 and 1322 may allow the user to increase (button 1320) or decrease (button 1322) a value being set. Similar electronic user interface modules 1312 may be implemented to control other functionality including, but not limited to, the sensitivity of various sensors.

Figure 57:
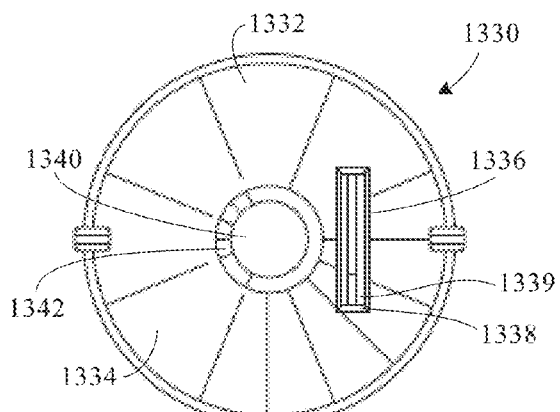
FIG. 57 is a top view illustrating a sixth exemplary embodiment of a base assembly.
Figure 58:
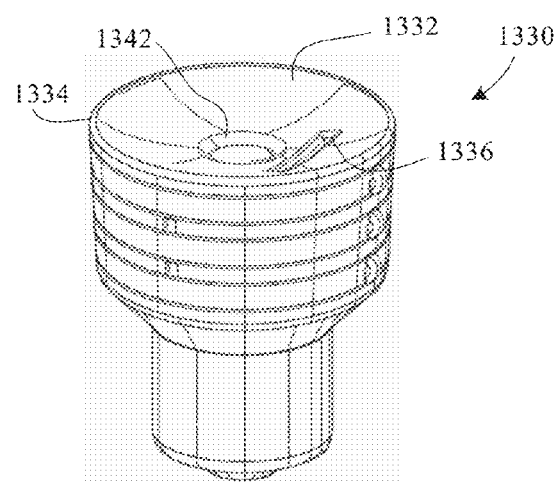
FIG. 58 is a perspective view illustrating the embodiment of the base assembly of FIG. 57.

Interaction between the bulb assembly and the base assembly may also control one or more functions of the lighting assembly. FIGS. 57 and 58 are, respectively, top and perspective views of a base assembly 1330. A surface 1332 of a coupling mechanism 1334 includes a recessed channel 1336. A slider mechanism 1338, disposed within the recessed channel 1336, is electrically coupled to a controller (not shown). In the embodiment depicted in FIG. 57, the coupling mechanism 1334 further includes a magnetic assembly 1340, disposed in a recess 1342 at a center 1344 of the surface 1332. The magnetic assembly 1340 includes at least one magnetic element. While depicted as a single magnetic element disposed within the recess 1342 and centered within the surface 1332 of the coupling mechanism 1334, the coupling mechanism 1334 may include multiple magnetic assemblies 1340, the magnetic assembly or assemblies 1340 need not be centered within the coupling mechanism 1334, and need not be recessed from the surface 1332. Moreover, the coupling mechanism 1334 need not include the magnetic assembly 1340 at all, as other physical coupling mechanisms (bayonets, threaded surfaces, etc.) may provide physical connection between the base assembly 1330 and a bulb assembly.

Figure 59:
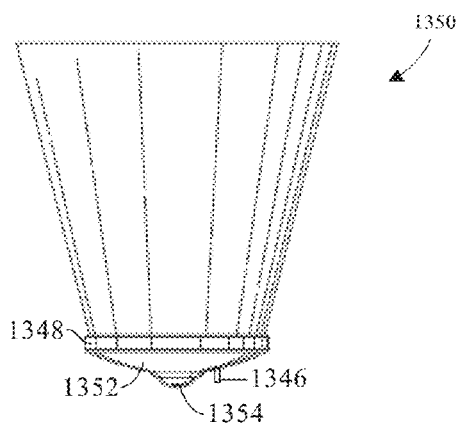
FIG. 59 is a side view illustrating an exemplary embodiment of a bulb assembly for use with the base assembly of FIGS. 57 and 58.
Figure 60:
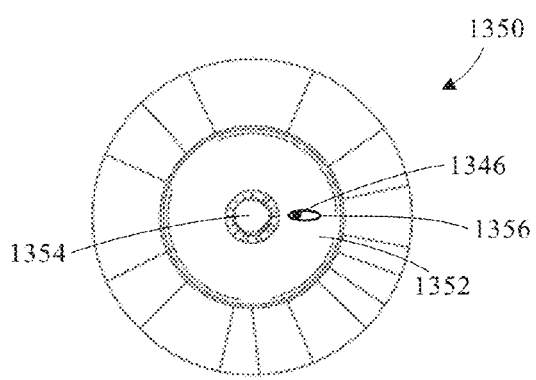
FIG. 60 is a bottom view illustrating the embodiment of the bulb assembly of FIG. 59.

In any event, and with reference now to FIG. 59, the slider mechanism 1338 is adapted to receive an actuating pin 1346 on a coupling mechanism 1348 of a bulb assembly 1350. A surface 1352 of the coupling mechanism 1348 is adapted to sit flush with the surface 1332 of the base assembly 1330 when mated with the coupling mechanism 1334 of base assembly 1330. At the center of the surface 1352, a magnetically engagable surface 1354, which may be a magnet, is disposed to magnetically couple the bulb assembly 1350 to the base assembly 1330 via the magnetic assembly 1340. The actuating pin 1346 is disposed such that, when the coupling mechanisms 1334 and 1348 engage one another, the actuating pin 1346 is received by a pin receptacle 1339 in the slider mechanism 1338. The actuating pin 1346 may be disposed within a recess 1356, depicted in FIG. 60, which is a bottom view of the bulb assembly 1350. The actuating pin 1346 and the recess 1356 may cooperate to allow the actuating pin 1346 to engage the slider mechanism 1338 and move the slider mechanism 1338 within the recessed channel 1336.

Figure 61:
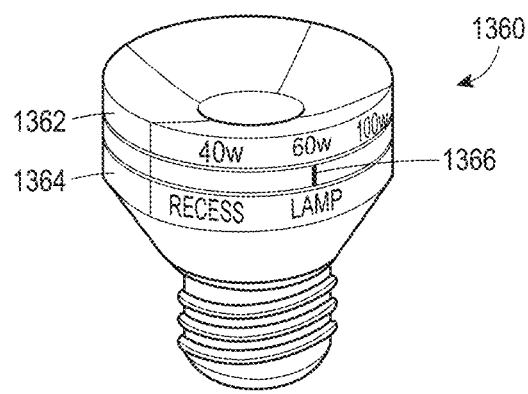
FIG. 61 is a perspective view of a still another exemplary embodiment of a base assembly.

FIG. 61 depicts a perspective of an embodiment of a base assembly 1360. The base assembly 1360 includes two annular control rings 1362 and 1364. In the depicted embodiment, the annular control ring 1362 operates to control the intensity of the illumination of an attached bulb assembly (not shown), while the annular control ring 1364 operates to control the direction of the illumination from the attached bulb assembly. A selection indicator 1366 indicates the current setting of each of the annular control rings 1362 and 1364. As depicted, for example, the annular control ring 1362 is set to "60 W," indicating a setting of 60 Watts (or equivalent), and the annular control ring 1364 is set to "LAMP." The annular control ring 1362 may operate by varying the voltage across the terminals of one or more illuminating circuits of the bulb assembly, by selecting different illuminating circuits of the bulb assembly, by coupling an illuminating circuit of the bulb assembly to different circuits of the base assembly 1360, etc.

Moreover, while FIG. 61 depicts the annular control ring 1362 as having positions labeled "40 W," "60 W," and "100 W," the switch positions could be labeled in any desired manner. For example, and without limitation, the label for each position could indicate the brightness of the light based on wattage of an incandescent light, could indicate the actual wattage of the bulbs used with the base assembly, or could merely indicate "LOW," "MEDIUM," and "HIGH," "1," "2," and "3," or the like. Additionally, the annular control ring 1362 could be coupled to a controller in the base assembly 1360 to vary the behavior of the controller (e.g., to cause the controller to alter the behavior of a dimmer circuit, cause the controller to couple the bulb assembly to various circuits, or change the output of the controller), to a dimmer in the base assembly 1360 to vary the output of the dimmer, or to multiple circuits in the base assembly 1360.

Figures 62A, 62B:
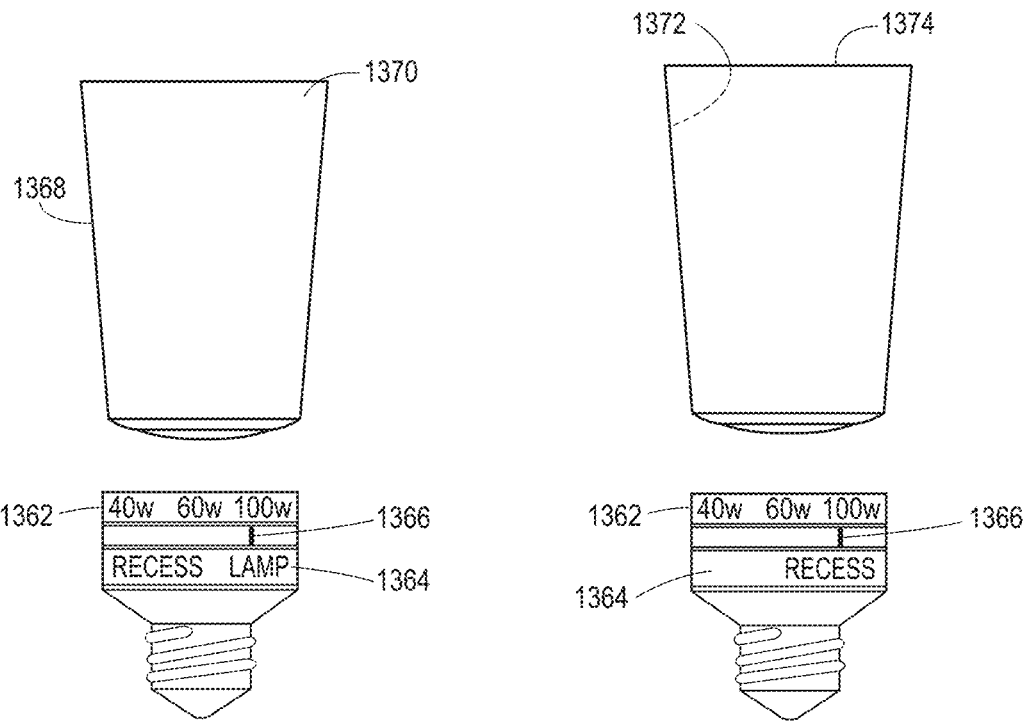
FIG. 62A is a side view of an exemplary lighting assembly in a first selected configuration.
FIG. 62B is a side view of the exemplary lighting assembly of FIG. 62A in a second selected configuration.
Figure 64A:
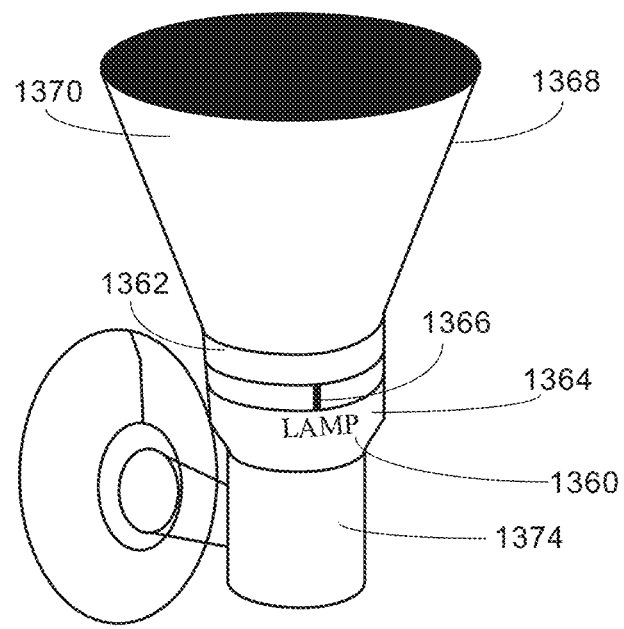
FIG. 64A is a perspective view illustrating an exemplary lighting assembly affixed to an exemplary lighting fixture.
Figure 64B:
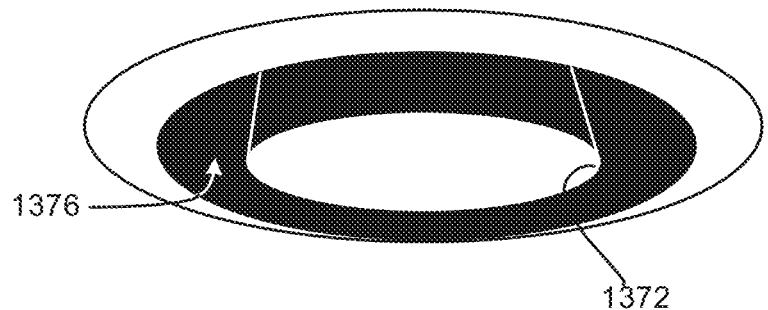
FIG. 64B is a perspective view illustrating the exemplary lighting assembly of FIG. 64A affixed to a second exemplary lighting fixture.

In a similar manner, the annular control ring 1364 of the base assembly 1360 may control the direction of the light emitted from the bulb assembly. FIGS. 62A and 62B depict the annular control ring 1364 positioned to select, respectively, each of two settings: "RECESS" and "LAMP." As depicted in FIG. 62A, adjusting the annular control ring 1364 to the "LAMP" setting may cause a bulb assembly 1368 to illuminate a first illuminating element 1370 disposed at a first end of the bulb assembly 1368, such as might be desirable when the bulb and base assemblies (together) are fitted into as wall sconce 1374, as shown in FIG. 64A. Meanwhile, adjusting the annular control ring 1364 to the "RECESS" setting (as depicted in FIG. 62B) may cause the bulb assembly 1368 to illuminate a second lighting element 1372 disposed at a second end of the bulb assembly 1368 and provide illumination from an end 1374 of the bulb assembly, such as might be desirable when the bulb and base assemblies (together) are fitted into a recessed lighting fixture 1376, as shown in FIG. 64B.

In some embodiments, actuation of the annular control ring 1364 may operate to selectively energize one or more illuminating circuits in the bulb assembly 1368 by, for example, selectively energizing one or more terminals in the base assembly 1360 or by causing (e.g., by means of a control signal transmitted to the bulb assembly 1368) a switch in the bulb assembly 1368 to selectively couple one or more illuminating circuits in the bulb assembly 1368 to a terminal on the base assembly 1360. Moreover, while FIGS. 61, 62A, 62B 64A, and 64B depict the annular control ring 1364 as having positions labeled "RECESS" and "LAMP," the positions could be labeled in any desired manner. For example, and without limitation, the label for each position could indicate the surface illuminated (e.g., "INSIDE" or "OUTSIDE") or could be pictorial (e.g., a picture of a sconce and a picture of a recess, pictures of bulbs with various illumination patterns, etc.).

Figure 63A:
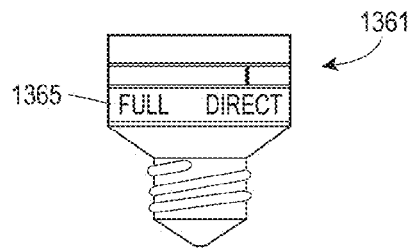
FIG. 63A is a side view of a base assembly of a second exemplary lighting assembly in a first configuration.
Figure 63B:
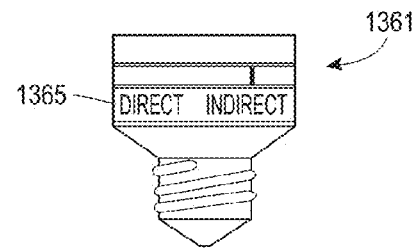
FIG. 63B is a side view of the base assembly of FIG. 63A in a second configuration.
Figure 63C:
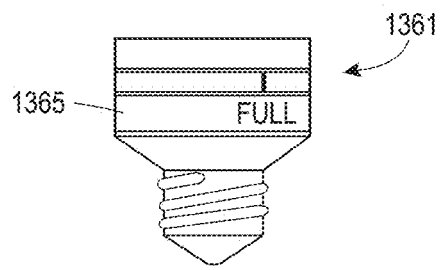
FIG. 63C is a side view of the base assembly of FIG. 63A in a third configuration.

Additionally, in some embodiments, two or more sectional portions of an illuminating element may be coupled to corresponding illuminating circuits in a bulb assembly. For example, FIGS. 63A, 63B, and 63C depict a base assembly 1361 having an annular control ring 1365 positioned to select, respectively, each of three settings: "DIRECT," "INDIRECT," and "FULL." Adjusting the annular control ring 1365 to select the "DIRECT" setting, as depicted in FIG. 63A, may selectively energize a first terminal in the base assembly 1361 to cause a first portion of an attached illuminating element to illuminate, while adjusting the annular control 1365 to select the "INDRIECT" setting, as depicted in FIG. 63B, may selectively energize a second terminal in the base assembly 1361 to cause a second portion of an attached illuminating element to illuminate. Adjusting the annular control ring 1365 to select the "FULL" setting, as depicted in FIG. 63C, may selectively energize both the first and second terminals in the base assembly 1361 to cause both the first and second portions of the attached illuminating element to illuminate.

Figure 65A:
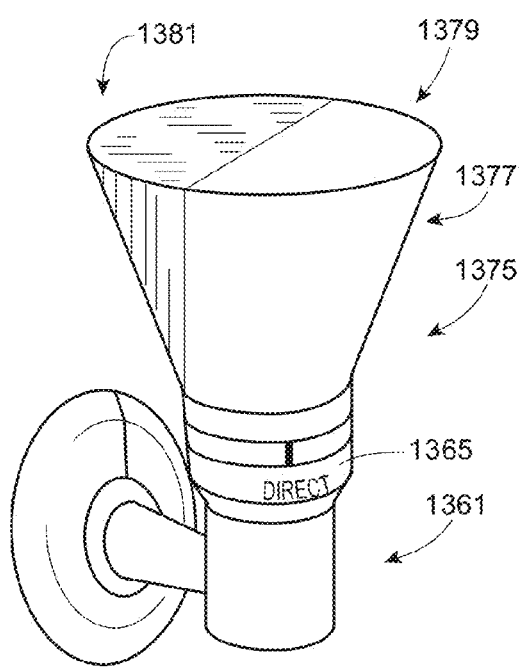
FIG. 65A is a perspective view illustrating an exemplary lighting assembly in a first configuration consistent with the configuration of FIG. 63A.
Figure 65B:
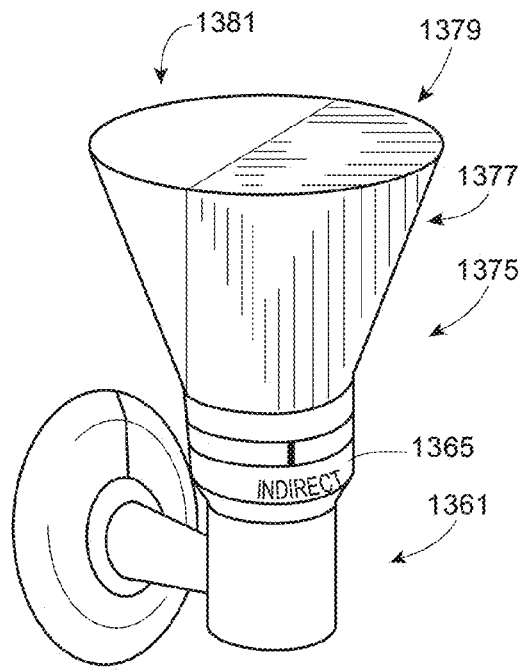
FIG. 65B is a perspective view illustrating the exemplary lighting assembly of FIG. 65A in a second configuration consistent with the configuration of FIG. 63B.
Figure 65C:
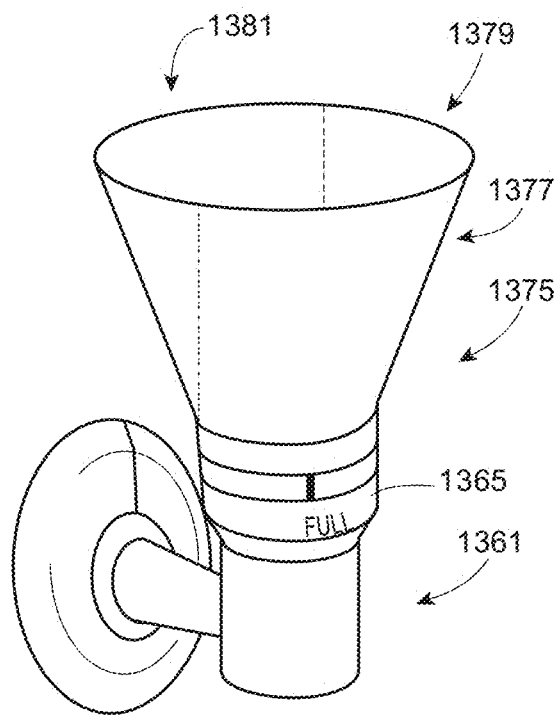
FIG. 65C is a perspective view illustrating an exemplary lighting assembly of FIG. 65A in a third configuration consistent with the configuration of FIG. 63C.

FIGS. 65A, 65B, and 65C depict a lighting assembly 1375 including an bulb assembly 1377 installed on the base assembly 1361. The bulb assembly 1377 is depicted having a first portion 1379 and a second portion 1381. In FIG. 65A, the base assembly 1361 is depicted with the annular control ring 1365 positioned to select the "DIRECT" lighting setting as in FIG. 63A, causing the first portion 1379 to illuminate (e.g., by a first directional lighting element (not shown)), while the second portion 1381 remains dark. This may be desirable, for example, to provide direct reading light. In FIG. 65B, the base assembly 1361 is depicted with the annular control ring 1365 positioned to select the "INDIRECT" lighting setting as in FIG. 63B, causing the second portion 1381 to illuminate (e.g., by a second directional lighting element (not shown)), while the first portion 1379 remains dark. This may be desirable, for example, to provide softer, ambient lighting effects. In FIG. 65C, the base assembly 1361 is depicted with the annular control ring 1365 positioned to select the "FULL" lighting setting as in FIG. 63C, causing both the first and second portions 1379 and 1381 to illuminate (e.g., by both the first and second directional lighting elements). This may be desirable, for example, to provide balanced and/or maximal lighting. Of course, while the first and second portions 1379 and 1381 are depicted in FIGS. 65A-65C as forming two, approximately equal halves of the bulb assembly 1377, there is no restriction on the potential segmentation or sectioning of the assembly. By way of example and not limitation, the segments of the bulb assembly may be vertical, horizontal, or any other desirable pattern. Likewise, while depicted as having two segments or portions, the illuminating element may have more or less than two segments or portions. In an embodiment that may be disposed, for example, in a wall sconce, the illuminating element has three portions, a first of which comprises 25 percent of the surface area of the illuminating element (e.g., to provide a first reading light), a second of which comprises another 25 percent of the surface area of the illuminating element (e.g., to provide a second reading light), and a third of which comprises the remaining 50 percent of the surface area of the illuminating element (e.g., to provide indirect light). Similarly, in an embodiment, the illuminating element has four segments or portions, each of which comprises 25 percent of the surface area of the illuminating element. Further, in an embodiment that may be disposed, for example at a 90-degree corner formed by two walls, the illumination has two segments or portions, a first of which comprises 75 percent of the surface area of the illuminating element (e.g., for providing indirect lighting) and a second of which comprises the remaining 25 percent of the surface area of the illuminating element (e.g., for providing direct lighting).

Figure 67:
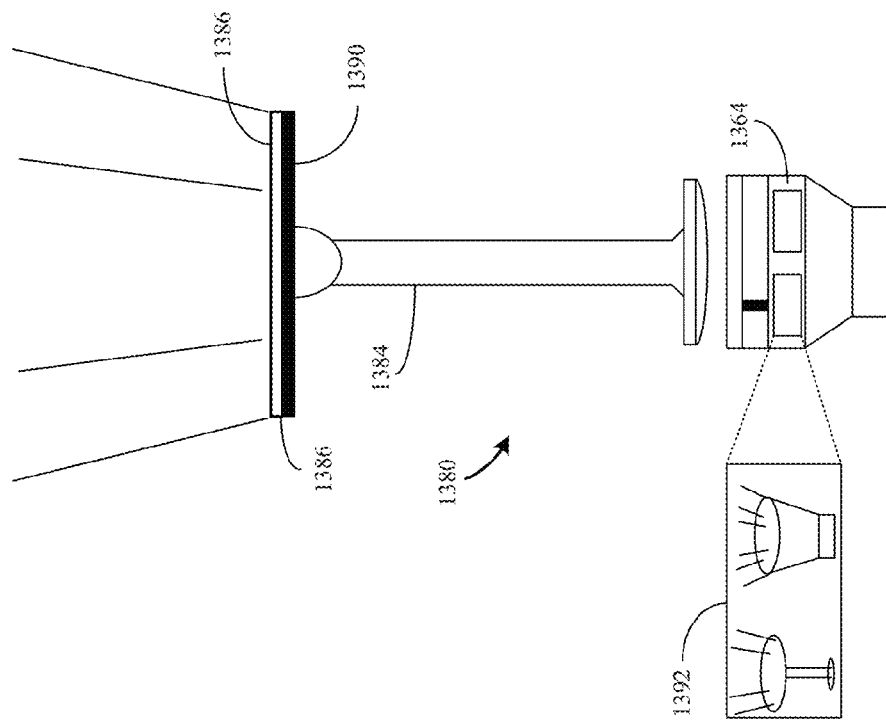
FIG. 67 is a side view of the exemplary lighting assembly of FIG. 66 having the switch in a second position.
Figure 66:
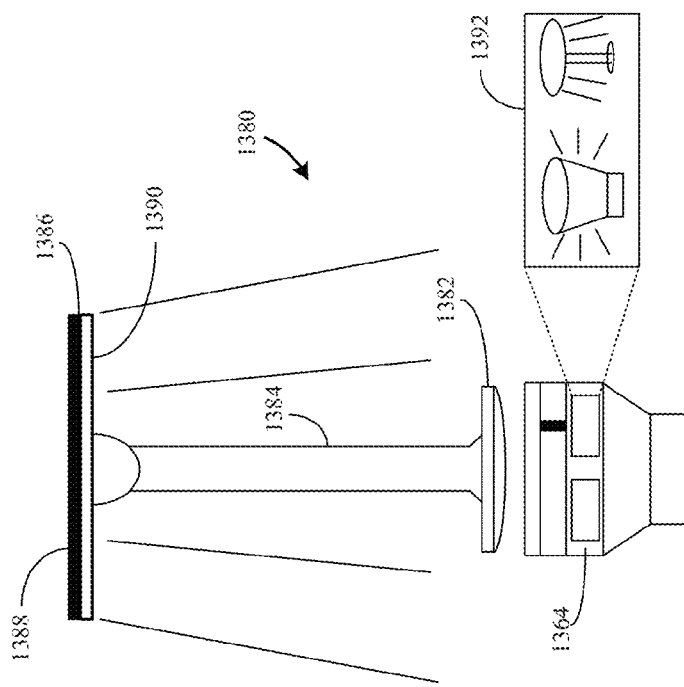
FIG. 66 is a side view of an exemplary lighting assembly having a switch in a first position.
Figure 68:
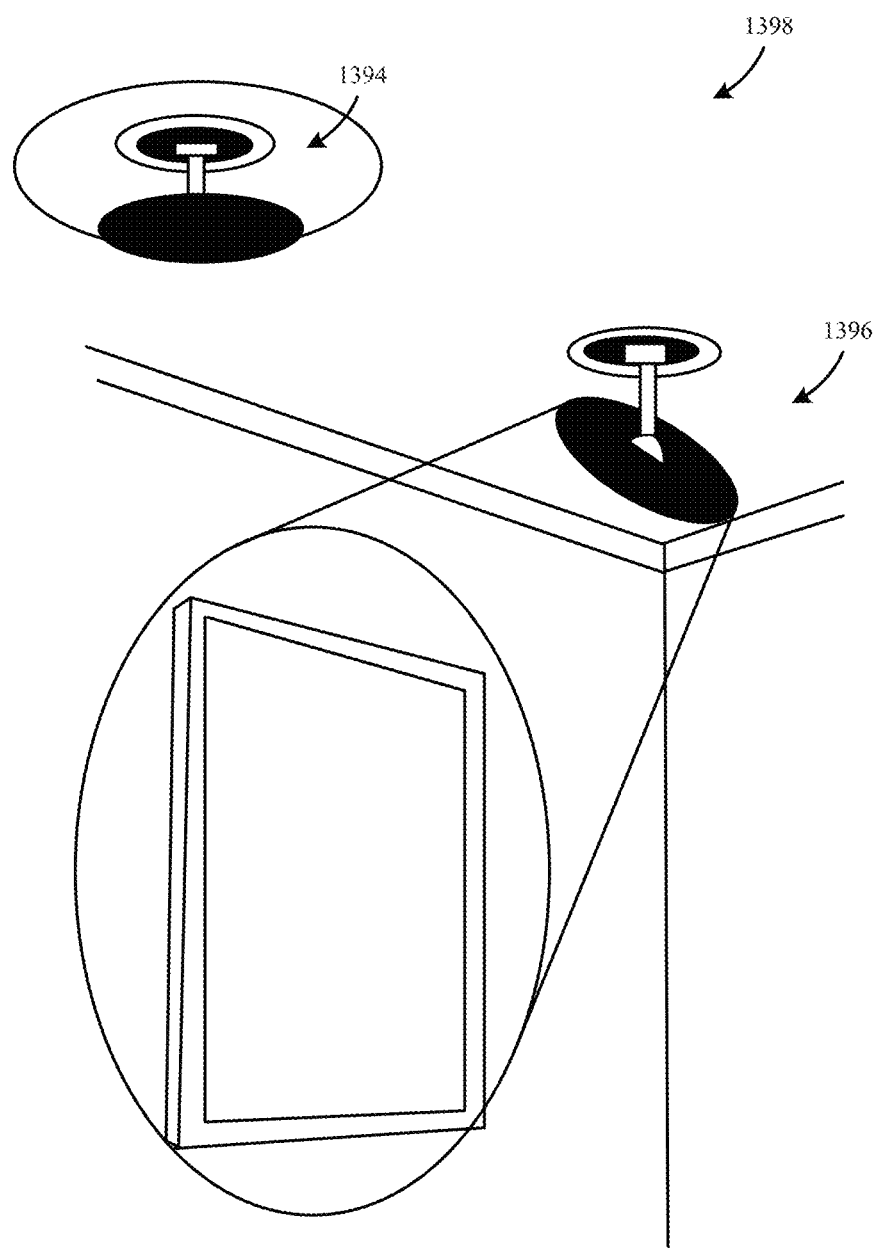
FIG. 68 is a perspective view illustrating exemplary lighting assemblies.

The annular control ring 1364 may function similarly when the bulb assembly 1368 is formed as a different shape. FIGS. 66 and 67 depict a bulb assembly 1380 having a coupling mechanism 1382, a stem 1384, and an illuminating element 1386. The illuminating element 1386 may be a generally flat, disk-like structure (though the illuminating element 1386 need not be circular) having a first illuminating surface 1388 and a second illuminating surface 1390. For example, each illuminating surface 1388, 1390 may include an array of light emitting diodes as described above. The annular control ring 1364 may operate to selectively illuminate one or the other (or both) of the illuminating surfaces 1388 and 1390. For example, adjusting the annular control ring 1364 to a first position (as illustrated in FIG. 66) may cause the light emitting diode array of the second illuminating surface 1390 to illuminate, while adjusting the annular control ring 1364 to a second position (as illustrated in FIG. 67) may cause the light emitting diode array of the first illuminating surface 1388 to illuminate. FIGS. 66 and 67 illustrate that icons 1392 may be employed on the annular control ring 1364 to indicate the functions of the various control positions. FIG. 68 shows two ways a generally disk-like illuminating element may be deployed in a setting 1398. In FIG. 68, a first lighting assembly 1394, with the annular control ring 1364 adjusted as depicted in FIG. 66, provides indirect lighting. At the same time, a second lighting assembly 1396, in which the annular control ring 1364 is adjusted as depicted in FIG. 67, provides direct lighting.

In some embodiments, a touch-sensitive surface may control one or more features of a lighting assembly. In addition to controlling whether a lighting assembly is on or off, a touch-sensitive control may operate a dimming circuit, allowing a user to dim and/or brighten the illumination of the lighting assembly by moving a finger along the surface of the control, to touch specific areas of the control according to the desired brightness, or to cycle through two or more fixed brightness settings. A touch-sensitive control may instead (or additionally) allow a user to cycle through one or more illuminating circuits that may be turned on and/or off in the bulb assembly (e.g., in place of the annular control ring 1364).

Figure 71:
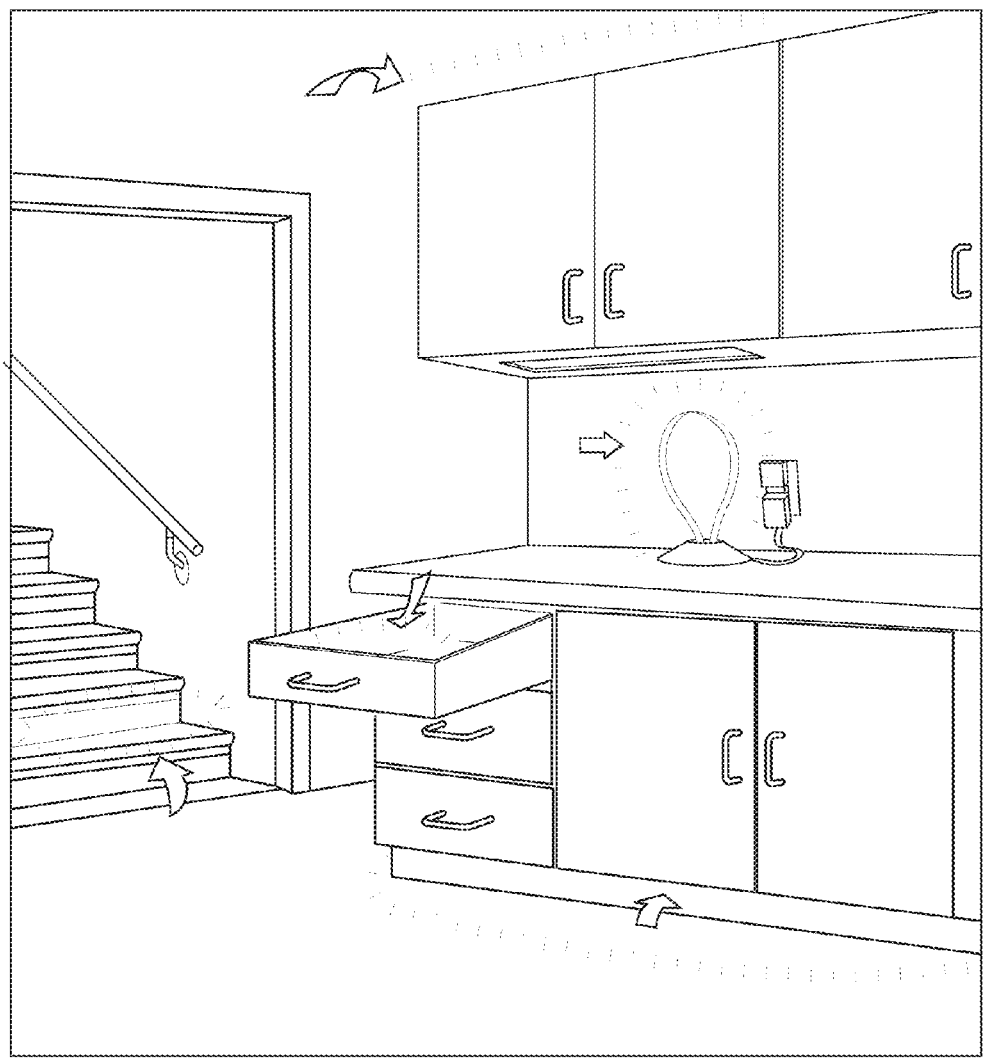
FIG. 71 is a perspective view illustrating a scene implementing several of the exemplary lighting assembly embodiments.

Touch-sensitive controls may be implemented in many embodiments of lighting assemblies and in many of embodiments of lighting assemblies employing the apparatus described herein. Unlike many lighting assemblies, a lighting assembly having an LED array as an illuminating element may be, for most intents and purposes, two dimensional. For this reason, such lighting assemblies are uniquely suited for use in spaces such as drawers and cabinets, in which it could be used as a lining, for use as under-cabinet lighting, and the like (see FIG. 71). Touch sensitive controls may be integrated into the base assembly such that by touching the base assembly, a user may control one or more functions of the lighting assembly. In some embodiments, the touch sensitive control may be separately attachable to the base assembly by, for example, connecting a touch-sensitive module to the base assembly or connecting to the base assembly a module that is itself connected to a touch sensitive control. In still other embodiments, a touch sensitive control may be integrated into a bulb assembly to allow a user to touch the bulb assembly and control one or more functions of the lighting assembly. In such embodiments, it is contemplated that the control function may be implemented in a controller located in a base or base assembly of the lighting assembly and connected to a sensor (i.e., a touch sensitive surface) disposed in the bulb or bulb assembly of the lighting assembly.

Figure 69:
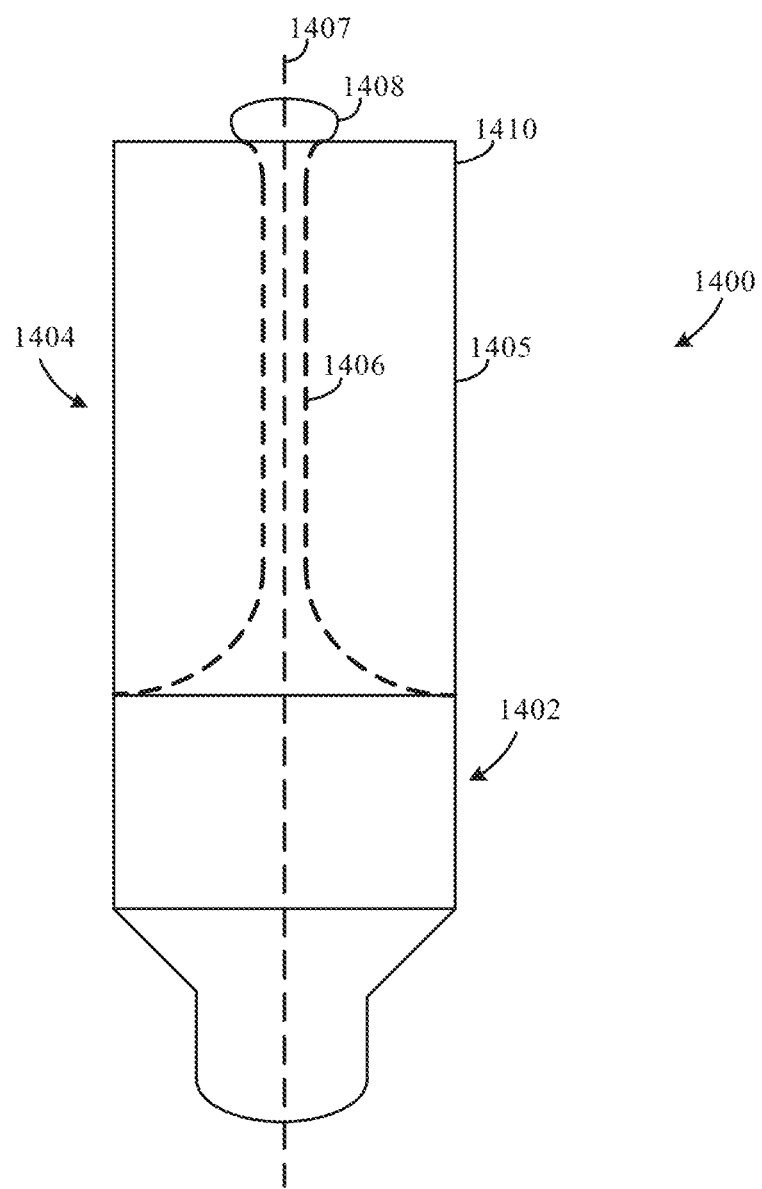
FIG. 69 is a side view of yet another exemplary embodiment of a lighting assembly.

Various embodiments of lighting assemblies in accordance with the present description may include control elements for one or more functions, which control elements are integrated into the bulb assembly or even the bulb itself. With reference now to FIG. 69, a lighting assembly 1400 includes a base section 1402 and a bulb section 1404, both integrated into the lighting assembly 1400. The bulb section 1404 includes a cylindrical shade member 1405 and a stalk 1406. In some embodiments, the shade 1405 is an illuminating element. In other embodiments, the stalk 1406 is an illuminating element.

In any event, the stalk 1406 is rotatable around an axis 1407 and is electrically and/or mechanically coupled to a dimmer circuit in the base 1402. An end 1408 of the stalk 1406 protrudes from an end 1410 of the bulb section 1404. Rotation of the stalk 1406 around the axis 1407 may operate to adjust the dimmer circuit and control the intensity of the illumination emitted from the bulb section 1404. In some embodiments, rotation of the stalk 1406 operates to adjust the dimmer circuit by actuating a rheostat in the base section 1402 and, thereby, directly adjusting the voltage applied to the illuminating element. In other embodiments, rotation of the stalk 1406 operates to adjust the dimmer circuit by adjusting an input to an analog-to-digital converter and indirectly adjusting the voltage or the duty cycle of the signal applied to the illuminating element.

In still other embodiments, the stalk 1406 may not be coupled to a dimmer circuit. Instead, the stalk 1406 may be coupled to a controller or a switch, and rotation of the stalk 1406 around the axis 1407 may operate to alter one or more signals to the controller or to switch between various output circuits. Alteration of the one or more signals may cause the controller to alter the output to the illuminating element or may alter the output of the illuminating element directly. For example, rotation of the stalk 1406 may cause the controller to switch between three lighting modes (e.g., between low, medium, and high illumination modes, or between three illuminating circuits within the illuminating element). Alternatively, rotation of the stalk 1406 may cause the bulb portion 1404 to connect with different circuits already active in the base portion 1402.

Figure 70:
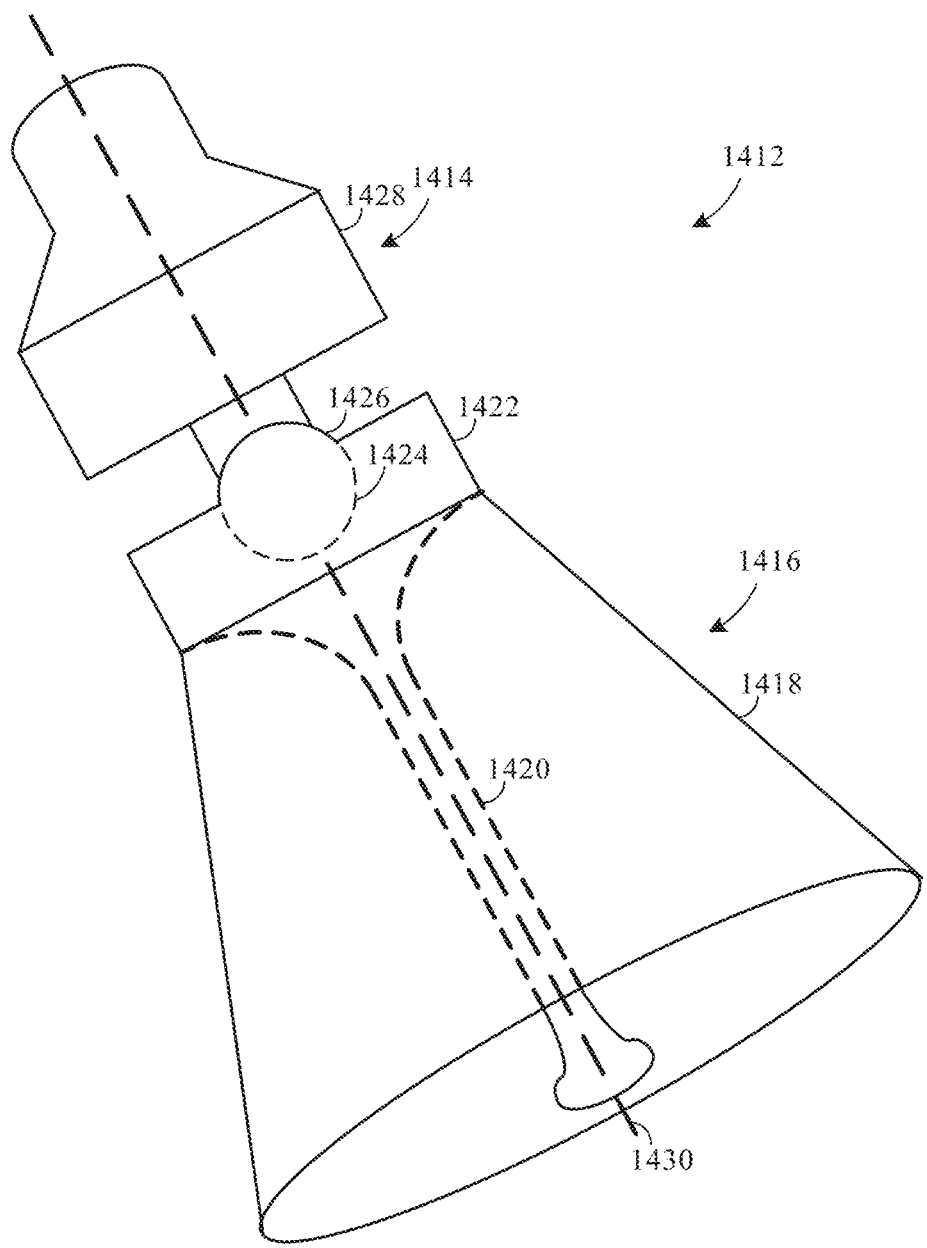
FIG. 70 is a perspective view of still another exemplary embodiment of a lighting assembly.

In FIG. 70, a lighting assembly 1412 includes a base assembly 1414 and a bulb assembly 1416. The lighting assembly 1416 includes a shade 1418 in the form of a truncated right circular cone, and a stalk 1420, either of which may be an illuminating element. A coupling mechanism 1422 on the bulb assembly 1416 includes a socket 1424 adapted to couple with a corresponding ball 1426 disposed on a coupling mechanism 1428 on the base assembly 1414. The ball 1426 and the socket 1424 interact as a ball-and-socket joint to allow the bulb assembly 1416 to be adjustably positioned. The stalk 1420 may assist the user in adjustably positioning the bulb assembly by providing both a convenient point at which to grip the bulb assembly 1406 and leverage to move the bulb assembly 1416 about the coupling mechanism 1422.

Like the stalk 1406 in the lighting assembly 1400 of FIG. 69, the stalk 1420 may also serve as a control for one or more functions of the lighting assembly 1412 and, in particular, may be rotatable around an axis 1430 to dim or brighten the illumination, change the illumination pattern, change the color of the illumination, turn the lighting assembly on/off, etc.

Innumerable other combinations and/or functions may be implemented by combining the functionality and controls described in the paragraphs above. As but one illustrative example, a controller of a lighting assembly may cause the lighting assembly to blink on and off. One of the control mechanisms described above may allow a user to vary one or more of the duration of on time and the duration of the off time. As another example, the controller may cause varying illumination patterns by implementing one or more timers to selectively and/or periodically switch two or more conductive illuminating circuits on and off.

Of course, the various functions and controls described in the paragraphs above may be implemented in combination with one another to control multiple functions. For example, a lighting assembly may have a dimmer function and a daily timer function. The lighting assembly may implement control over the dimmer function using the slider mechanism 1338 depicted in the FIGS. 57-60, while implementing control of the daily timer function using the electronic user interface module 1312. Further, while the function controls described in the paragraphs above, and in the accompanying FIGS. 52-60, are depicted with respect to lighting assemblies including separate, but coupleable, bulb and base assemblies, those of skill in the art will readily appreciate that the function control mechanisms may likewise be implemented in integrated lighting assemblies, in which bulb and base are inseparable.

Many of the embodiments described above are described with reference to bulb assemblies coupled to base assemblies having an Edison-screw for coupling to a power source. However, as repeatedly indicated, many of the embodiments described do not require a base having an Edison-screw. For illustrative purposes, various embodiments of bases and/or coupling mechanisms will now be described.

Figures 34, 35A:
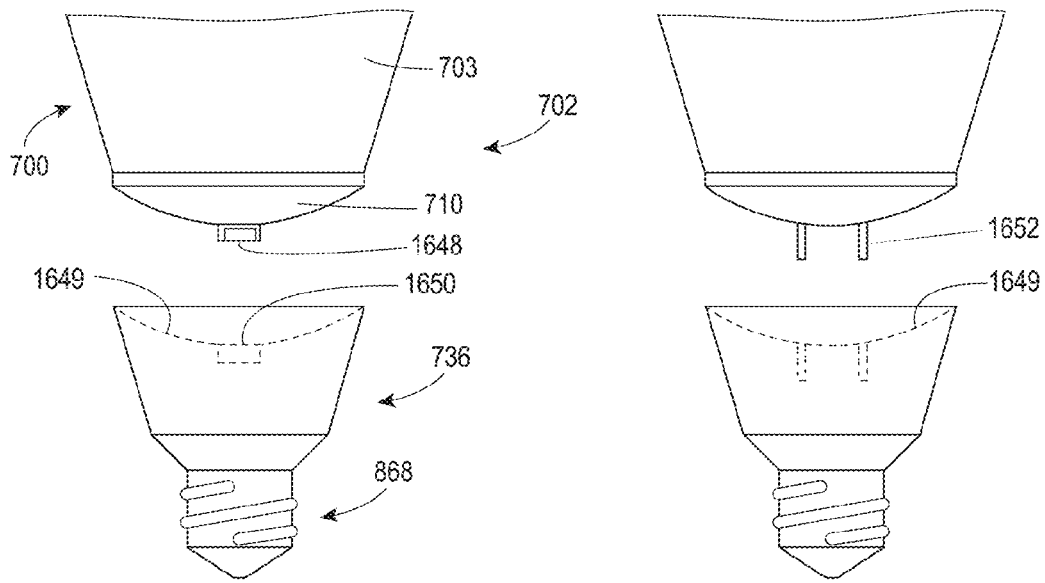
FIG. 34 is a partial side view of an exemplary embodiment of a lighting assembly.
FIG. 35A is a partial side view of an exemplary embodiment of a lighting assembly.

As illustrated in FIG. 34 and described in the foregoing discussion, the bulb base 710 of the bulb assembly 702 may be both mechanically and electrically coupled to a base assembly 735 to both secure the bulb assembly 702 to the base assembly 735 and allow power provided from a power source to be provided to an illuminating element. For example, as illustrated in FIG. 34, the bulb base 710 may be comprised of an plastic material (or a metal material), and a first magnet 1648 may be disposed at a portion of the bulb base 710 that is adapted to be coupled to a receiving portion 1649 of the base assembly 735. The receiving portion 1649 of the base assembly 735 may have a second magnet 1650 secured thereon, and a portion of the second magnet 1650 that is adjacent to the first magnet 1648 may have an opposite polarity to the portion of the first magnet 1648 that is adjacent to the second magnet 1650 such that the second magnet 1650 is magnetically attracted to the first magnet 1648. The first magnet 1648 and the second magnet 1650 may each be disposed along the central axis of the bulb base 710 and the base assembly 735 such that when the second magnet 1650 is magnetically coupled to the first magnet 1648, the bulb base 710 is coaxially aligned with the base assembly 735. However, two or more magnets may be coupled to the bulb base 710 and the base assembly 735, and the bulb base 710 and the base assembly 735 may be aligned in any suitable orientation.

Instead of (or in addition to) the magnetic coupling described above, the bulb base 710 and the base assembly 735 may be coupled in any manner known in the art. For example, as illustrated in FIG. 35A, one or more projections 1652 may project from the bottom surface of the bulb base 710, and the one or more projections 1652 may be adapted to be received into corresponding slots 1654 (or apertures or recessions) formed in the receiving portion 1649 of the base assembly 735. Alternatively, one or more projections may upwardly extend from the receiving portion 1649 of the base assembly 735, and the one or more projections may be adapted to be received into corresponding slots, apertures, or recessions formed in the bottom surface of the bulb base 710. The projections may be secured within the slots or recessions by any means known in the art, such as by the frictional engagement of a leaf spring acting on the projection 1652 or by the rotation of the projection into a secured position within the slot or recess. Another example of a connection between the bulb base 710 and the base assembly 735 may be a bayonet connection, which comprises a male side with one or more pins, and a female receptor with matching slots and one or more springs to keep the two parts locked together. With the bulb base 710 coupled to the base assembly 735, the bulb base coupled 710 may be electrically coupled to the base assembly 735 my any method known in the art, including the electrical connections that are described in more detail below.

Figures 35B, 36:
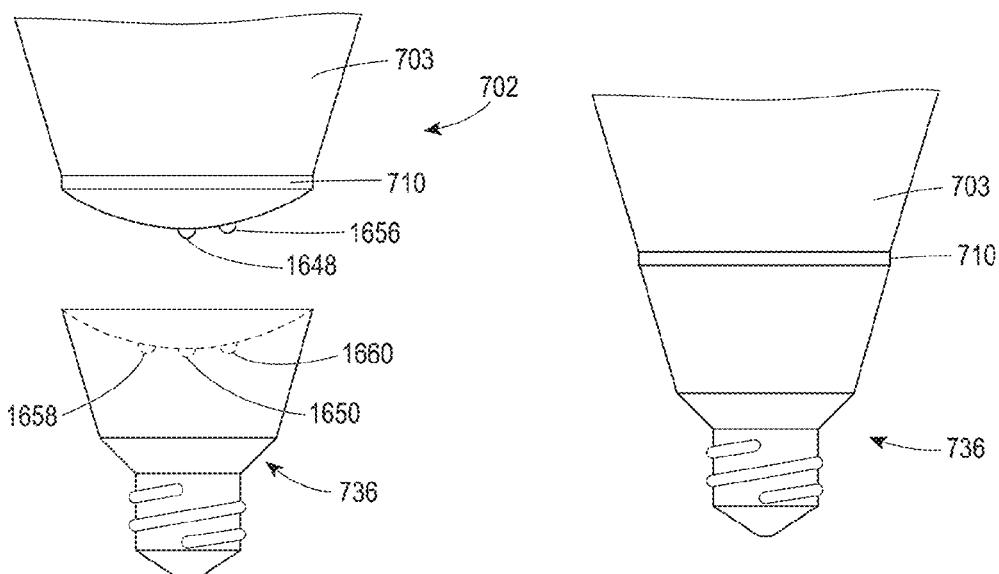
FIG. 35B is a partial side view of an exemplary embodiment of a lighting assembly.
FIG. 36 is a side view of an exemplary embodiment of a lighting assembly.

In addition to the coupling mechanisms discussed above, one or more features may be formed on the bulb base 710 and the base assembly 735 to ensure a desired mutual orientation of the bulb base 710 and the base assembly 735. For example, as illustrated in FIG. 35B, a single projection 1656 may be disposed on the bulb base 710 and if the projection 1656 is disposed in a first recess or detent 1658, a first illumination function may be triggered, such as a first brightness setting. Alternatively, if the projection 1656 is disposed in a second recess or detent 1660, a second illumination function may be triggered, such as a first brightness setting.

Figure 35C:
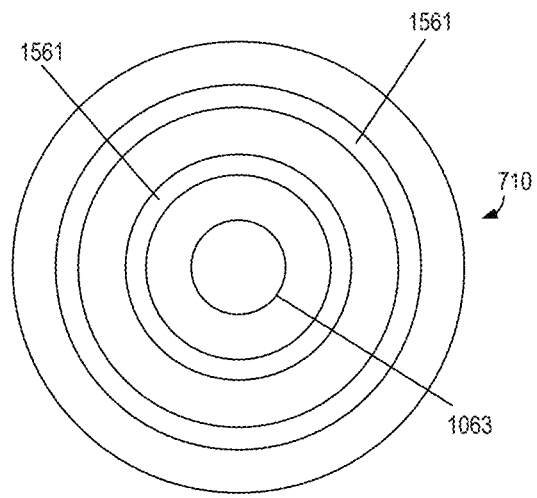
FIG. 35C is a bottom view of an embodiment of a bulb base.

Still further, the bulb base 710 may be coupled to the base assembly 735 by means of one or more annular features. FIG. 35C depicts a bottom view of an embodiment of the bulb base 710, having annular contacts 1561 in addition to a projection 1563. In some embodiments, the annular contacts 1561 may each convey power to a different circuit of the bulb assembly 702. In other embodiments, the annular contacts 1561 may each convey a data signal to the bulb assembly 702, while the projection 1563 provides power to a circuit of the bulb assembly 702. Of course, while FIG. 35C is depicted as having two annular contacts 1561, various embodiments may include more or fewer annular contacts 1561.

Figure 35D:
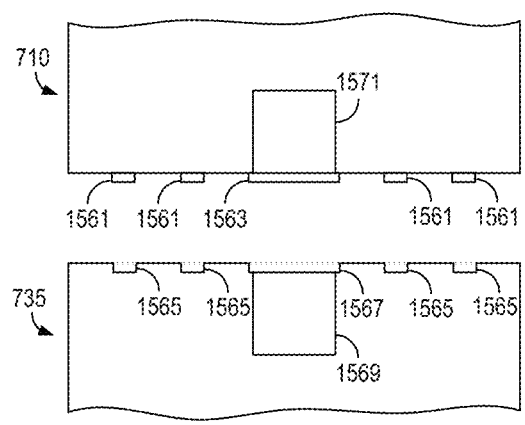
FIG. 35D is cross-sectional side view of the bulb base of FIG. 35C and a corresponding base assembly.

FIG. 35D depicts a cross-sectional side view of an embodiment of the bulb base 710 and a compatible embodiment of the base assembly 735. The bulb base 710 includes the annular contacts 1561 and the projection 1563. The base assembly 735 includes corresponding recesses 1565 and 1567 configured to receive and electrically couple to the annular contacts 1561 and the projection 1563, respectively.

In some embodiments, power may be transferred from the base assembly 735 to the bulb assembly 702 by an inductive couple, which may comprise a first transformer 1569 in the base assembly 735 and a corresponding second transformer 1571 in the bulb assembly 702. When placed in close proximity to one another, as when the bulb base 710 is seated in the complementary base assembly 735, a controller or other mechanism (e.g., a capacitive or mechanical switch) may cause the flow of a current in the transformer 1569, which, as will be understood, causes a corresponding current to be generated in the transformer 1571, thereby delivering power to the bulb assembly 702. Though FIG. 35D depicts the physical interface between the first transformer 1569 and the second transformer 1571 as a recess 1567 and a corresponding projection 1563, a secondary power source interface 1036 and 1040 implementing inductive power transfer may implement many types of physical interfaces, as will be understood. Inductive power transfer is well known and, therefore, will not be described in detail in this specification.

Referring to FIG. 36, the bulb base 710 and the base assembly 735 may be formed as a unitary part. More specifically, the bulb base 710 may be permanently coupled to the base assembly 735 such that the bulb base 710 cannot be removed from the base assembly 735.

As previously discussed, the base assembly 735 may be adapted to receive power from any source. For example, as illustrated in FIG. 34, for example, the base assembly 735 may have an interface feature 1668 that is a screw feature (e.g., an Edison screw, or, more specifically, an E27 type medium Edison screw) configured to be inserted into a conventional light socket. One having ordinary skill in the art would recognize that any type of Edison screw may be used as an interface feature 1668. The interface feature 1668 may be symmetrically disposed about a central axis of a base assembly 735 that is substantially cylindrical. The base assembly 735 may also have an interface feature 1668 adapted to be plugged into a conventional wall outlet, and the base assembly 735 may have one or more plug outlets disposed on an outside surface such that one or more electrical devices can be plugged into the outlets on the base assembly 735 to receive power from the wall outlet. The base assembly 735 may also be configured to be electrically coupled to a conventional track lighting system or any other conventional system to provide power to a conventional lighting element, such as a bulb.

Although the invention has been described with respect to specific embodiments thereof, these embodiments are merely illustrative and not restrictive of the invention. In the description herein, numerous specific details are provided, such as examples of electronic components, electronic and structural connections, materials, and structural variations, to provide a thorough understanding of embodiments of the present invention. One skilled in the relevant art will recognize, however, that an embodiment of the invention can be practiced without one or more of the specific details, or with other apparatus, systems, assemblies, components, materials, parts, etc. In other instances, well-known structures, materials, or operations are not specifically shown or described in detail to avoid obscuring aspects of embodiments of the present invention. One having skill in the art will further recognize that additional or equivalent method steps may be utilized, or may be combined with other steps, or may be performed in different orders, any and all of which are within the scope of the claimed invention. In addition, the various figures are not drawn to scale and should not be regarded as limiting.

Reference throughout this specification to "one embodiment", "an embodiment", or a specific "embodiment" means that a particular feature, structure, or characteristic described in connection with the embodiment is included in at least one embodiment and not necessarily in all embodiments, and further, are not necessarily referring to the same embodiment. Furthermore, the particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention. By way of example, and not limitation, the present disclosure contemplates at least the following aspects:

1. A light bulb base comprising:
a power source interface configured to couple the light bulb base to a light bulb socket;
a bulb-coupling interface configured to removably couple the light bulb base to a bulb assembly; and
a user interface mechanism operable to control a function of the bulb assembly or the base when the base is coupled to the bulb assembly.

2. A light bulb base according to claim 1, wherein the bulb-coupling interface comprises a magnet configured to removably secure the bulb base to the bulb assembly.

3. A light bulb base according to claim 2, wherein the magnet is conductive and operable to communicate from the bulb base to the bulb assembly either an electrical power signal or a data signal.

4. A light bulb base according to any one of claims 1 to 3, wherein the user interface mechanism comprises one or more of: an annular control, a slider, a switch, a touch sensitive control, a button, and a display.

5. A light bulb base according to any one of claims 1 to 4, further comprising a controller cooperating with the user interface mechanism to control the function.

6. A light bulb base according to any one of claims 1 to 5, wherein the function is selected from the group consisting of: a timer function, a dimmer function, a directional control, a circuit selection control, and a color control.

7. A light bulb base according to any one of claims 1 to 6, further comprising two or more selectively energizable outputs, wherein each of the outputs is configured to provide an electrical signal to a corresponding illumination circuit in the bulb assembly.

8. A light bulb base according to claim 7, wherein a first of the two or more selectively energizable outputs is configured to cause illumination of a first illumination surface of the bulb assembly, and wherein a second of the two or more selectively energizable outputs is configured to cause illumination of a second illumination surface of the bulb assembly.

9. A light bulb base comprising:
a power source interface configured to couple the light bulb base to a light bulb socket;
a bulb-coupling interface configured to couple the light bulb base to a bulb assembly; and
a receiver operable to receive a signal from a remote control source.

10. A light bulb base according to claim 9, further comprising a transmitter operable to transmit a signal to an external device.

11. A light bulb base according to claim 10, wherein the bulb-coupling interface comprises a magnet configured to removably secure the bulb base to the bulb assembly.

12. A light bulb base according to claim 11, wherein the magnet is conductive and operable to communicate from the bulb base to the bulb assembly either an electrical power signal or a data signal.

13. A light bulb base according to any one of claims 9 to 12, wherein the receiver is operable to receive a signal from one or more of: a home automation controller, a wired remote control, a wireless remote control, an infrared transmitter, a radio-frequency transmitter, and a mobile device application.

14. A light bulb base according to any one of claims 9 to 13, wherein the receiver is operable to receive one or more of: an infrared signal, a radio-frequency signal, and a signal from a wired data network.

15. A light bulb base according to any one of claims 9 to 14, further comprising a controller configured to control a function in response to the signal.

16. A light bulb base according to claim 15, wherein the controller is configured to perform one or more of the following in response to the signal:
energize an illumination circuit of the bulb assembly;
de-energize an illumination circuit of the bulb assembly;
increase illumination output from the bulb assembly;
decrease illumination output from the bulb assembly;
set a timer function; or
respond to one of a light detector, a motion detector, a vibration detector, and a sound detector.

17. A light bulb base according to any one of claims 9 to 16, further comprising two or more selectively energizable outputs, wherein each of the outputs is configured to provide an electrical signal to a corresponding illumination circuit in the bulb assembly.

18. A light bulb base according to claim 17, wherein a first of the two or more selectively energizable outputs is configured to cause illumination of a first illumination surface of the bulb assembly, and wherein a second of the two or more selectively energizable outputs is configured to cause illumination of a second illumination surface of the bulb assembly.

19. A light bulb base comprising:
a power source interface configured to couple the light bulb base to a light bulb socket;
a bulb-coupling interface configured to couple the light bulb base to a bulb assembly; and
a first inductive coupling element operable to conduct a current and to generate a first corresponding current in a first corresponding inductive coupling element in the bulb assembly.

20. A light bulb base according to claim 19, wherein the bulb-coupling interface comprises a magnet configured to removably secure the bulb base to the bulb assembly.

21. A light bulb base according to claim 20, wherein the magnet is conductive and operable to communicate from the bulb base to the bulb assembly either an electrical power signal or a data signal.

22. A light bulb base according to any one of claims 19 to 21, further comprising a second inductive coupling element operable to conduct a current and to generate a second corresponding current in a second corresponding inductive coupling element in the bulb assembly.

23. A light bulb base according to claim 22, wherein a current in the first inductive coupling element causes illumination of a first illumination surface of the bulb assembly, and wherein a current in the second inductive coupling element causes illumination of a second illumination surface of the bulb assembly.

It will also be appreciated that one or more of the elements depicted in the figures can also be implemented in a more separate or integrated manner, or even removed or rendered inoperable in certain cases, as may be useful in accordance with a particular application. Integrally formed combinations of components are also within the scope of the invention, particularly for embodiments in which a separation or combination of discrete components is unclear or indiscernible. In addition, use of the term "coupled" herein, including in its various forms such as "coupling" or "couplable", means and includes any direct or indirect electrical, structural or magnetic coupling, connection or attachment, or adaptation or capability for such a direct or indirect electrical, structural or magnetic coupling, connection or attachment, including integrally formed components and components which are coupled via or through another component.

As used herein for purposes of the present invention, the terms "bulb" or "illuminating element" (and the respective plural of each) should be understood to include any electrical lighting element employing electroluminescence (e.g., a light emitting diode), incandescence (e.g., an incandescent light bulb), or fluorescence (e.g., a fluorescent tube) to provide artificial illumination except where one or more of these illumination elements is not compatible with the described embodiment(s). The bulb or illuminating element may be independent or may be part of a larger bulb assembly and/or a lighting assembly including a base assembly.

As used herein for purposes of the present invention, the term "LED" and its plural form "LEDs" should be understood to include any electroluminescent diode or other type of carrier injection- or junction-based system which is capable of generating radiation in response to an electrical signal, including without limitation, various semiconductor- or carbon-based structures which emit light in response to a current or voltage, light emitting polymers, organic LEDs, and so on, including within the visible spectrum, or other spectra such as ultraviolet or infrared, of any bandwidth, or of any color or color temperature. Also as used herein for purposes of the present invention, the term "photovoltaic diode" (or PV) and its plural form "PVs" should be understood to include any photovoltaic diode or other type of carrier injection- or junction-based system which is capable of generating an electrical signal (such as a voltage) in response to incident energy (such as light or other electromagnetic waves) including without limitation, various semiconductor- or carbon-based structures which generate of provide an electrical signal in response to light, including within the visible spectrum, or other spectra such as ultraviolet or infrared, of any bandwidth or spectrum.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

All documents cited in the Detailed Description are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

Furthermore, any signal arrows in the drawings/figures should be considered only exemplary, and not limiting, unless otherwise specifically noted. Combinations of components of steps will also be considered within the scope of the present invention, particularly where the ability to separate or combine is unclear or foreseeable. The disjunctive term "or", as used herein and throughout the claims that follow, is generally intended to mean "and/or", having both conjunctive and disjunctive meanings (and is not confined to an "exclusive or" meaning), unless otherwise indicated. As used in the description herein and throughout the claims that follow, "a", "an", and "the" include plural references unless the context clearly dictates otherwise. Also as used in the description herein and throughout the claims that follow, the meaning of "in" includes "in" and "on" unless the context clearly dictates otherwise.

The foregoing description of illustrated embodiments of the present invention, including what is described in the summary or in the abstract, is not intended to be exhaustive or to limit the invention to the precise forms disclosed herein. From the foregoing, it will be observed that numerous variations, modifications and substitutions are intended and may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

We claim:

1. A lighting system comprising:
  a bulb assembly comprising:
    a light emitting element comprising a curved, bent or folded flexible lighting sheet, the flexible lighting sheet comprising an array of light emitting diodes arranged on a flexible substrate; and
    a coupling interface, the coupling interface comprising:
      a first power interface circuit;
      a data interface circuit; and
      an electronic key circuit;
  and
  a light bulb base comprising:
    a second power source interface configured to couple the light bulb base to a light bulb socket;
    a bulb-coupling interface configured to removably couple the light bulb base to the bulb assembly;
    a user interface mechanism operable to control a function of the bulb assembly or the base when the base is coupled to the bulb assembly; and
    a controller adapted to provide power to the first power interface circuit when the electronic key circuit indicates a compatible bulb assembly and not to provide power to the first power interface circuit when the electronic key circuit indicates an incompatible bulb assembly.

2. A lighting system according to claim 1, wherein the bulb-coupling interface comprises a magnet configured to removably secure the bulb base to the bulb assembly, wherein the magnet is conductive and operable to communicate from the bulb base to the bulb assembly either an electrical power signal or a data signal.

3. A lighting system according to claim 2, wherein the electronic key circuit comprises a radio frequency identification (RFID) device operable to receive wireless power and to transmit wireless data.

4. A lighting system according to claim 1, wherein the user interface mechanism comprises one or more of: an annular control, a slider, a switch, a touch sensitive control, a button, and a display.

5. A lighting system according to claim 1, wherein the controller is further adapted to cooperate with the user interface mechanism to control the function.

6. A lighting system according to claim 1, wherein the function is selected from the group consisting of: a timer function, a dimmer function, a directional control, a circuit selection control, and a color control.

7. A lighting system according to claim 1, wherein the bulb assembly further comprises a plurality of illumination circuits, and wherein the light bulb base further comprises a plurality of selectively energizable outputs, wherein each of the outputs is configured to provide an electrical signal to a corresponding illumination circuit of the plurality of illumination circuits in the bulb assembly.

8. A lighting system according to claim 7, wherein the bulb assembly further comprises a plurality of illumination surfaces, each illumination surface having a corresponding illumination circuit of the plurality of illumination circuits, wherein a first selectively energizable output of the plurality of selectively energizable outputs is configured to cause illumination of a first illumination surface of the plurality of illumination surfaces of the bulb assembly, and wherein a second selectively energizable output of the plurality of selectively energizable outputs is configured to cause illumination of a second illumination surface of the plurality of illumination surfaces of the bulb assembly, the second illumination surface different from the first illumination surface.

9. A lighting system comprising:
  a bulb assembly comprising:
    a light emitting element comprising a curved, bent or folded flexible lighting sheet, the flexible lighting sheet comprising an array of light emitting diodes arranged on a flexible substrate; and
    a coupling interface, the coupling interface comprising:
      a first power interface circuit;
      a data interface circuit; and
      an electronic key circuit;
  and
  a light bulb base comprising:
    a second power source interface configured to couple the light bulb base to a light bulb socket;
    a bulb-coupling interface configured to couple the light bulb base to a bulb assembly;
    a receiver operable to receive a signal from a remote control source; and
    a controller adapted to provide power to the first power interface circuit when the electronic key circuit indicates a compatible bulb assembly and not to provide power to the first power interface circuit when the electronic key circuit indicates an incompatible bulb assembly.

10. A lighting system according to claim 9, wherein the light bulb base further comprises a transmitter operable to transmit a signal to an external device.

11. A lighting system according to claim 10, wherein the bulb-coupling interface comprises a magnet configured to removably secure the bulb base to the bulb assembly, wherein the magnet is conductive and operable to communicate from the bulb base to the bulb assembly either an electrical power signal or a data signal.

12. A lighting system according to claim 11, wherein the electronic key circuit comprises a radio frequency identification (RFID) device operable to receive wireless power and to transmit wireless data.

13. A lighting system according to claim 9, wherein the receiver is operable to receive a signal from one or more of: a home automation controller, a wired remote control, a wireless remote control, an infrared transmitter, a radio-frequency transmitter, and a mobile device application.

14. A lighting system according to claim 9, wherein the receiver is operable to receive one or more of: an infrared signal, a radio-frequency signal, and a signal from a wired data network.

15. A lighting system according to claim 9, wherein the controller is further adapted to control a function in response to the signal.

16. A lighting system according to claim 15, wherein the controller is configured to perform one or more of the following in response to the signal:
energize an illumination circuit of the bulb assembly;
de-energize an illumination circuit of the bulb assembly;
increase illumination output from the bulb assembly;
decrease illumination output from the bulb assembly;
set a timer function; or
respond to one of a light detector, a motion detector, a vibration detector, and a sound detector.

17. A lighting system according to claim 9, wherein the bulb assembly further comprises a plurality of illumination circuits, and wherein the light bulb base further comprises a plurality of selectively energizable outputs, wherein each of the outputs of the plurality of selectively energizable outputs is configured to provide an electrical signal to a corresponding illumination circuit in the bulb assembly.

18. A lighting system according to claim 17, wherein the bulb assembly further comprises a plurality of illumination surfaces, each illumination surface having a corresponding illumination circuit of the plurality of illumination circuits, wherein a first selectively energizable output of the plurality of selectively energizable outputs is configured to cause illumination of a first illumination surface of the plurality of illumination surfaces of the bulb assembly, and wherein a second selectively energizable output of the plurality of selectively energizable outputs is configured to cause illumination of a second illumination surface of the plurality of illumination surfaces of the bulb assembly, the second illumination surface different from the first illumination surface.

19. A lighting system comprising:
a bulb assembly comprising:
a light emitting element comprising a curved, bent or folded flexible lighting sheet, the flexible lighting sheet comprising an array of light emitting diodes arranged on a flexible substrate; and
a coupling interface, the coupling interface comprising:
a first power interface circuit;
a data interface circuit; and
an electronic key circuit;
and
a light bulb base comprising:
a second power source interface configured to couple the light bulb base to a light bulb socket;
a bulb-coupling interface configured to couple the light bulb base to a bulb assembly;
a first inductive coupling element operable to conduct a current and to generate a first corresponding current in a first corresponding inductive coupling element in the bulb assembly; and
a controller adapted to provide power to the first power interface circuit when the electronic key circuit indicates a compatible bulb assembly and not to provide power to the first power interface circuit when the electronic key circuit indicates an incompatible bulb assembly.

20. A lighting system according to claim 19, wherein the electronic key circuit comprises a radio frequency identification (RFID) device operable to receive wireless power and to transmit wireless data.

* * * * *